United States Patent
Walker et al.

(10) Patent No.: US 7,351,142 B2
(45) Date of Patent: *Apr. 1, 2008

(54) METHOD AND APPARATUS FOR FACILITATING PLAY OF FRACTIONAL VALUE LOTTERY GAMES

(75) Inventors: Jay S. Walker, Ridgefield, CT (US); James A. Jorasch, Stamford, CT (US); Sanjay K. Jindal, Pacific Palisades, CA (US); Andrew S. Van Luchene, New York, NY (US); Stephen C. Tulley, Fairfield, CT (US)

(73) Assignee: Walker Digital, LLC, Stamford, CT (US)

( * ) Notice: Subject to any disclaimer, the term of this patent is extended or adjusted under 35 U.S.C. 154(b) by 747 days.

This patent is subject to a terminal disclaimer.

(21) Appl. No.: 10/457,101

(22) Filed: Jun. 5, 2003

(65) Prior Publication Data

US 2004/0032083 A1 Feb. 19, 2004

Related U.S. Application Data

(63) Continuation-in-part of application No. 10/424,362, filed on Apr. 25, 2003, now Pat. No. 6,887,153, which is a continuation of application No. 09/836,409, filed on Apr. 16, 2001, now Pat. No. 6,582,304, which is a continuation of application No. 08/822,709, filed on Mar. 21, 1997, now Pat. No. 6,267,670, application No. 10/457,101, which is a continuation-in-part of application No. 09/442,754, filed on Nov. 12, 1999, now Pat. No. 6,598,024, which is a continuation of application No. 08/920,116, filed on Aug. 26, 1997, now Pat. No. 6,119,099, which is a continuation-in-part of application No. 08/822,709, filed on Mar. 21, 1997, now Pat. No. 6,269,670, application No. 10/457,101, which is a continuation-in-part of application No. 09/045,036, filed on Mar. 20, 1998, which is a continuation-in-part of application No. 08/920, 116, application No. 10/457,101, which is a continuation-in-part of application No. 09/107,971, filed on Jun. 30, 1998, which is a continuation-in-part of application No. 09/045,036, which is a continuation-in-part of application No. 08/920,116, said application No. 09/107,971 is a continuation-in-part of application No. 08/920,116.

(51) Int. Cl.
*A63F 9/24* (2006.01)
(52) U.S. Cl. .................... 463/17; 273/269; 463/25
(58) Field of Classification Search .............. 463/17, 463/25; 273/269
See application file for complete search history.

(56) References Cited

U.S. PATENT DOCUMENTS 3,573,747 A  4/1971 Adams et al.

(Continued)

FOREIGN PATENT DOCUMENTS

DE  40 09 980 A1  10/1991

(Continued)

OTHER PUBLICATIONS

Brochure, "Introducing the Digital MenuBoard", Siren Technologies, Inc., (www sirentech com).

(Continued)

*Primary Examiner*—Ronald Laneau
*Assistant Examiner*—Travis Banta
(74) *Attorney, Agent, or Firm*—Walker Digital Management, LLC

(57) ABSTRACT

According to one embodiment, a method is provided for redeeming a game entry. The method includes steps of determining a wager amount that is associated with a winning game entry, determining a proportional share based on the wager amount, and determining a prize share amount based on the proportional share. The method may further include providing the prize share amount to a holder of the winning game entry. In some alternative embodiments, a prize for a winning game entry may be a non-monetary benefit.

25 Claims, 39 Drawing Sheets

U.S. PATENT DOCUMENTS

| | | | |
|---|---|---|---|
| 4,108,361 A | 8/1978 | Krause | |
| 4,157,829 A | * 6/1979 | Goldman et al. | ............. 463/17 |
| 4,323,770 A | 4/1982 | Dieulot et al. | |
| 4,441,160 A | 4/1984 | Azcua et al. | |
| 4,494,197 A | 1/1985 | Troy et al. | |
| 4,500,880 A | 2/1985 | Gomersall | |
| 4,669,730 A | 6/1987 | Small | |
| 4,677,553 A | 6/1987 | Roberts et al. | |
| 4,689,742 A | 8/1987 | Troy et al. | |
| 4,723,212 A | 2/1988 | Mindrum et al. | |
| 4,760,247 A | 7/1988 | Keane et al. | |
| 4,815,741 A | 3/1989 | Small | |
| 4,825,045 A | 4/1989 | Humble | |
| 4,839,507 A | 6/1989 | May | |
| 4,854,590 A | 8/1989 | Jolliff et al. | |
| 4,859,838 A | 8/1989 | Okiharu | |
| 4,876,592 A | 10/1989 | Von Kohorn | |
| 4,882,473 A | 11/1989 | Bergeron | |
| 4,902,880 A | 2/1990 | Garczynski et al. | |
| 4,908,761 A | 3/1990 | Tai | |
| 4,910,672 A | 3/1990 | Off et al. | |
| 4,922,522 A | 5/1990 | Scanlon | |
| 4,937,853 A | 6/1990 | Brule et al. | |
| 4,973,952 A | 11/1990 | Malec et al. | |
| 4,982,337 A | 1/1991 | Burr et al. | |
| 4,993,714 A | 2/1991 | Golightly | |
| 5,025,372 A | 6/1991 | Burton et al. | |
| 5,056,019 A | 10/1991 | Schultz et al. | |
| 5,119,295 A | 6/1992 | Kapur | |
| 5,128,862 A | 7/1992 | Mueller | |
| 5,132,914 A | 7/1992 | Cahlander | |
| 5,172,328 A | 12/1992 | Cahlander et al. | |
| 5,173,851 A | 12/1992 | Off et al. | |
| 5,177,342 A | 1/1993 | Adams | |
| 5,186,463 A | 2/1993 | Marin et al. | |
| 5,192,854 A | 3/1993 | Counts | |
| 5,200,889 A | 4/1993 | Mori | |
| 5,201,010 A | 4/1993 | Deaton et al. | |
| 5,216,595 A | 6/1993 | Protheroe | |
| 5,223,698 A | 6/1993 | Kapur | |
| 5,231,569 A | 7/1993 | Myatt et al. | |
| 5,239,165 A | * 8/1993 | Novak | ............ 235/375 |
| 5,243,515 A | 9/1993 | Lee | |
| 5,245,533 A | 9/1993 | Marshall | |
| 5,256,863 A | 10/1993 | Ferguson et al. | |
| 5,262,941 A | 11/1993 | Saladia et al. | |
| 5,274,547 A | 12/1993 | Zoffel et al. | |
| 5,276,312 A | 1/1994 | McCarthy | |
| 5,283,731 A | 2/1994 | Lalonde et al. | |
| 5,287,268 A | 2/1994 | McCarthy | |
| 5,297,026 A | 3/1994 | Hoffman | |
| 5,297,031 A | 3/1994 | Gutterman et al. | |
| 5,302,811 A | 4/1994 | Fukatsu | |
| 5,305,195 A | 4/1994 | Murphy | |
| 5,309,355 A | 5/1994 | Lockwood | |
| 5,353,218 A | 10/1994 | DeLapa et al. | |
| 5,353,219 A | 10/1994 | Mueller et al. | |
| 5,371,796 A | 12/1994 | Avarne | |
| 5,380,991 A | 1/1995 | Valencia et al. | |
| 5,398,932 A | 3/1995 | Eberhardt et al. | |
| RE34,915 E | 4/1995 | Nichtberger | |
| 5,417,424 A | 5/1995 | Snowden et al. | |
| 5,420,606 A | 5/1995 | Begum et al. | |
| 5,459,306 A | 10/1995 | Stein et al. | |
| 5,475,205 A | 12/1995 | Behm et al. | |
| 5,481,094 A | 1/1996 | Suda | |
| 5,504,475 A | 4/1996 | Houdou et al. | |
| 5,505,449 A | 4/1996 | Eberhardt et al. | |
| 5,510,979 A | 4/1996 | Moderi et al. | |
| 5,518,239 A | 5/1996 | Johnston | |
| 5,539,189 A | 7/1996 | Wilson | |
| 5,548,110 A | 8/1996 | Storch et al. | |
| 5,564,546 A | 10/1996 | Molbak et al. | |
| 5,564,977 A | * 10/1996 | Algie | ......................... 463/25 |
| 5,572,653 A | 11/1996 | DeTemple et al. | |
| 5,581,064 A | 12/1996 | Riley et al. | |
| 5,592,375 A | 1/1997 | Salmon et al. | |
| 5,592,376 A | 1/1997 | Hodroff | |
| 5,602,377 A | 2/1997 | Beller et al. | |
| 5,611,052 A | 3/1997 | Dykstra et al. | |
| 5,612,868 A | 3/1997 | Off et al. | |
| 5,613,679 A | 3/1997 | Casa et al. | |
| 5,615,269 A | 3/1997 | Micali | |
| 5,619,558 A | 4/1997 | Jheeta | |
| 5,620,079 A | 4/1997 | Molbak | |
| 5,621,201 A | 4/1997 | Langhans et al. | |
| 5,621,640 A | 4/1997 | Burke | |
| 5,621,812 A | 4/1997 | Deaton et al. | |
| 5,632,010 A | 5/1997 | Briechle et al. | |
| 5,638,457 A | 6/1997 | Deaton et al. | |
| 5,642,484 A | 6/1997 | Harrison, III et al. | |
| 5,642,485 A | 6/1997 | Deaton et al. | |
| 5,644,723 A | 7/1997 | Deaton et al. | |
| 5,649,114 A | 7/1997 | Deaton et al. | |
| 5,652,421 A | 7/1997 | Veeneman et al. | |
| 5,655,007 A | 8/1997 | McAlllister | |
| 5,664,115 A | 9/1997 | Fraser | |
| 5,665,953 A | 9/1997 | Mazzamuto et al. | |
| 5,724,886 A | 3/1998 | Ewald et al. | |
| 5,772,510 A | 6/1998 | Roberts et al. | |
| 5,791,990 A | 8/1998 | Schroeder et al. | |
| 5,832,457 A | 11/1998 | O'Brien et al. | |
| 5,845,259 A | 12/1998 | West et al. | |
| 5,857,175 A | 1/1999 | Day et al. | |
| 5,890,718 A | 4/1999 | Byon | |
| 5,946,665 A | 8/1999 | Suzuki et al. | |
| 6,014,634 A | 1/2000 | Scroggie et al. | |
| 6,024,288 A | 2/2000 | Gottlich et al. | |
| 6,064,987 A | 5/2000 | Walker et al. | |
| 6,070,147 A | 5/2000 | Harms et al. | |
| 6,080,062 A | * 6/2000 | Olson | ......................... 463/42 |
| 6,088,682 A | 7/2000 | Burke | |
| 6,112,191 A | 8/2000 | Burke | |
| 6,119,099 A | 9/2000 | Walker et al. | |
| 6,138,105 A | 10/2000 | Walker et al. | |
| 6,223,163 B1 | 4/2001 | Van Luchene | |
| 6,267,670 B1 | 7/2001 | Walker et al. | |
| 6,292,786 B1 | 9/2001 | Deaton et al. | |
| 6,298,329 B1 | 10/2001 | Walker et al. | |
| 6,298,331 B1 | 10/2001 | Walker et al. | |
| 6,307,958 B1 | 10/2001 | Deaton et al. | |
| 6,321,210 B1 | 11/2001 | O'Brien et al. | |
| 6,582,304 B2 | * 6/2003 | Walker et al. | ................ 463/17 |

FOREIGN PATENT DOCUMENTS

| | | |
|---|---|---|
| EP | 1 391 060 | 4/1975 |
| EP | 0 085 546 A2 | 8/1983 |
| EP | 0 109 189 A1 | 5/1984 |
| EP | 512413 A | 11/1992 |
| JP | 57086974 | 5/1982 |
| JP | 600251498 | 12/1985 |
| JP | 2171891 | 7/1990 |
| JP | 2197998 | 8/1990 |
| JP | 2278399 | 11/1990 |
| JP | HEI 2 -289000 | 11/1990 |
| JP | 04060900 A | 2/1992 |
| JP | 4095198 | 3/1992 |
| JP | 4260914 | 9/1992 |
| JP | 04314189 A | 11/1992 |
| JP | 5242363 A | 9/1993 |
| JP | 8147545 | 6/1996 |
| JP | 8329350 | 12/1996 |
| JP | 10031792 | 2/1998 |

| JP | 11-505343 | 5/1999 |
| WO | WO 96/34358 | 10/1996 |
| WO | WO 96/36926 | 11/1996 |
| WO | WO 97/28510 | 8/1997 |
| WO | WO 97/35441 | 9/1997 |
| WO | WO 97/46961 | 12/1997 |
| WO | WO 97/50064 | 12/1997 |
| WO | WO 98/43149 | 10/1998 |
| WO | WO 99/11006 | 3/1999 |

OTHER PUBLICATIONS

Brochure: "Reaching Out In New Directions", First Data Corporation, Merchant Services, undated.
"Cape Town", Reuters, Ltd, Nov. 8, 1979.
"Georgia Almanac", Georgia Almanac, Jan. 26, 1983, BC Cycle, Section: Regional News.
"Save the Mark", Financial Times (London), Feb. 1, 1983, Section I, Men & Matters, p. 12.
Cook, Louise, "ConsumerWatch: Clip, Snip, Save", The Associated Press, Mar. 12, 1984, Section: Business News.
"Major Appliances: Tappan unveils microwave oven featuring preprogrammed controls.", HFD, Sep. 10, 1984, p. 103.
Greene, Jan, "Farm bills please assns; National Grocers Association", Supermarket News, Dec. 23, 1985, Section: vol. 35, p. 6, ISSN: 0039-5803.
"POS spectrum: a lottery looks to POS for growth", POS News, Jan. 1989, Section: vol. 5, No. 7, p. 8, ISSN: 0896-6230, CODEN: Bhorad.
Kuttner, Robert, "Computers May Turn The World Into One Big Commodities Pit", Business Week, Sep. 11, 1989, Section: Economic Viewpoint, No. 3123, p. 17.
Schrage, Michael, "An Experiment In Economic Theory; Labs Testing Real Markets", The Record, Nov. 26, 1989, Section: Business, p. B01.
"Let's Play the Cash Register Receipts Lottery", The New York Times, Dec. 25, 1990, Section 1, p. 30, Col. 4, Editorial Desk.
Del Rosso, Laura, "Marketel says it plans to launch air fare 'auction' in June; Marketel International Inc.", Travel Weekly, Apr. 29, 1991, Section: vol. 50, No. 34, p. 1, ISSN: 0041-2082.
"Philips offers customers financing through Citicorp", Health Industry Today, Jun. 1991, Section: vol. 54, No. 6, p. 4, ISSN: 0745-4678.
Pelline, Jeff, "Travelers Bidding On Airline Tickets SF firm offers chance for cut-rate fares", Aug. 19, 1991, Section: News, p. A4.
Del Rosso, Laura, "Ticket-bidding firm closes its doors; Marketel International", Travel Weekly, Mar. 12, 1992, Section: vol. 51, No. 21, p. 1, ISSN: 0041-2082.
"Heads I win, tails you lose.", The Economist, Jun. 13, 1992, vol. 323, p. 74, ISSN: 0013-0613.
"Coupons get serious; supermarkets use barcodes to prevent misredemptions", Chain Store Age Executive with Shopping Center Age, Oct. 1992, Section: vol. 68, No. 10, p. 68, ISSN: 0193-1199.
"Winn-Dixie/The Salvation Army Report Contributions For War Against Hunger", PR Newswire, Jun. 10, 1993, Section: Financial News.
Jones, Jeanne, "Data Readers Streamline Management; Scanner Technology Aids Retailers As Well As Plants, Wholesalers", The Houston Post, Jun. 26, 1994, Section: Business, p. D1.
Fiorini, Phillip, "'No Place For Penny?' / Smallest coin doesn't make cents to some", USA Today, Jul. 29, 1994, Section: News: p. 1A.
Smith, Alison, "Survey of UK Consumer Credit and Asset Finance", Financial Times, Nov. 3, 1994, Section: p. VI.
Andreoli, Tom et al., "Cash Machines Offer a Whole Lotto Money for Withdrawal . . . ", Crains Chicago Business, Jun. 19, 1995, Section: News, p. 8.
"Spain: BBV launches new card", Cards International, Jun. 22, 1995, Section: p. 5.
Knippenberg, Jim, "Psst! Will local radio empires strike back ?", The Cincinnati Enquirer, Jul. 23, 1995, Section: Tempo, p. F01.
Silverman, Gene, "Planning and using infomercial campaigns effectively", Direct Marketing, Sep. 1995, vol. 58, No. 5, p. 32(3).
Brochure, "Cyber Bid", Net Fun Ltd., Copyright 1996.

McKinney, Jeff, "Merchant program could pay off for Provident", The Cincinnati Enquirer, Mar. 24, 1996, Section: Financial, p. E02.
Raab, David M., "Package Aids Catalog Management", DM News, Apr. 22, 1996, Section: Software Review, p. 14.
Hadley, Kimberly, "Pastors praying anti-arson effort will burn bias", The Nashville Banner, Jul. 26, 1996, Section: News at p. A13.
Gapper, John, "NatWest reports rise in bad debt", Financial Times, Jul. 31, 1996, Section: News: UK; at p. 09.
"Lynx Technology: Lynx to provide business leasing programme through Schroder Leasing", M2 Presswire, Aug. 9, 1996.
Taylor, Paul, "Towards a dream market", Financial Times (London), Sep. 4, 1996, Section: Survey—FT IT, p. 03.
"Bigger Plans (Provident Bank, issuer of MeritValue customer loyalty card, plans to offer program in 25 cities in six months)", Card Fax, Oct. 7, 1996, vol. 96, No. 178, p. 2.
Fickenscher, Lisa, "Amex to Start Free Rewards Program with Discounts on Merchandise", The American Banker, Oct. 18, 1996, Section: Credit/Debit/ATMs, p. 10.
Fitzgerald, Kate, "Amex Program Moves Loyalty to Next Level: Custom Extras Finds a Medium Customers Can't Ignore: Billing Statements", Advertising Age, Nov. 4, 1996, Section: News, p. 2.
Herman, Ken, "Lottery's losers: Small stores; Big pots bring big problems", Austin American-Statesman, Nov. 23, 1996, Section: News, p. A1.
Bonnici, Joseph et al., "Consumer issues in coupon usage: An exploratory analysis", Journal of Applied Business Research, Winter 1996/1997, Section: vol. 13, No. 1, pp. 31-40, ISSN: 0892-7626, CODEN: JPBEBK.
Rehayem, Gilbert, "Opinion: X-Press Betting", La Fleur's Lottery World, Feb. 7, 1997.
Quittner, Jeremy, "Ohio's Provident brings its discount card to Fla.", American Banker, Feb. 11, 1997, vol. 162, Issue 28, p. 11, 1/3p., ISSN: 0002-7561.
Symons, Allene, "Lucky, Sav-on debut Rewards Card.", Drug Store News, Feb. 17, 1997, vol. 19, Issue 4, p3, 2p, 1c, ISSN: 0191-7587.
Mckeveny, Alexander, "Giving them a good reason.", Bank Marketing, Mar. 1997, vol. 29, Issue 3, p37, 4p, 4c, ISSN: 0888-3149.
Singletary, Michelle, "Electronic World, Unchecked Problem? U.S. Move to Paperless Payments Raises Worries About Those Who Don't Use Banks", The Washington Post, Mar. 4, 1997, Section: Financial at p. C01.
Fickenscher, Lisa, "Merchant: American Express Seeks to Mine Its Data on Cardholder Spending Patterns", The American Banker, Mar. 24, 1997, Section: Credit/Debit/ATMs, p. 20.
Kelsey, John and Schneier, Bruce, "Conditional Purchase Orders", Fourth ACM Conference on Computer Communication Security, ACM Press, Apr. 1997, pp. 117-124.
"Dispensing the Future", Electronic Payments International, May 1997, Section: Feature, p. 12.
"Avco Financial Services", National Home Furnishing Association, (http//www homefurnish comNHFA/avco htm), download date: May 23, 1997.
Website, "Catalina Marketing Corporation", (http//catalinamktg com/prodcdir htm), download date: May 29, 1997.
Industry Briefs, Card News, Jun. 9, 1997, Section: vol. 12, No. 11.
Riordan, Teresa, "Patents; A novel approach to making a better spermicide harks back to some old-fashioned methods", The New York Times, Jun. 9, 1997, Section D, p. 2, col. 1, Business/Financial Desk.
Nairn, Geoff, "The key to your identity: Falling costs will allow fingerprint verification to be widely used, reports Geoff Nairn", Financial Times (London), Jul. 15, 1997, Section: Technology; at p. 12.
"The United Computer Exchange, How It All Works", (http//www uce com/howitworks html), download date: Jul. 23, 1997.
"Classified 2000: The Internet Classifieds", Classifieds2000, Inc., (http//www classifieds2000 com/cgi-cls/Display exe?C2K+aboutus), download date: Aug. 6, 1997.
"General trading information and terms provided by tradingfloor.com", (http//www tradingfloor com/info htm), download date: Aug. 14, 1997.
"NASDAQ", Information Sheet, (http//home axford com/corfin/corfl 1 htm), download date: Aug. 15, 1997.

Prochaska-Cue, Kathy, "Acquiring Credit", (http//ianrwww unl edu/IANR/PUBS/NEBFACTS/NF91-2.HTM), download date: Sep. 3, 1997.
Website: "IAO—Onsale—GSCI—Zauction—Cyberswap—Auction World", (http www iaoauction com/about htm), download date: Sep. 8, 1997.
Website: "Welcome to ONSALE", (http www onsale com), download date: Sep. 8, 1997.
Hoeschen, Brad, "Brookfield Square hopes mall card strikes a chord", Business Journal-Milwaukee, Sep. 12, 1997, Section: vol. 14, No. 50, p. 19.
Website: "NCR 7452 Workstation—Beyond Traditional POS", (http//www ncr com/product/retail/products/catalog/7452 shtm), download date: Sep. 23, 1997.
Kirk, Jim, "Digital Promotions Make Quick Point—McDonald's testing new technology on its menus", Chicago Tribune, Dec. 26, 1997, pp. 1-2.
"From Our Family to Yours . . . 5 Weeks of Coupon Values for a Valuable Customer!", Wakefern Food Corporation, 1998.
Brochure: "It's in the Bag. Introducing the Universal Holding Cabinet from Welbilt", Frymaster Corporation, 1998.
Brochure: "NCR 7453 PC-Based Point-of-Sale Solution", NCR Corporation, Copyright 1998.
"Progressive Introduces Kitchen Display System (KDS) For Restaurants", PR Newswire, Jan. 23, 1998, Section: Financial News.
"JICC Coupon Guide Recommends Upgrades at Front End", Supermarket News, Feb. 9, 1998, Section: p. 23, ISSN: 0039-5803.
Livingston, Kimball, "In-Store systems, VideOcart Redux", Retail Tech Magazine, Mar. 1998, pp. 29-30.
Website: "Advanced Mechanics Internet Specials", (http//www metroplexweb com/advcpn2 htm), download date: Mar. 12, 1998.
Website: "U.P.C. Coupon Code Guidelines Manual", Uniform Code Council, Inc., (http//www uc-council org/d31-3 htm), download date: Mar. 12, 1998.
"New Wave Marketing", Promotion Times—An SCA Quarterly Newsletter—First Quarter, Apr. 1998.
Hamstra, Mark, "Segment Study: 'Made-for-you' maneuvers signal competitive shift n QSR category", Nation's Restaurant News, Apr. 13, 1998, p. 54.
"POSitive Input; The McDonald's POS-3 System Newsletter from Olivetti Solutions/OLSY", McDonald's, Spring/Summer Edition 1998, pp. 1-8.
Brochure: "For the Crew & the Customer—The Best Drive-Thru & Grill Service", Olivetti, Winter 1998.
"Universal Holding Cabinet Rollout Program", H & K Dallas Inc., Winter 1998.
"The Northwest German State Lottery—Your Invitation to Play", (http//www germanstatelottery com/invitation html), download date: May 14, 1999.
"Official Lottery Rules", (http//www gloeckle com/bedingungen/main html), download date: May 14, 1999.
Website: "What actually is the SKL?", (http//www gloeckle com/das_spiel/rechts html), download date: May 14, 1999.
"Epson Partners With International Lottery & Totalizator Systems; Epson's New Acclaim Program Wins With Gaming Market", Business Wire, Jun. 7, 1999.
"Examiner's Affidavit", Affidavit of USPTO Examiner James W. Myhre, Feb. 22, 2001.
"The Change Game", Georgia State Lottery Ticket—Mega Millions Jackpot, Draw date Aug. 8, 2002.
Website: "Georgia Lottery Corporation—Change Game", (http//www Georgialottery com/lottery/changegame html), download date: Dec. 4, 2002.
Website: "Michigan Lottery", (http www Michigan gov/lottery/0,1607,7-110-812_21193_21321---,00 html), download date: Dec. 4, 2002.
Website: "The Change Game—Turning Loose Change Into Lottery Dollars", (http www berschgaming com/about_the_game htm), download date: Dec. 4, 2002.
PCT Written Opinion for Application No. PCT/US98/05787 dated Jul. 29, 1999, 2 pp.
PCT International Search Report for Application No. PCT/US98/05787 dated May 12, 1999, 11 pp.
Hernman, Ken,: Auchan Cashes In On Lottery, Houston Post, Sec A p. 15, col. 5, Jul. 1, 1992, 1 page.
Notice of Allowance for U.S. Appl. No. 10/424,362 mailed Nov. 4, 2004, 7 pp.
Office Action for U.S. Appl. No. 10/424,362 mailed Jun. 9, 2004, 6 pp.
Office Action for U.S. Appl. No. 10/424,362 mailed Nov. 19, 2003, 11 pp.
Notice of Allowance for U.S. Appl. No. 09/836,409 mailed Sep. 25, 2002, 21 pp.
Notice of Allowance for U.S. Appl. No. 09/836,409 mailed May 16, 2002, 7 pp.
Office Action for U.S. Appl. No. 09/836,409 mailed Nov. 20, 2002, 6 pp.
Office Action for U.S. Appl. No. 09/836,409 mailed Oct. 1, 2001, 8 pp.
Notice of Allowance for U.S. Appl. No. 08/822,709 mailed Jan. 14, 2001, 3 pp.
Office Action for U.S. Appl. No. 08/822,709 mailed Feb. 17, 2000, 11 pp.
Office Action for U.S. Appl. No. 08/822,709 mailed Jun. 23, 1999, 8 pp.
Office Action for U.S. Appl. No. 09/442,754 mailed Nov. 12, 1999, 21 pp.
Office Action for U.S. Appl. No. 09/442,754 mailed Jan. 16, 2001, 10 pp.
Notice of Allowability for U.S. Appl. No. 09/442,754 mailed Dec. 14, 2001, 4 pp.
Notice of Allowability for U.S. Appl. No. 09/442,754 mailed Jan. 7, 2003, 10 pp.
Notice of Allowability for U.S. Appl. No. 09/442,754 mailed Mar. 4, 2003, 7 pp.
Notice of Allowability for U.S. Appl. No. 08/920,116 mailed Oct. 25, 1999, 15 pp.
Office Action for U.S. Appl. No. 08/920,116 mailed Oct. 1, 1999, 7 pp.
Office Action for U.S. Appl. No. 08/920,116 mailed Apr. 5, 2006, 20 pp.
Decision on Appeal for U.S. Appl. No. 09/045,036 mailed Nov. 30, 2005, 14 pp.
Reply Brief for U.S. Appl. No. 09/045,036 mailed Oct. 30, 2003, 4 pp.
Apply Brief for U.S. Appl. No. 09/045,036 mailed Jun. 30, 2003, 86 pp.
Office Action for U.S. Appl. No. 09/045,036 mailed Jun. 25, 2002, 28 pp.
Office Action for U.S. Appl. No. 09/045,036 mailed Sep. 27, 2001, 19 pp.
Office Action for U.S. Appl. No. 09/107,971 mailed Oct. 3, 2001, 43 pp.
Office Action for U.S. Appl. No. 09/107,971 mailed Oct. 21, 1003, 28 pp.
Office Action for U.S. Appl. No. 09/107,971 mailed Feb. 2, 2004, 29 pp.
Herman, Ken,: Auchan Cashes In On Lottery, Houston Post, Sec A p.15, col. 5, Jul. 1, 1992, 1 page.

* cited by examiner

| DATE 1102 | TIME 1104 | AMOUNT RECEIVED 1106 | ITEM ORDERED 1108 | ROUND UP AMOUNT 1110 | LOTTERY TICKET OFFERED? 1112 | LOTTERY TICKET PURCHASED? 1114 | CHANGE DISPENSED 1116 |
|---|---|---|---|---|---|---|---|
| 10/25/03 | 1:15:03 PM | $1.00 | PLU123 | $0.35 | YES | 100-241-321 | $0.00 |
| 10/25/03 | 1:32:03 PM | $5.00 | PLU491 | $4.25 | NO | N/A | $4.25 |
| 10/25/03 | 1:48:15 PM | $0.35 | LOTTERY TICKET | $0.00 | NO | 100-241-322 | $0.00 |
| 10/25/03 | 1:50:21 PM | $1.00 | PLU123 | $0.35 | YES | N/A | $0.35 |
| 10/25/03 | 1:50:21 PM | $5.00 | PLU345; PLU492 | $1.35 | YES | 100-241-323 | $0.25 |

| DATE 1202 | TICKET IDENTIFIER 1204 | NUMBER OF TICKETS PURCHASED 1206 | SALE AMOUNT 1208 | LOTTERY TICKET NUMBERS 1210 |
|---|---|---|---|---|
| 1/15/97 | 4532 | 1 | $1.00 | 01 12 34... |
| 1/15/97 | 4533 | 4 | $4.00 | 02 07 23...<br>01 17 46...<br>11 34 56...<br>22 33 44... |
| 1/15/97 | 4534 | 1 | $0.68 | 33 17 92... |

FIG. 12

| POS CONTROLLER ID NUMBER 1302 | DATE 1304 | NUMBER OF TICKETS PURCHASED 1306 | SALES RECEIPT NUMBER 1308 | SALE AMOUNT 1310 | LOTTERY TICKET NUMBERS 1312 | CRYPTOGRAPHIC CODE 1314 |
|---|---|---|---|---|---|---|
| 23456 | 1/15/97 | 4 | 3343 | $4.00 | 01 10 20... 11 21 31... | 5436848759 400006887 |
| 23456 | 1/15/97 | 1 | 4533 | $1.00 | 02 07 23... 01 17 46... | 7493027564 393857033 |
| 23456 | 1/15/97 | 1 | 4534 | $0.68 | 33 17 92... | 54665568757 6767666676 |

| TRANSACTION NUMBER 1402 | POS TERMINAL IDENTIFIER 1404 | TICKET PURCHASE PRICE 1406 | DATE 1408 | FRACTIONAL TICKET IDENTIFIER 1410 |
|---|---|---|---|---|
| 7614234 | 1 | $0.12 | 2/10/98 | 1001 |
| 7614235 | 1 | $0.69 | 2/10/98 | 1002 |
| 7614236 | 2 | $1.77 | 2/10/98 | 1003 |
| 7614237 | 3 | $0.22 | 2/10/98 | 1004 |
| 7614239 | 2 | $0.79 | 2/10/98 | 1005; 1006 |
| 7614240 | 2 | $2.00 | 2/10/98 | N/A |
| 7614236 | 2 | $1.35 | 2/10/98 | 1007 |

FIG. 14

| TRANSACTION NUMBER 1502 | POS TERMINAL IDENTIFIER 1504 | PURCHASE PRICE 1506 | ROUNDING MULTIPLE 1508 | ROUND UP AMOUNT 1510 | ACCEPTED OFFER FOR TICKET 1512 | FREQUENT SHOPPER NUMBER 1514 | DATE 1516 | FRACTIONAL TICKET IDENTIFIER 1518 |
|---|---|---|---|---|---|---|---|---|
| 7614234 | 1 | $16.88 | $1 | $0.12 | YES | 111111 | 2/10/98 | 1001 |
| 7614235 | 1 | $12.31 | $1 | $0.69 | YES | 111112 | 2/10/98 | 1002 |
| 7614236 | 2 | $13.23 | $5 | $1.77 | YES | 111113 | 2/10/98 | 1003 |
| 7614237 | 3 | $25.78 | $1 | $0.22 | YES | 111114 | 2/10/98 | 1004 |
| 7614238 | 2 | $31.10 | $10 | $8.90 | NO | 111115 | 2/10/98 | N/A |

| FRACTIONAL LOTTERY TICKET 1001 | | |
|---|---|---|
| TICKET IDENTIFIER 1602 | VALUE 1604 | TICKET NUMBERS 1606 |
| 987654321 | $0.12 | 02, 03, 12, 16, 21, 25 |

1607

1650

1655

| FRACTIONAL LOTTERY TICKET 1003 | | |
|---|---|---|
| TICKET IDENTIFIER 1652 | VALUE 1654 | TICKET NUMBERS 1656 |
| 987654360 | $1.75 | 02, 01, 17, 40, 32, 09 |

| TICKET RECORD IDENTIFIER 1802 | DRAWING DATE 1804 | TICKET NUMBERS 1806 | TOTAL VALUE AMOUNT 1808 | AMOUNT TO ROUND UP 1810 |
|---|---|---|---|---|
| 1234560 | 2/10/98 | 11,12,13,04,21,34 | $0.12 | $0.88 |
| 1234561 | 2/10/98 | 01,21,04,25,13,11 | $0.31 | $0.69 |
| 1234562 | 2/10/98 | 11,25,35,04,06,03 | $0.23 | $0.77 |
| 1234563 | 2/10/98 | 01,20,30,16,28,13 | $0.78 | $0.22 |
| 1234564 | 2/10/98 | 02,30,21,26,24,01 | $7.10 | $0.90 |

| TICKET RECORD IDENTIFIER 2002 | DRAWING DATE 2004 | TICKET NUMBERS 2006 | UNALLOCATED PORTION 2008 | TICKET PRICE 2010 |
|---|---|---|---|---|
| 1234560 | 2/10/98 | 11,12,13,04,21,34 | $0.88 | $1.00 |
| 1234561 | 2/10/98 | 01,21,04,25,13,11 | $0.69 | $1.00 |
| 1234562 | 2/10/98 | 11,25,35,04,06,03 | $0.77 | $1.00 |
| 1234563 | 2/10/98 | 01,20,30,16,28,13 | $0.22 | $1.00 |
| 1234564 | 2/10/98 | 02,30,21,26,24,01 | $0.90 | $1.00 |

2000

2020, 2022, 2024, 2026, 2028

| TOTAL REMAINING UNALLOCATED AMOUNT |
|---|
| $3.46 |

| TICKET IDENTIFIER | DRAWING DATE | TICKET NUMBERS | UNALLOCATED PORTION | TICKET PRICE |
|---|---|---|---|---|
| 1234560 | 2/10/98 | 11,12,13,04,21,34 | $0.88 | $1.00 |
| 1234561 | 2/10/98 | 01,21,04,25,13,11 | $0.69 | $1.00 |
| 1234562 | 2/10/98 | 11,25,35,04,06,03 | $0.77 | $1.00 |
| 1234563 | 2/10/98 | 01,20,30,16,28,13 | $0.22 | $1.00 |
| 1234564 | 2/10/98 | 02,30,21,26,24,01 | $0.90 | $1.00 |

2135

| TOTAL REMAINING UNALLOCATED AMOUNT | $3.46 |
|---|---|

| ROUND UP AMOUNT | $0.89 | ←—2130 |
|---|---|---|

2120

| TICKET IDENTIFIER | DRAWING DATE | TICKET NUMBERS | UNALLOCATED PORTION | TICKET PRICE |
|---|---|---|---|---|
| 1234560 | 2/10/98 | 11,12,13,04,21,34 | $0.88 | $1.00 |
| 1234561 | 2/10/98 | 01,21,04,25,13,11 | $0.69 | $1.00 |
| 1234562 | 2/10/98 | 11,25,35,04,06,03 | $0.77 | $1.00 |
| 1234563 | 2/10/98 | 01,20,30,16,28,13 | $0.22 | $1.00 |
| 1234564 | 2/10/98 | 02,30,21,26,24,01 | $0.01 | $1.00 |

2140

| TOTAL REMAINING UNALLOCATED AMOUNT | $2.57 |
|---|---|

FIG. 21

| TICKET RECORD IDENTIFIER | DRAWING DATE | TICKET NUMBERS | TOTAL VALUE AMOUNT | AMOUNT TO ROUND UP |
|---|---|---|---|---|
| 1234000 | 2/17/98 | 12,21,28, 35,38,40 | $0.55 | $0.45 |
| 1234001 | 2/17/98 | 5,15,25, 35,40,41 | $0.27 | $0.73 |
| 1234002 | 2/17/98 | 2,8,14, 26,39,42 | $1.16 | $0.84 |
| 123003 | 2/17/98 | 10,19,24, 29,36,39 | $3.39 | $0.61 |

| ROUND UP AMOUNT | $0.60 |
|---|---|

FIG. 22

| TICKET RECORD IDENTIFIER | DRAWING DATE | TICKET NUMBERS | UNALLOCATED PORTION | TICKET PRICE |
|---|---|---|---|---|
| 1234000 | 2/17/98 | 12,21,28, 35,38,40 | $0.55 | $1.00 |
| 1234001 | 2/17/98 | 5,15,25, 35,40,41 | $0.83 | $1.00 |
| 1234002 | 2/17/98 | 2,8,14, 26,39,42 | $0.95 | $1.00 |
| 123003 | 2/17/98 | 10,19,24, 29,36,39 | $0.61 | $1.00 |

| ROUND UP AMOUNT | $0.60 |
|---|---|

FIG. 23

| | TICKET NUMBERS 2405 | TICKET PRICE 2406 | NUMBER OF TICKETS 2407 |
|---|---|---|---|
| 2401 → | 12,21,28,35,38,40 | $1.00 | 1 |
| 2402 → | 5,15,25,35,40,41 | $1.00 | 1 |
| 2403 → | 2,8,14,26,39,42 | $1.00 | 2 |
| 2404 → | 10,19,24,29,36,39 | $1.00 | 4 |

2400

| | TICKET RECORD IDENTIFIER | DRAWING DATE | TICKET NUMBERS | TOTAL VALUE AMOUNT | AMOUNT TO ROUND UP |
|---|---|---|---|---|---|
| 2452 → | 1234000 | 2/17/98 | 12,21,28, 35,38,40 | $0.55 | $0.45 |
| 2454 → | 1234001 | 2/17/98 | 5,15,25, 35,40,41 | $0.27 | $0.73 |
| 2456 → | 1234002 | 2/17/98 | 2,8,14, 26,39,42 | $1.16 | $0.84 |
| 2458 → | 123003 | 2/17/98 | 10,19,24, 29,36,39 | $3.39 | $0.61 |

| DRAWING DATE 2566 | WINNING TICKET NUMBERS 2568 | PRIZE 2570 |
|---|---|---|
| 1/7/98 | 02,03,12,16,21,25 | $1,000,000 |
| 1/14/98 | 03,04,16,21,22,24 | $2,000,000 |
| 1/21/98 | 01,02,03,04,11,06 | $1,500,000 |

2560 → (row 1)
2562 → (row 2)
2564 → (row 3)

FIG. 25

| UPSELL IDENTIFIER 2602 | UPSELL PRICE 2604 | ITEMS PURCHASED 2606 | COST 2608 | UPSELL DESCRIPTOR 2610 |
|---|---|---|---|---|
| A | BETWEEN $.02 AND $.45 | SMALL SODA | $0.02 | LOTTERY ENTRY |
| B | BETWEEN $.50 AND $.80 | 8 | $0.50 | CONTEST ENTRY |
| C | MORE THAN $.70 | NA | $0.70 | SWEEPSTAKES ENTRY |
| D | BETWEEN $.30 AND $.70 | CANDY BAR | $0.25 | FRACTIONAL LOTTERY TICKET |
| E | BETWEEN $1.50 AND $3.50 | NA | $1.00 | KENO ENTRY |
| F | BETWEEN $.20 AND $.60 | 1,5 | $0.20 | "QUICK PICK" LOTTERY TICKET |
| G | BETWEEN $.05 AND $.20 | 5 | $0.05 | DOUBLE VALUE LOTTERY TICKET |
| H | LESS THAN $.50 | 3 | $0.01 | RAFFLE ENTRY |

| FREQUENT SHOPPER NUMBER 2788 | ADDRESS 2790 | TELEPHONE 2792 | NAME 2794 | E-MAIL ADDRESS 2796 |
|---|---|---|---|---|
| 111111 | 12 MAIN ST. ANYTOWN, USA | (111)456-7890 | SUSAN GREEN | - |
| 111112 | 456 RIVER DR. ANYTOWN, USA | (222)234-9876 | JONATHAN STEVENS | JSTEVENS@IBMI.COM |
| 111113 | 5412 MADISON AVE. ANYTOWN, USA | (333) 246-8108 | NANCY EVANS | - |
| 111114 | 99 PARK LA. ANYTOWN, USA | (444) 359-6129 | RALPH STEWART | - |

FIG. 27

| | 2800 | | |
|---|---|---|---|
| POS CONTROLLER ID NUMBER F13 | POS CONTROLLER NAME F14 | POS CONTROLLER LOCATION F15 | TELEPHONE NUMBER F16 |
| 23456 | MINI MART AND GROCERY | STAMFORD, CT 06905 | (203)555-1234 |
| | | | |
| | | | |

R3 points to the second row.

FIG. 28

MINI-MART GROCERY STORE

| | |
|---|---|
| FRUIT | 2.50 |
| BEVERAGES | 15.00 |
| BREAD | 4.50 |
| VEGETABLES | 1.00 |
| DAIRY | 3.50 |
| CEREAL | 12.50 |
| STEAK | 35.00 |
| VEAL | 25.00 |
| LOTTERY TICKETS | 3.68 |
| TAX | 5.32 |
| TOTAL | $108.00 |

THANK YOU!

CONNECTICUT
L O T T E R Y

| | PRICE | |
|---|---|---|
| TICKET 1 | $1 | 01 10 20 30 36 39 |
| TICKET 2 | $1 | 11 21 24 25 32 33 |
| TICKET 3 | $1 | 07 09 11 13 15 17 |
| TICKET 4 | $0.68 | 08 13 15 16 27 41 |

STORE ID #: 23456
RECEIPT #: 3343
DATE: 1/15/97
TIME: 4:20 PM
PRICE: $3.68

CALL 1800-XXX-XXXX FOR INFORMATION REGARDING RESULTS, QUESTIONS, AND AUTHENTICATION

****** 5765685699 ******
4040545886
AUTHENTICATION CODE

FIG. 39

METHOD AND APPARATUS FOR FACILITATING PLAY OF FRACTIONAL VALUE LOTTERY GAMES

The present invention is a continuation-in-part application of each of the following:

(i) U.S. patent application Ser. No. 10/424,362, entitled "SYSTEM AND METHOD FOR PERFORMING LOTTERY TICKET TRANSACTIONS UTILIZING POINT-OF-SALE TERMINALS," filed on Apr. 25, 2003 and now issued as U.S. Pat. No. 6,887,153 on May 3, 2005; which is a continuation of U.S. patent application Ser. No. 09/836,409, filed on Apr. 16, 2001 and now issued as U.S. Pat. No. 6,582,304 on Jun. 24, 2003; which is a continuation of U.S. patent application Ser. No. 08/822,709, filed on Mar. 21, 1997 and now issued as U.S. Pat. No. 6,267,670 B1; and also (ii) U.S. patent application Ser. No. 09/442,754, entitled "METHOD AND SYSTEM FOR PROCESSING SUPPLEMENTARY PRODUCT SALES AT A POINT-OF-SALE TERMINAL," filed on Nov. 12, 1999 and now issued as U.S. Pat. No. 6,598,024 on Jul. 22, 2003 which is a continuation of U.S. patent application Ser. No. 08/920,116, filed on Aug. 26, 1997 and now issued as U.S. Pat. No. 6,119,099; which is a continuation-in-part of U.S. patent application Ser. No. 08/822,709, filed on Mar. 21, 1997 and now issued as U.S. Pat. No. 6,267,670 B1; and also (iii) U.S. patent application Ser. No. 09/045,036, entitled "METHOD AND APPARATUS FOR FACILITATING THE PLAY OF FRACTIONAL LOTTERY TICKETS UTILIZING POINT-OF-SALE TERMINALS," filed on Mar. 20, 1998; which is a continuation-in-part of U.S. patent application Ser. No. 08/920,116, filed on Aug. 26, 1997 and now issued as U.S. Pat. No. 6,119,099; which is a continuation-in-part of U.S. patent application Ser. No. 08/822,709, filed on Mar. 21, 1997 and now issued as U.S. Pat. No. 6,267,670 B1; and also (iv) U.S. patent application Ser. No. 09/107,971, entitled "METHOD AND APPARATUS FOR FACILITATING THE PLAY OF FRACTIONAL LOTTERY TICKETS UTILIZING POINT-OF-SALE TERMINALS," filed on Jun. 30, 1998; which is a continuation-in-part application of each of the following:

(a) U.S. patent application Ser. No. 09/045,036, filed on Mar. 20, 1998; which is a continuation-in-part of U.S. patent application Ser. No. 08/920,116, filed on Aug. 26, 1997 and now issued as U.S. Pat. No. 6,119,099; which is a continuation-in-part of U.S. patent application Ser. No. 08/822,709, filed on Mar. 21, 1997 and now issued as U.S. Pat. No. 6,267,670 B1; and also (b) U.S. patent application Ser. No. 08/920,116, filed on Aug. 26, 1997 and now issued as U.S. Pat. No. 6,119,099; which is a continuation-in-part of U.S. patent application Ser. No. 08/822,709, filed on Mar. 21, 1997 and now issued as U.S. Pat. No. 6,267,670 B1; and also each of which above applications is assigned to the assignee of the present invention and incorporated by reference herein.

CROSS-REFERENCE TO RELATED APPLICATION

The present invention is related to U.S. patent application Ser. No. 09/390,430, entitled "METHOD AND APPARATUS FOR CONDUCTING A LOTTERY TICKET TRANSACTION," filed on Sep. 7, 1999; which is a continuation-in-part application of U.S. patent application Ser. No. 08/822,709, filed on Mar. 21, 1997 and now issued as U.S. Pat. No. 6,267,670 B1; each of which above applications is assigned to the assignee of the present invention and incorporated by reference herein.

FIELD OF THE INVENTION

The present invention relates to terminals that facilitate the purchase of lottery tickets.

BACKGROUND OF THE INVENTION

Lotteries are extremely popular games that generate significant revenues for sponsoring states that offer them. In a typical lottery, a player (ticket holder) purchases a lottery ticket having ticket numbers and a serial number inscribed thereon. The ticket numbers allow both the ticket holder and a lottery agent to identify whether the ticket holder has won a prize. The serial number uniquely identifies the lottery ticket, and is typically recorded by a lottery agency so that the lottery ticket may be validated. For example, the serial number may be used to verify whether the ticket numbers inscribed on a ticket match those ticket numbers that the lottery agency has recorded as associated with that lottery ticket.

A typical lottery ticket has six ticket numbers, each selected from a range, such as the range from one to forty-nine. The six ticket numbers may have been selected by the ticket holder or, at the request of the ticket holder, randomly selected by the lottery terminal printing the ticket. On a drawing date (e.g., at a predetermined time), the lottery agency randomly selects six ticket numbers, which are deemed "winning" ticket numbers. A lottery ticket having ticket numbers that match some or all of the winning ticket numbers is a winning ticket, and the corresponding holder of the lottery ticket wins a prize.

A great-grandparent application of the present application, U.S. patent application Ser. No. 08/822,709, entitled "SYSTEM AND METHOD FOR PERFORMING LOTTERY TICKET TRANSACTIONS UTILIZING POINT-OF-SALE TERMINALS", filed on Mar. 21, 1997 and now issued as U.S. Pat. No. 6,267,670 on Jul. 31, 2001 discloses a system and method by which lottery tickets, including fractional lottery tickets, may be sold to a customer at a point-of-sale ("POS") terminal. Any full lottery ticket and/or fraction or percentage of a full lottery ticket may be purchased by the customer, either as a stand-alone transaction, or while purchasing other merchandise.

BRIEF DESCRIPTION OF THE DRAWINGS

The following is a brief description of the accompanying drawings:

FIG. 11 is a tabular representation of one or more embodiments of a transaction database;

FIG. 12 is a tabular representation of one or more embodiments of a ticket database and/or a transaction database;

FIG. 13 is a tabular representation of one or more embodiments of a ticket database and/or a transaction database;

FIG. 14 is a tabular representation of one or more embodiments of a transaction database;

FIG. 15 is a tabular representation of one or more embodiments of a transaction database;

FIG. 16 is a tabular representation of one or more embodiments of a fractional ticket database;

FIG. 18 is a tabular representation of one or more embodiments of a ticket record database;

FIG. 20 is a tabular representation of one or more embodiments of a ticket record database;

FIG. 21 is a tabular representation of exemplary data of a ticket record database;

FIG. 22 is a tabular representation of exemplary data of a ticket record database;

FIG. 23 is a tabular representation of exemplary data of a ticket record database;

FIG. 24 is a tabular representation of exemplary data of a ticket supply database;

FIG. 25 is a tabular representation of one or more embodiments of a winning ticket database;

FIG. 26 is a tabular representation of one or more embodiments of a game entry upsell database;

FIG. 27 is a tabular representation of one or more embodiments of a frequent shopper database;

FIG. 28 is a tabular representation of one or more embodiments of a POS controller database;

FIG. 39 is a representation of a ticket according to one or more embodiments of the present invention.

DETAILED DESCRIPTION OF THE PREFERRED EMBODIMENTS

Figure 1:
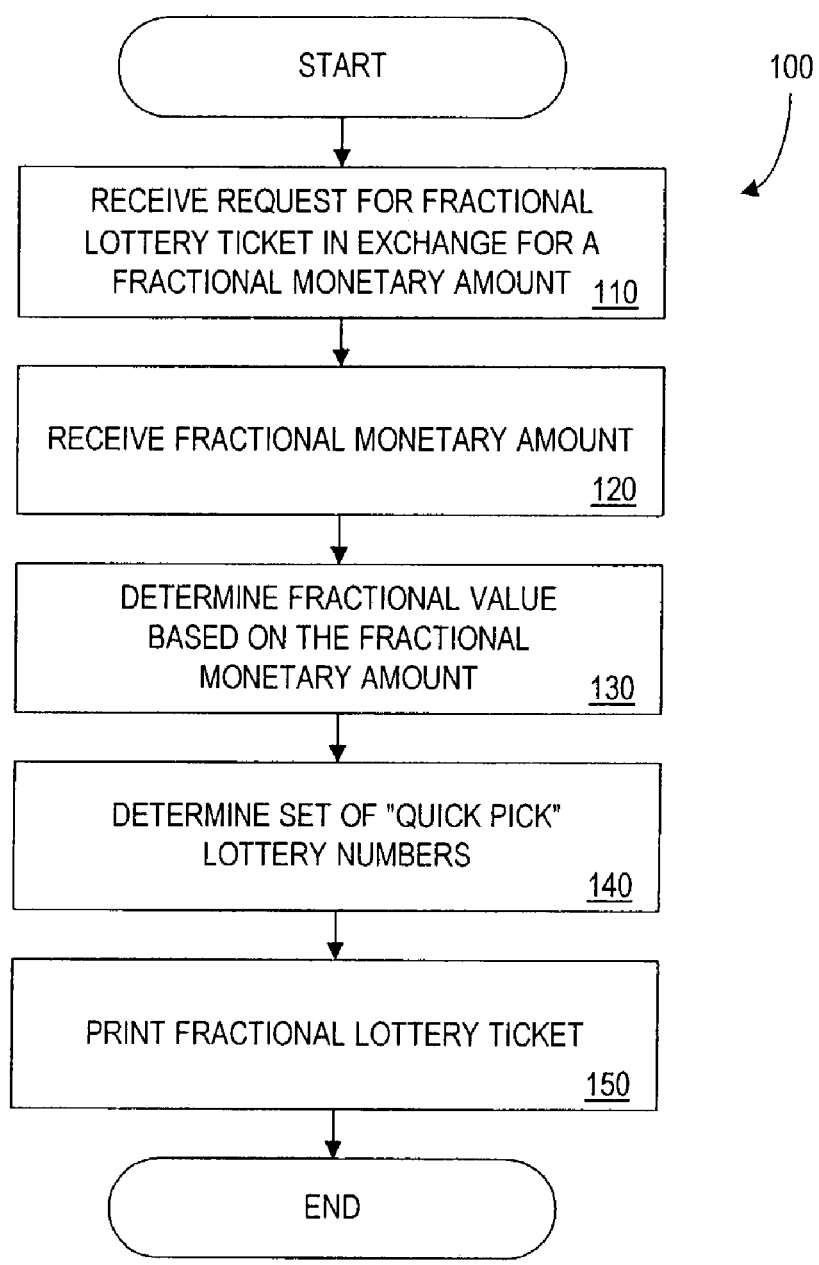
FIG. 1 is a flow chart representing a method in accordance with one or more embodiments of the present invention.

Referring to FIG. 1, a flow chart 100 represents an exemplary embodiment of the present invention that may be performed by a POS terminal, including, without limitation, a vending machine, a lottery terminal or a cash register. The particular arrangement of elements in the flow chart of FIG. 1, as well as the other flow charts discussed herein, is not meant to imply a fixed order to the steps; the steps can be practiced in any order that is practicable for various embodiments of the present invention.

The POS terminal receives an indication of a request by a customer to purchase a fractional lottery ticket in exchange for a monetary amount that is not a whole-number multiple of $1 (e.g., a fractional monetary denomination, such as $0.23, $0.99, or $1.50) (step 110). For example, a customer purchasing a $0.65 candy bar at a vending machine may be due $0.35 from the $1 inserted into the vending machine. The customer requests to purchase a fractional lottery ticket in exchange for $0.35. Of course, the customer may make such a request when no change is due (e.g., the customer requests a fractional lottery ticket for $0.35 at a lottery terminal or vending machine in a stand-alone transaction), when purchasing one or more other items (e.g., the customer requests a fractional lottery ticket costing $0.45 while also purchasing a newspaper), or for an amount of change that is different from an amount due. For example, a customer due $0.57 during a purchase may request a fractional lottery ticket in exchange for $0.32, for $0.60, for $1.57, or any other fractional amount. Thus, a customer may purchase a fractional lottery ticket in exchange for any fractional monetary amount.

The POS terminal receives the monetary amount from the customer (step 120). For example, the customer inserts $0.35 at a vending machine to purchase a fractional lottery ticket. In another example, as will be readily apparent to those skilled in the art, the monetary amount received may be an amount that is owed to the customer (e.g., as change for a purchase), or a portion of such an amount. For example, a customer may provide $1.00 to purchase $0.75 worth of merchandise (that may or may not include other lottery tickets). Accordingly, a portion ($0.25) of the $1.00 received is change owed to the customer, and the customer may decide to purchase a fractional lottery ticket for less than or equal to the $0.25 owed him. Of course, the customer may also provide additional funds if the customer wants to buy a fractional lottery ticket for more than the $0.25 owed him.

In some embodiments, as discussed variously herein, the indication of the customer's request and/or the monetary amount is received in response to an offer by the POS terminal to the customer for the fractional lottery ticket. For example, a vending machine at which a customer is making a purchase may display an offer to the customer to purchase a fractional lottery ticket. According to some embodiments, the request by the customer to purchase the fractional lottery ticket (step 110) may comprise the customer providing the monetary amount to the POS terminal.

The POS terminal determines a fractional value for the lottery ticket based on the monetary amount provided by (or to be provided by) the customer (step 130). For example, if the customer requests a ticket in exchange for $0.37, the POS terminal may determine a value for the lottery ticket of $0.40, $0.37, or $0.35, or another monetary value (or percentage value), based on various criteria discussed herein. Other ways of determining a fractional value for a lottery ticket are described herein, and still others will be apparent to those skilled in the art in light of the present disclosure.

The POS terminal also determines a set of "quick pick" lottery numbers for the fractional lottery ticket (step 140). For example, the POS terminal may request a set of "quick pick" lottery numbers (e.g., generated by the POS terminal or a system controller, from a lottery server, or from a lottery server via a related controller). As is well known to those skilled in the art, lottery numbers may comprise one or more alphanumeric characters (e.g., "01234," "A1234," or "A012B"), or sets of alphanumeric characters (e.g., "01 02D 03," "AB 02 34"). Alternatively, as discussed herein, the POS terminal (or a related controller) may select one or more sets of lottery numbers that are associated with one or more full value lottery tickets (e.g., purchased previous to, subsequent to, or during the fractional lottery ticket purchase), and allocate a portion of the full value lottery ticket based on the determined fractional value. Finally, the POS terminal prints a fractional lottery ticket (step 150). The ticket preferably includes an indication of the fractional value, the set(s) of lottery numbers, and a ticket identifier that uniquely identifies the ticket.

Figure 2:
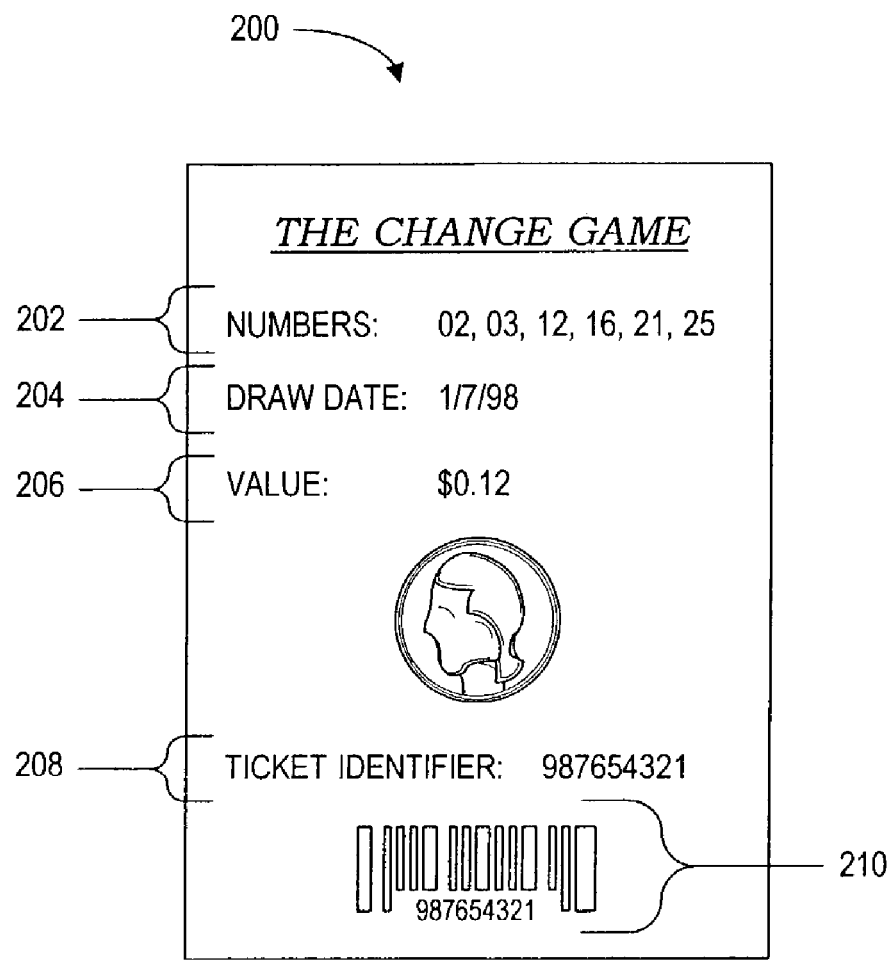
FIG. 2 is a representation of a ticket according to one or more embodiments of the present invention.

FIG. 2 depicts an exemplary ticket 200 that represents a fractional lottery ticket in accordance with one or more embodiments of the present invention. The ticket 200 includes ticket numbers 202 ("02, 03, 12, 16, 21, 25") and an indication of the value 206 ("$0.12") of the ticket 200. The ticket 200 also includes a draw date 204 ("Jan. 7, 1998"). A ticket identifier 208 ("987654321") and a bar code 210 are also included in ticket 200. As discussed further herein, according to some embodiments of the present invention, the ticket identifier 208 and/or the bar code 210 may indicate a record in a database. For example, the ticket identifier 208 and/or the bar code 210 may be used to retrieve a corresponding ticket identifier and portion identifier from a database storing information about issued fractional lottery tickets. The bar code 210 may provide security measures against counterfeiting and allow for machine reading and validation of tickets. Ticket 200 may be printed on paper, such as by a printer at a vending machine, lottery terminal, or other POS terminal.

Ticket 200 is only one example of a fractional lottery ticket. Not all of the information depicted in FIG. 2 is required, and various substitutions, deletions and other changes to the represented ticket will be readily apparent to those of ordinary skill in the art. For example, some embodiments of the present invention may not utilize a bar code and/or may include contractual language corresponding to the lottery game. As discussed further herein, some embodiments may include an indication of a predetermined prize value and/or an indication of a non-monetary payout (or other benefit) that may be won with the ticket. Also, the depicted information, for example, the exemplary forms of ticket identifiers and ticket numbers, are for illustration only. Various other forms of ticket identifiers are described herein, and still others will be readily apparent to those of skill in the art.

In accordance with various embodiments of the present invention, lottery players may purchase fractional lottery tickets at a POS terminal, such as a cash register, lottery terminal, or vending machine. For example, a fractional lottery ticket may be purchased at the request of a customer, and may be the subject of an offer to the customer. As discussed herein, a fractional lottery ticket may be purchased either as a stand-alone transaction or during the purchase of other merchandise. Preferably, the customer is not limited to any preset or fixed fractional prices or values for the lottery tickets. Accordingly, the tickets for a lottery game may be variably priced. For example, a customer may request one or more fractional value "quick pick" lottery tickets and/or one or more full value "quick pick" lottery tickets. Thus, various embodiments of the present invention enable the customer to purchase fractional lottery tickets, which even further facilitates the sale of lottery tickets. In addition, various embodiments of the present invention are applicable to many types of games, besides lotteries, in which prizes are awarded. For example, in accordance with one or more embodiments of the present invention, a customer may purchase a full or fractional value entry in a sweepstakes, contest, lottery or other game.

According to one or more embodiments of the present invention, a fractional game entry has a corresponding value. The value of the fractional game entry may be expressed, for example, as a monetary value, such as $1.34, and/or as a percentage, such as 67%. A game entry having any fractional value can be purchased by a customer; the customer is not limited to any preset or fixed values.

If a game entry is a winner, according to some embodiments of the present invention a share of a prize is provided to the customer, the share of the prize being based on the value of the fractional game entry. In some embodiments, the share of the prize for a winning game entry may be proportional to the amount paid for the game entry. For example, if a customer receives a fractional lottery ticket having a value of $0.34, then the customer may receive a corresponding 34% share (or a 17% share, etc.) of a lottery prize. In other embodiments, the probability of winning may be greater for greater purchase prices. For example, a game entry for which a customer paid $1.50 may have twice as much of a chance of winning as a game entry for which another customer paid $0.75.

Of course, a prize may be shared by more than one winning ticket holder, with each ticket holder receiving a respective share based on the value of his fractional game entry. Thus, according to some embodiments, players' individual winnings may be proportional to the amount they wagered on their winning entries. For example, one customer may receive a 34% share, a second customer a 50% share, and a third customer a 16% share, based on the respective values of their winning fractional lottery tickets (e.g., based on the respective cost of each winning ticket). As will be readily understood by those skilled in the art, the size of a game prize may be based on the total amount wagered for the game. Accordingly, in some embodiments, two or more winners may receive share amounts based on the total amount played for a game (e.g., for a day's drawing) and the respective cost of each winning game entry.

Various other types of prizes may be provided for in accordance with embodiments of the present invention. According to one or more alternative embodiments, a prize amount may be fixed and/or independent of the value of the winning game entry. In one alternative embodiment, a prize for a variably-priced game may comprise a rebate on a product purchased in the transaction. In another embodiment, a prize for winning a game may comprise a discount on a future purchase (e.g., general or product-specific), a voucher for a product, or a product. In some embodiments, a prize may comprise an alternate currency, such as airline miles, telephone minutes, or points in an award redemption program. Other types of prizes are discussed herein; others will be readily apparent to those skilled in the art in light of the present disclosure.

In accordance with one or more embodiments of the present invention, a controller (e.g., a store controller, or a POS controller) determines a monetary value, such as an amount offered by a customer requesting to purchase a lottery ticket, or an amount of spare change due to a customer. The controller also selects a set of ticket numbers. The controller then outputs the information to a POS terminal, which prints a fractional lottery ticket redeemable for a portion of a prize. The fractional lottery ticket includes the ticket numbers and a fractional lottery ticket value that is based on the monetary value. The fractional lottery ticket value may be, for example, equal to the monetary value, or may be the monetary value rounded to the nearest nickel. After a drawing date for the lottery ticket, the customer redeems the fractional lottery ticket, typically at a POS terminal, if a prize is due. The POS terminal communicates with a controller, which receives the ticket numbers and the fractional lottery ticket value therefrom. From the received information, the controller may determine a prize value corresponding to the ticket numbers. The customer is, in turn, provided with a portion of the prize value based on the fractional lottery ticket value. Thus, in some embodiments, a lottery player would only receive a fraction of a winning prize based on the value (e.g., fraction) of the purchased lottery ticket.

In accordance with other various embodiments of the present invention, a POS terminal is connected to a controller (e.g., a POS controller, or a store controller), which in turn is adapted to communicate with a lottery server (e.g., a lottery data processing system). The POS terminal is designed to perform lottery transactions, preferably in addition to merchandise transactions. The POS terminal operator thereupon actuates a pre-programmed key or other coded input on the POS terminal, which causes the terminal to transmit a lottery ticket request to the controller. The controller transmits this request to the lottery server, which carries out the lottery transaction. The lottery server then transmits lottery ticket information back to the POS terminal. In an alternative embodiment, the ticket numbers (e.g., random "quick-pick" lottery numbers) used for a lottery ticket transaction may be generated by the controller. These lottery numbers would then be transmitted to the lottery server.

Accordingly, a customer at a POS terminal can request the purchase of one or more lottery tickets, including full and/or fractional lottery tickets. The customer may make this decision to buy lottery tickets as a stand-alone transaction or during the course of purchasing other merchandise. Thus, some embodiments of the present invention advantageously eliminate the need for a separate lottery ticket system and terminal which in turn eliminates the added costs of the checkout counter space associated therewith. Such embodiments also advantageously provide the consumer greater access to lottery tickets by increasing the number of locations capable of selling lottery tickets. Accordingly, various embodiments of the present invention provide a consumer with a convenient and efficient system to purchase lottery tickets.

Various embodiments of the present invention provide systems and methods for performing integrated lottery ticket and merchandise transactions. Accordingly, a lottery ticket transaction may be performed at a retail POS terminal without a customer having to go to another check-out terminal to make other non-lottery ticket purchases. For example, in about the same amount of time it takes to ring up bread or milk at a POS terminal, the customer can also purchase a "quick-pick" lottery ticket. This one-stop shopping facilitates the sale of lottery tickets, and speeds the customer on his way. This provides the lottery ticket purchaser with a convenient and efficient means of buying lottery tickets while making non-lottery ticket purchases at the POS terminal. The systems and methods provided thus permit speedy and efficient purchasing of lottery tickets while making routine purchases of other goods, encouraging impulse purchasing of lottery tickets without delaying the regular flow of the point-of-sale checkout line.

Systems operable for performing integrated lottery ticket and merchandise transactions are further advantageous for customers who are making other merchandise transactions and who do not wish to receive change (e.g., coins totaling less than a dollar). In particular, in cases where a customer makes other merchandise purchases, instead of receiving change, he can request a fractional lottery ticket (e.g., equal to the change amount). A portion or other value defined by a fractional lottery ticket may thus be based on a change amount that is due in connection with a transaction at a POS terminal. Such an embodiment is advantageous since many customers will welcome an alternative to receiving change. Moreover, receiving something having a high perceived value, such as a fractional lottery ticket, instead of change can be even more attractive to customers. Thus, one or more embodiments of the present invention enable the quick and efficient sale of fractional lottery tickets with what would otherwise be customer change, again encouraging impulse purchases, thereby increasing the market for lottery tickets.

Figure 3:
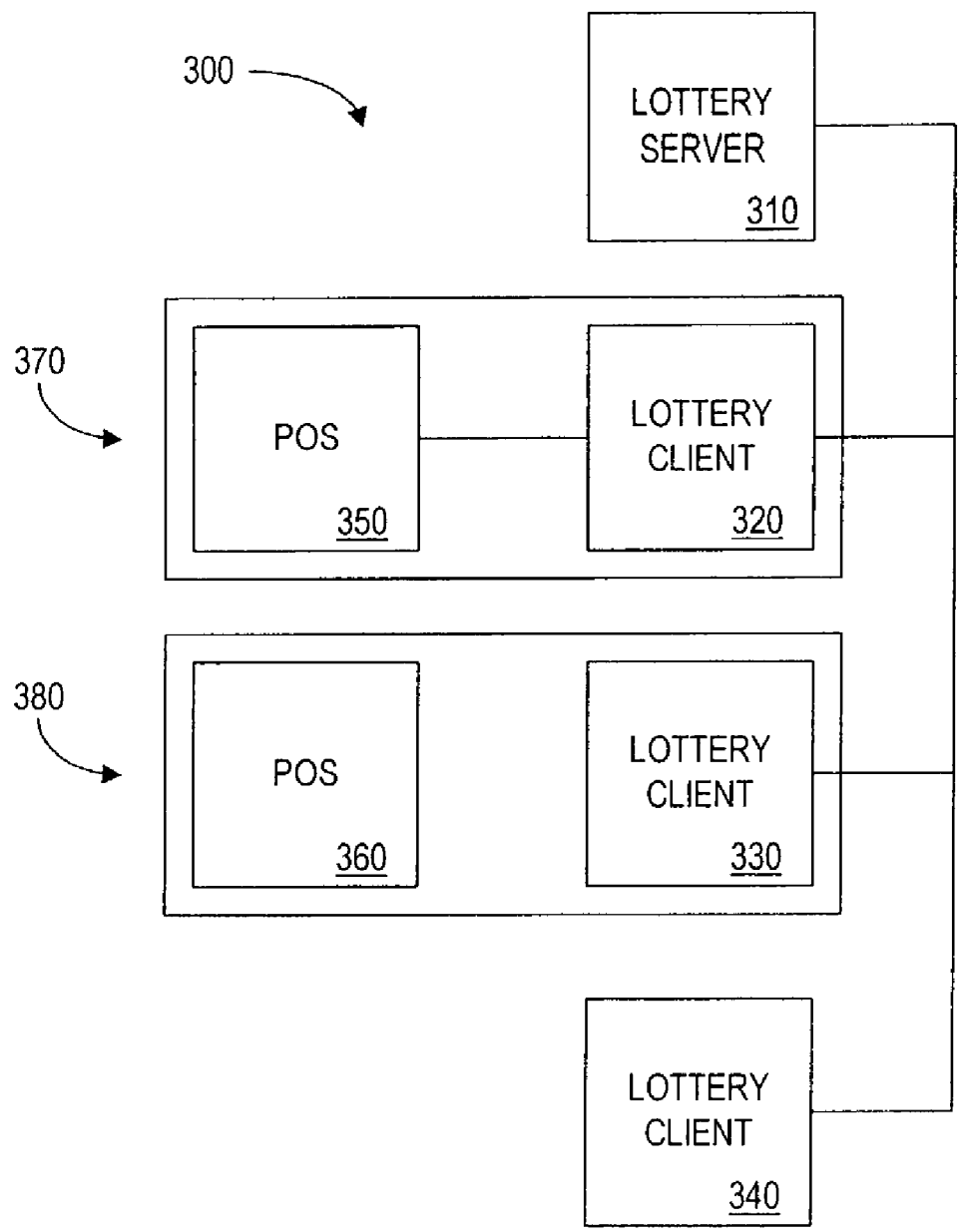
FIG. 3 is a block diagram of an exemplary system according to one or more embodiments of the present invention.

Referring to FIG. 3, an exemplary system 300 comprises lottery clients 320, 330, 340, each of which is in communication, directly or indirectly, with a lottery server 310.

According to various embodiments of the present invention, communication between and among devices depicted in exemplary system 300, as well as in other systems described herein, may take place via a network, including, without limitation, the Internet, wireless network protocol, local area network or a combination thereof; through a Web site maintained by a server (e.g., lottery server 310) on a remote server; or over an on-line data network including, without limitation, commercial on-line service providers and bulletin board systems. In other embodiments, a device (e.g., lottery client 320) may communicate with another device (e.g., lottery server 310) over RF, cable TV, satellite links and the like.

The lottery server 310 is typically controlled by a state lottery agency, and responds to requests from a lottery client 320, 330, 340. For example, the lottery server 310 may issue lottery tickets as requested by a lottery client 320, and may provide the winning numbers for a drawing date (e.g., according to a schedule, or in response to a request by lottery client 320).

Any of lottery clients 320, 330, 340 may comprise a system controller (e.g., a store controller, or a POS controller) and/or a POS terminal (e.g., a cash register, vending machine, or other lottery terminal) enabled to initiate and/or complete fractional lottery ticket transactions. Lottery clients 320, 330, 340 may also be in communication, either directly or indirectly, with one or more POS terminals enabled to initiate and/or complete fractional lottery ticket transactions, preferably in addition to being configured to conduct transactions for other types of merchandise.

For example, as depicted in FIG. 3, the lottery client 320 may be a controller in communication with a POS terminal 350, co-located with the lottery client 320 at a facility 370 (e.g., a convenience store, an office building, or a retail mall). For instance, POS terminal 350 may be a cash register in communication with a store controller for a grocery store, or a vending machine in communication with a POS controller for an office building. In one embodiment, the POS terminal 350 initiates the purchase of a fractional lottery ticket for a customer via the lottery client 320. Although only one POS terminal 350 is shown in communication with the lottery client 320, it will be understood that any number of POS terminals may be in communication with a lottery client. In an alternative embodiment, the lottery client 320 and the POS terminal 350 are not co-located at a facility, but are located remote from one another. Thus, lottery client 320 and POS terminal 350 may be located, for example, in the same store, in different stores, in different stores of a chain of stores, or in other locations.

In another example, as depicted in FIG. 3, the lottery client 330 may be a POS terminal (e.g., a cash register, or a dedicated lottery terminal) co-located with, but not in communication with, another POS terminal 360 at a facility 380. In one embodiment, a customer can make a purchase at the POS terminal 360 and use any received change to purchase a lottery ticket at the lottery client 380. For instance, a convenience store may have one POS terminal that is solely for non-lottery transactions and another POS terminal at which a customer can purchase a lottery ticket.

Of course, any of lottery clients 320, 330, 340 may be in communication with one or more co-located POS terminals, and may not be in communication with one or more other co-located POS terminals.

In yet another example, any of lottery clients 330, 340 and POS terminal 350 may be a POS terminal (e.g., a dedicated lottery terminal) that is capable of performing only transactions for game entries (e.g., lottery ticket transactions).

Although only three lottery clients 320, 330, 340 are shown in communication with lottery server 310 in FIG. 3, any number of lottery clients may be in communication with lottery server 310. Similarly, although only one POS terminal 350 is shown in communication with lottery client 320, a lottery client may be in communication with any number of POS terminals.

The lottery server 310 is typically controlled by a state lottery agency, and responds to requests from a lottery client 320, 330, 33. For example, the lottery server 310 may issue lottery tickets as requested by a lottery client 320, 330, 340, and may provide the winning numbers for a drawing date to one or more lottery clients.

Those skilled in the art will understand that devices described herein as being in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

Figure 4:
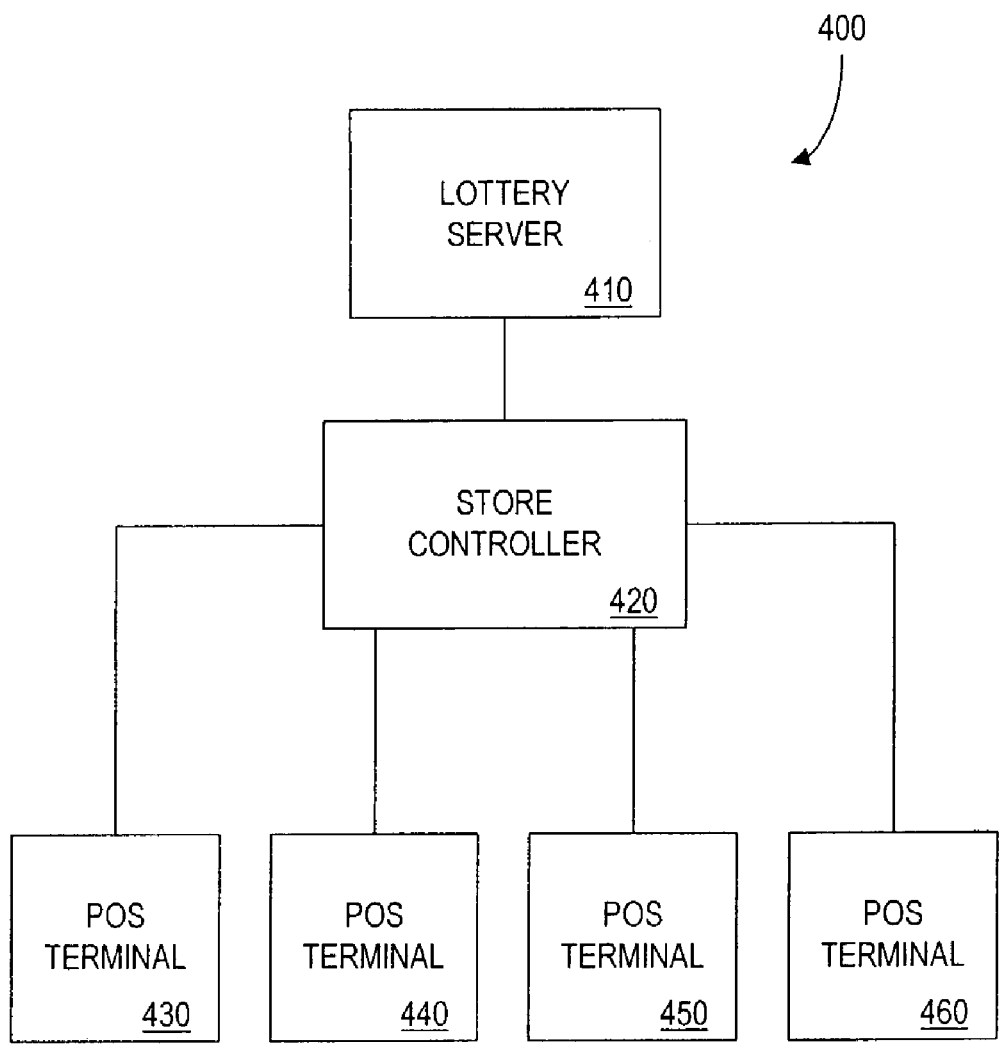
FIG. 4 is a block diagram of an exemplary system according to one or more embodiments of the present invention.

Referring to FIG. 4, an alternative exemplary network 400 comprises a store controller 420 that is in communication with a lottery server 410 and with POS terminals 430, 440, 450, 460. The POS terminals 430, 440, 450, 460, which are typically cash registers or other terminals (e.g., vending machines, or lottery terminals), or any combination thereof, may initiate and/or complete fractional lottery ticket transactions. Although four POS terminals are shown in FIG. 4, any number of POS terminals may be in communication with the store controller 420. The POS terminals 430, 440, 450, 460 may be located in the same store, in different stores of a chain of stores, or in other locations.

The store controller 420 preferably directs the operation of, stores data from, and transmits data to the POS terminals 430, 440, 450, 460. The store controller 420 may itself be a POS terminal, or may be another computing device that can communicate with one or more POS terminals (e.g., a POS controller). As described herein, the lottery server 410 is typically controlled by a state lottery agency, and may provide lottery ticket numbers and/or winning ticket information in response to a request by store controller 420.

Figure 5:
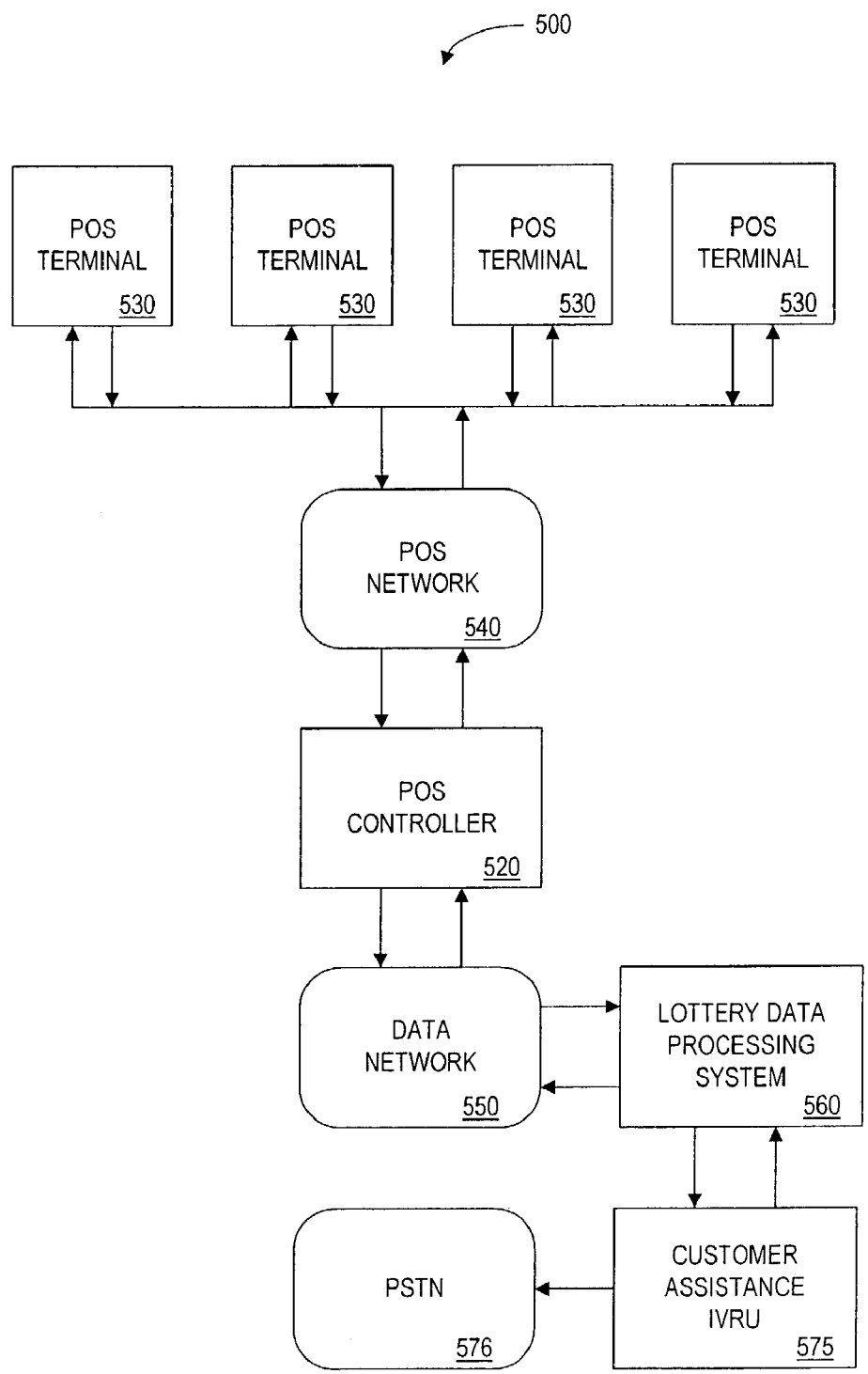
FIG. 5 is a block diagram of an exemplary system according to one or more embodiments of the present invention.

FIG. 5 shows yet another exemplary system 500 in accordance with one or more embodiments of the present invention. A POS controller 520 is linked to at least one POS terminal 530 via a POS network 540. Four POS terminals 530 are depicted in FIG. 5, but any number of POS terminals 530 can be used. A lottery ticket transaction can be initiated from any one of the POS terminals 530. The information required to initiate a lottery ticket transaction is passed between the POS terminal 530 and the POS controller 520 via the POS network 540. It is understood that other types of information can also be passed between the POS terminal 530 and the POS controller 520. For example, merchandise prices, coupon discounts, and sales event information can also be passed between the POS terminals 530 and the POS controller 520.

As illustrated in FIG. 5., the POS controller 520 is also linked to a lottery data processing system 560 via a data network 550. The data network 550 can be any one or more of a variety of networks capable of data communications, as discussed variously herein. For example, the data network 550 can be a public switched telephone network (PSTN), an integrated service digital network (ISDN), a packet switched network, a private data communication network, a wireless network or any other suitable network described herein, known to those skilled in the art, or readily apparent in light of the present disclosure.

The POS terminals 530 and the POS controller 520 depicted in FIG. 5 may be embodied in hardware specifically provided to implement the present invention. Alternatively, they may be implemented using existing cash registers and central in-store servers. In particular, many retail stores have computerized cash registers which are coupled to an in-store transaction processor to receive and transmit merchandise price and other merchandise information. The hardware of these systems may be used for various embodiments of the present invention. To incorporate some embodiments of the present invention, changes to the existing in-store transaction processor or store network server may be accomplished in various ways, such as reprogramming the existing in-store transaction processor or by adding an additional file server.

Figure 6:
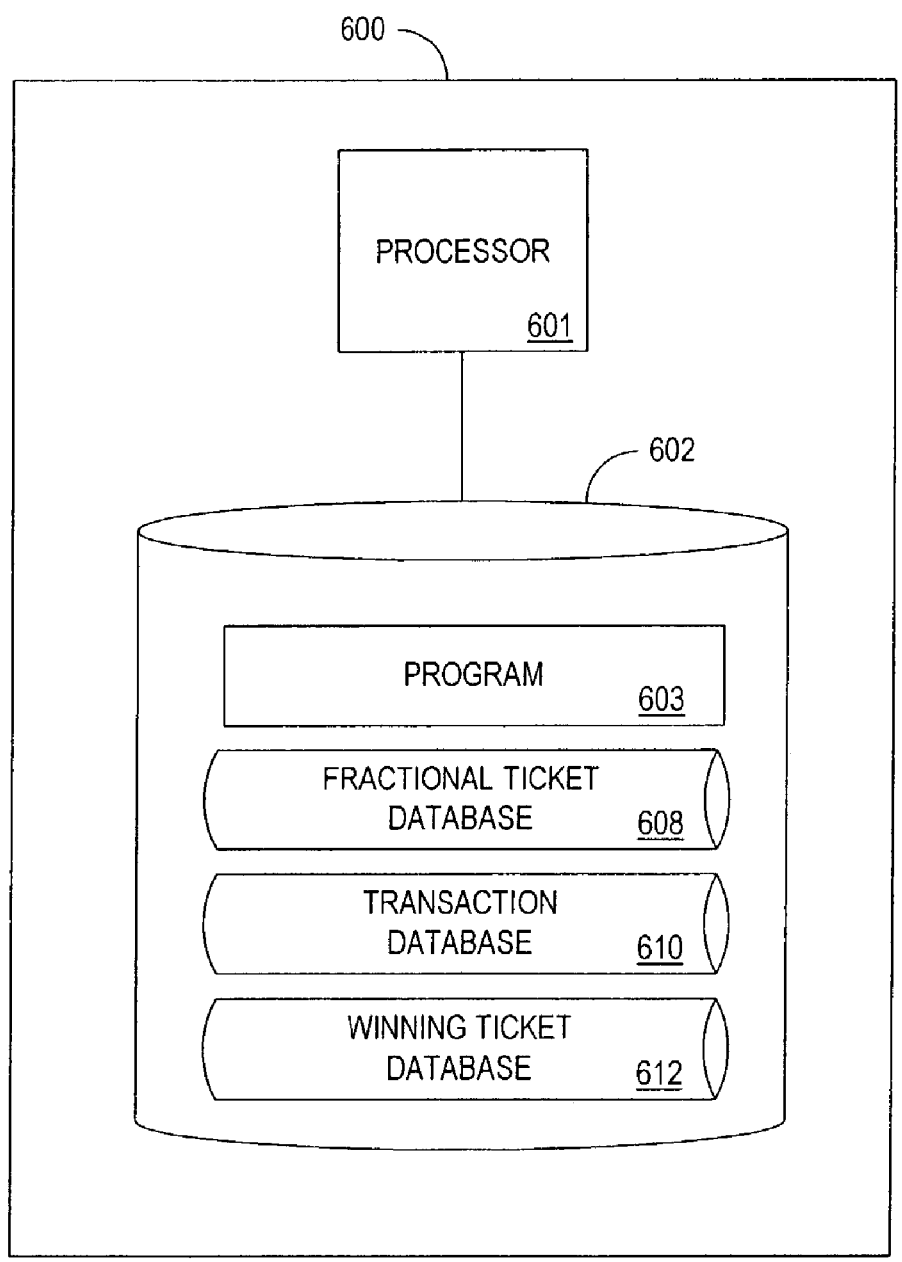
FIG. 6 is a block diagram of an exemplary lottery client according to one or more embodiments of the present invention.

FIG. 6 illustrates an exemplary embodiment 600 of the lottery client 340 (FIG. 3). The depicted lottery client 600 may be implemented, for example, as a system controller, a POS terminal, a dedicated hardware circuit, an appropriately programmed general-purpose computer, or any other appropriate device including, without limitation, electronic, mechanical or electromechanical devices. According to some embodiments, as discussed herein, the lottery server 600 may be in communication (e.g., via a communications port) with one or more other devices (e.g., a lottery server, or one or more POS terminals).

The lottery client 600 of the illustrated embodiment comprises a processor 601, such as one or more INTEL® PENTIUM® microprocessors. The processor 601 is in communication with a data storage device 602. The data storage device 602 comprises magnetic memory, optical memory, semiconductor memory or any combination thereof. The data storage device 602 may include, for example, Random Access Memory (RAM), Read-Only Memory (ROM), a compact disc and/or a hard disk. The processor 601 and the storage device 602 may each be, for example: (i) located entirely within a single computer or computing device; or (ii) connected to each other by a remote communication medium including, without limitation, a serial port cable, a telephone line, a network connection or a radio frequency transceiver. In some embodiments, the lottery client 600 may comprise one or more computers that are connected to a remote server computer for maintaining databases.

The data storage device 602 stores a program 603 for controlling the processor 601. The processor 601 performs instructions of the program 603, and thereby operates in accordance with the present invention, and particularly in accordance with the methods described in detail herein. The program 603 may be stored in a compressed, uncompiled and/or encrypted format, as well as in a variety of other forms known in the art. The program 603 furthermore includes program elements that may be necessary, including, without limitation, an operating system, a database management system and "device drivers" for allowing the processor 601 to interface with one or more peripheral devices. Appropriate program elements are well known to those skilled in the art, and need not be described in detail herein.

According to some embodiments of the present invention, the instructions of the program 603 may be read into a main memory from another computer-readable medium, such as into RAM from a hard drive or ROM. Execution of sequences of the instructions in program 603 causes processor 601 to perform process steps described herein. In alternative embodiments, hard-wired circuitry may be used in place of, or in combination with, software instructions for implementation of one or more processes of the present invention, as would be understood by those of skill in the art. Thus, embodiments of the present invention are not limited to hardware, software or any specific combination of hardware and software.

The exemplary storage device 602 also stores (i) a fractional ticket database 608; (ii) a transaction database 610; and (iii) a winning ticket database 612. The databases are described in detail herein and depicted with exemplary entries in accompanying figures. As will be understood by those skilled in the art, the schematic illustrations and accompanying descriptions of any databases presented herein are exemplary arrangements for stored representations of information. A number of other arrangements may be employed besides those suggested by the tables shown.

For example, those skilled in the art will understand that the number and/or content of the databases can be different from those illustrated herein. For instance, the winning ticket database 612 may not be desired in some embodiments. In another example, the storage device 602 may store an additional ticket database for storing information about full value tickets, or, alternatively, may store information about fractional and full value game entries in a single ticket database, as described herein. In yet another example, a transaction database may be used to store information about both lottery and non-lottery transactions, including information about issued lottery tickets; a separate ticket database may not be necessary. Similarly, the illustrated entries of the databases represent exemplary information only; those skilled in the art will understand that the number and/or content of the entries can be different from those illustrated herein. Based on the present disclosure many other arrangements of data will be readily understood by those of skill in the art.

In some alternative embodiments, the random "quick-pick" numbers used for a lottery ticket transaction may be generated by the lottery client 600 (e.g., using a random number generator in communication with processor 601). These lottery numbers could then be transmitted to a lottery server (e.g., lottery server 310).

Figure 7:
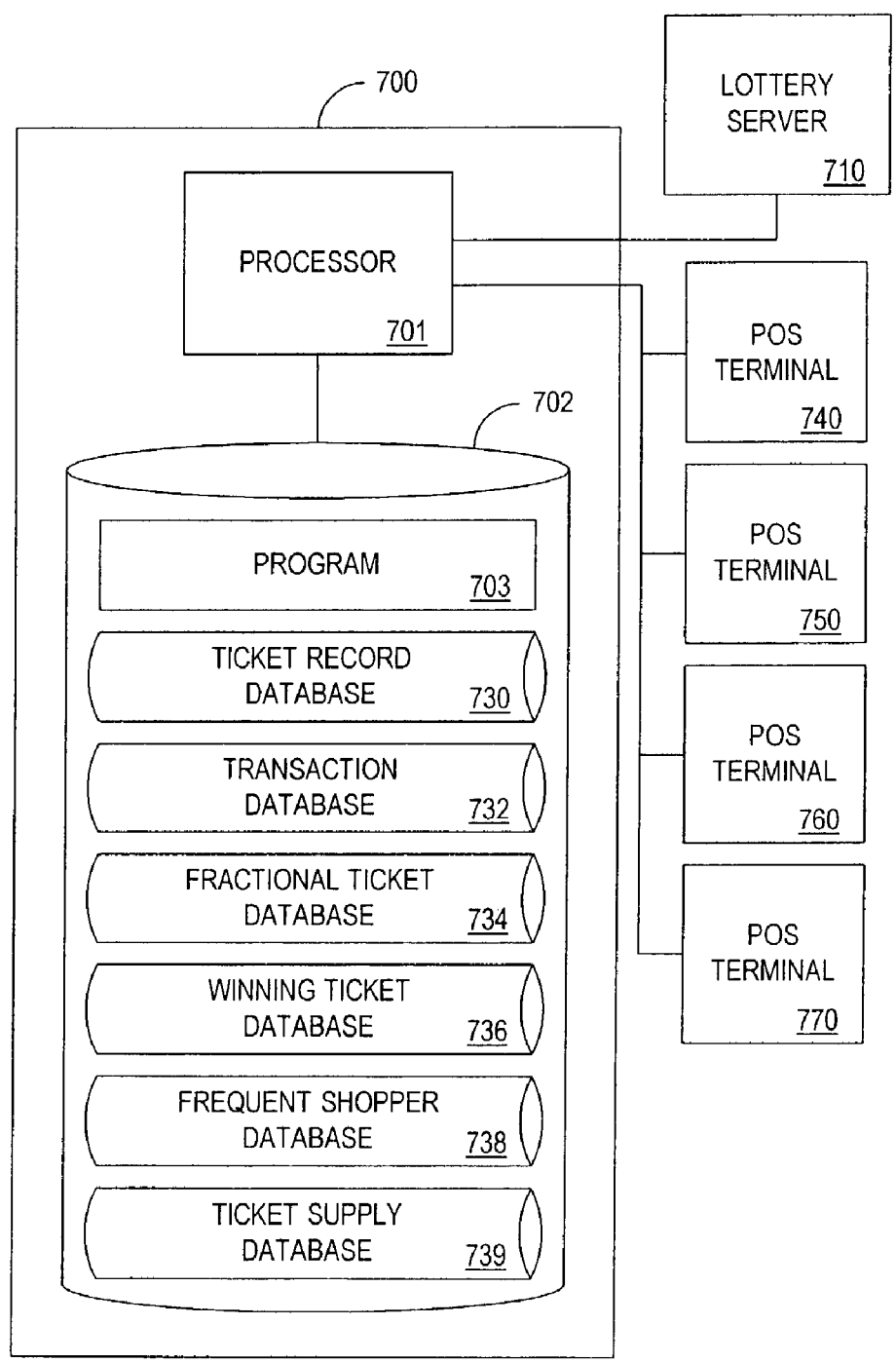
FIG. 7 is a block diagram of an exemplary controller according to one or more embodiments of the present invention.

FIG. 7 illustrates an exemplary embodiment 700 of a controller (e.g., store controller 420 (FIG. 4), or POS controller 520 (FIG. 5)). The depicted controller 700 may be implemented, for example, as a system controller, a POS terminal, a dedicated hardware circuit, an appropriately programmed general-purpose computer, or any other appropriate device including, without limitation, electronic, mechanical or electromechanical devices.

The controller 700 of the illustrated embodiment comprises a processor 701, such as one or more INTEL® PENTIUM® microprocessors. The processor 701 is in communication with a data storage device 702. The data storage device 702 comprises magnetic memory, optical memory, semiconductor memory or any combination thereof. The data storage device 702 may include, for example, Random Access Memory (RAM), Read-Only Memory (ROM), a compact disc and/or a hard disk. The processor 701 and the storage device 702 may each be, for example: (i) located entirely within a single computer or computing device; or (ii) connected to each other by a remote communication medium including, without limitation, a serial port cable, a telephone line, a network connection or a radio frequency transceiver. In some embodiments, the lottery client 700 may comprise one or more computers that are connected to a remote server computer for maintaining databases.

The data storage device 702 stores a program 703 for controlling the processor 701. The processor 701 performs instructions of the program 703, and thereby operates in accordance with the present invention, and particularly in accordance with the methods described in detail herein. The program 703 may be stored in a compressed, uncompiled and/or encrypted format, as well as in a variety of other forms known in the art. The program 703 furthermore includes program elements that may be necessary, including, without limitation, an operating system, a database management system and "device drivers" for allowing the processor 701 to interface with one or more peripheral devices. Appropriate program elements are well known to those skilled in the art, and need not be described in detail herein.

According to some embodiments of the present invention, the instructions of the program 703 may be read into a main memory from another computer-readable medium, such as into RAM from a hard drive or ROM. Execution of sequences of the instructions in program 703 causes processor 701 to perform process steps described herein. In alternative embodiments, hard-wired circuitry may be used in place of, or in combination with, software instructions for implementation of one or more processes of the present invention, as would be understood by those of skill in the art. Thus, embodiments of the present invention are not limited to hardware, software or any specific combination of hardware and software.

The exemplary storage device 702 also stores (i) a ticket record database 730; (ii) a transaction database 732; (iii) a fractional ticket database 734; (iv) a winning ticket database 736; (v) a frequent shopper database 738; and (vi) an optional ticket supply database 739. The databases are described in detail herein and depicted with exemplary entries in accompanying figures. Based on the present disclosure many other arrangements of data will be readily understood by those of skill in the art. For example, according to one or more alternative embodiments discussed herein, the storage device 702 need not store a ticket supply database, a winning ticket database, and/or a frequent shopper database.

As depicted in FIG. 7, the processor 701 is also preferably in communication with a lottery server 710 (e.g., operated by or on behalf of a state lottery agency) and with one or more POS terminals 740, 750, 760, 770 (e.g., cash registers, lottery terminals, and/or vending machines) for processing lottery transactions. Various types of lottery servers and POS terminals are discussed herein.

Figure 8:
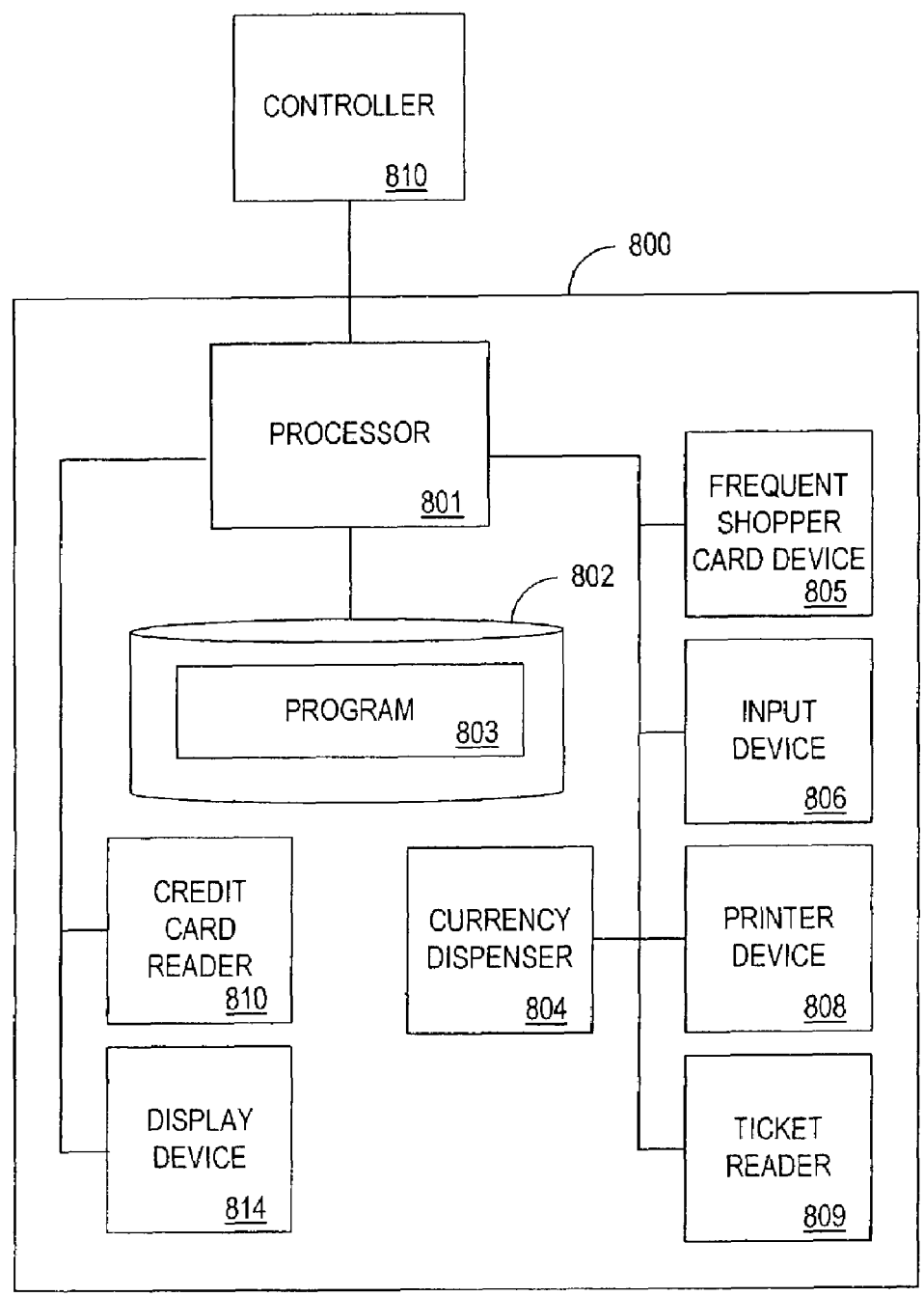
FIG. 8 is a block diagram of an exemplary POS terminal according to one or more embodiments of the present invention.

FIG. 8 illustrates an exemplary embodiment 800 of a POS terminal. Well-known examples of POS terminals include cash registers, vending machines, automatic teller machines, and kiosks. The POS terminal 800 may be implemented as a system controller, a dedicated hardware circuit, an appropriately programmed general-purpose computer, or any other appropriate device including, without limitation, electronic, mechanical or electromechanical devices. One or more POS terminals 800 may be located, for example, at a supermarket, grocery store, quick-serve restaurant, toll booth, stadium, retail mall, office building, liquor store or any other location where consumer transactions may be performed.

The POS terminal 800 of the illustrated embodiment comprises a processor 801, such as one or more INTEL® PENTIUM® microprocessors. The processor 801 is in communication with a data storage device 802. The data storage device 802 comprises magnetic memory, optical memory, semiconductor memory or any combination thereof. The data storage device 802 may include, for example, Random Access Memory (RAM), Read-Only Memory (ROM), a compact disc and/or a hard disk. The processor 801 and the storage device 802 may each be, for example: (i) located entirely within a single computer or computing device (e.g., a cash register, vending machine, kiosk, or similar enclosure); (ii) connected to each other by a remote communication medium, including, without limitation, a serial port cable, a telephone line, a network connection or a radio frequency transceiver, or (iii) some combination thereof. In some embodiments, the POS terminal may comprise one or more computers that are connected to a remote server computer for maintaining databases. For example, the processor 801 may comprise one or more cash registers connected to a remote server computer for maintaining databases, or a vending machine connected to a local computer. Many types of conventional cash registers and other types of POS terminals may be used to implement the present invention in light of the present disclosure.

The data storage device 802 stores a program 803 for controlling the processor 801. The processor 801 performs instructions of the program 803, and thereby operates in accordance with the present invention, and particularly in accordance with the methods described in detail herein. The program 803 may be stored in a compressed, uncompiled and/or encrypted format, as well as in a variety of other forms known in the art. The program 803 furthermore includes program elements that may be necessary, including, without limitation, an operating system, a database management system and "device drivers" for allowing the processor 801 to interface with one or more peripheral devices. Appropriate program elements are well known to those skilled in the art, and need not be described in detail herein.

According to an embodiment of the present invention, the instructions of the program 803 may be read into a main memory from another computer-readable medium, such as into RAM from a hard drive or ROM. Execution of sequences of the instructions in program 803 causes processor 801 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

Processor 801 preferably performs instructions of the program 803 to process a variety of types of transactions, including lottery transactions and/or non-lottery transactions. For example, POS terminal 801 is preferably operable to conduct sales of "quick pick" lottery tickets, lottery tickets other than "quick pick" tickets, and other types of merchandise transactions.

The processor 801 may also be in communication with a currency dispenser 804, which dispenses coins and/or bills to people that have requested to have funds be dispensed. In another example, the currency dispenser 804 may dispense bills and/or coins without a request by a customer to have funds be dispensed (e.g., a vending machine may dispense currency automatically in response to a signal from the processor 801). The currency dispenser 804 may alternatively be a cash drawer that may be automatically opened upon command from the processor 801.

The processor 801 may also be in communication with a frequent shopper card device 805, which performs functions related to frequent shopper cards, such as reading frequent shopper cards and communicating information read from such cards to the processor 801.

The processor 801 may also be in communication with an input device 806, which receives input from a cashier, customer or other operator of the POS terminal. Input device 806 may comprise a variety of devices, including, without limitation, one or more buttons, touch screens, handles, keypads, pointer devices (e.g., a mouse, or trackball), microphones, optical scanners (e.g., a bar code scanner) or any combination of the above. Input device 806 may be used for transmitting input signals, such as signals indicative of a purchase (e.g., a customer selection of an item), to the processor 801.

The processor 801 may also be in communication with a printer device 808, which may be commanded to print onto a substrate, such as paper or other material. Printing may be via ink jet, laser printing or other methodology for registering indicia on a substrate. Alternatively, the substrate may be registered with indicia by deforming the substrate in a variety of ways known in the art, including, without limitation, punching holes in the substrate and raising or lowering portions of the substrate relative to other portions. The printer device 808 may be used for printing, e.g., receipts, coupons, vouchers, and/or game tickets.

The processor 801 may also be in communication with a ticket reader 809, which is capable of reading, for example, receipts, coupons, vouchers and/or game tickets, and particularly indicia registered on any such substrates. The ticket reader 809 may use optical sensing of printed indicia, for example, and optical character recognition to read indicia from a lottery ticket inserted in the ticket reader 809.

The processor 801 may also be in communication with a credit card reader 810. Such devices are known in the art, and generally allow a card such as a credit card or debit card to be inserted therewithin. The card may include a magnetic stripe or other form of data storage, which the credit card reader 810 is capable of sensing and interpreting. Typically, the credit card reader allows a credit card transaction to be processed by communication with a credit card clearinghouse in a manner known in the art.

The processor 801 may also be in communication with a display device 814, which displays images, including alphanumeric characters and/or other graphics, in a manner known in the art. Display device 814 may be used to communicate information to a cashier, a customer, a passer-by, and/or another operator of the POS terminal (e.g., a servicing or maintenance agent). Typical display devices include, without limitation, liquid crystal displays, plasma displays and video display monitors. Display device 814 may comprise one or more display devices. For example, one display device may be used to display an offer to a customer (or to an operator for presentation to a customer), and another device may be used to communicate information about a purchase to the buyer.

Any of the described devices in communication with processor 801 (e.g., input device(s) 806, or printer device 808) may interface directly with the processor 801. Alternatively, an appropriate interface circuit may be placed between the processor 801 and the device. The processor 801 and one or more of the described devices may each be, for example: (i) located entirely within a single computer or computing device, such as a vending machine, cash register, or other terminal; (ii) connected to each other by a remote communication medium, including, without limitation, a serial port cable, a telephone line, a network connection or a radio frequency transceiver; or (iii) some combination thereof. In some embodiments, the POS terminal may comprise a vending machine that is connected to one or more peripheral devices (e.g., for printing tickets, or for displaying transaction information).

According to some alternative embodiments, POS terminal 800 may incorporate some features of a controller (e.g., controller 420 (FIG. 4)), so that the integrated POS terminal/controller can function as a stand-alone unit. This type of terminal would be advantageous for establishments that only require a single POS terminal.

According to some other alternative embodiments, POS terminal 800 comprises a first device in communication with a second device via a medium for remote communication. The first device, which may be a cash register, for example, comprises one or more input devices, a display device, and a first processor operable to perform some of the functions of the processor 801 described herein. The second device, for example, comprises a storage device, a printer device and a second processor which performs some of the described functions of processor 801. The second device may be, for example, a processing system operated by an electronic marketing service or credit card clearinghouse. In another example, the first device may be a vending machine, and the second device may be an electronic peripheral device or system for printing fractional lottery tickets, receipts, coupons and/or vouchers, in accordance with data received from the vending machine. Other configurations of the exemplary POS terminal 800 will be understood by those skilled in the art.

Figure 9:
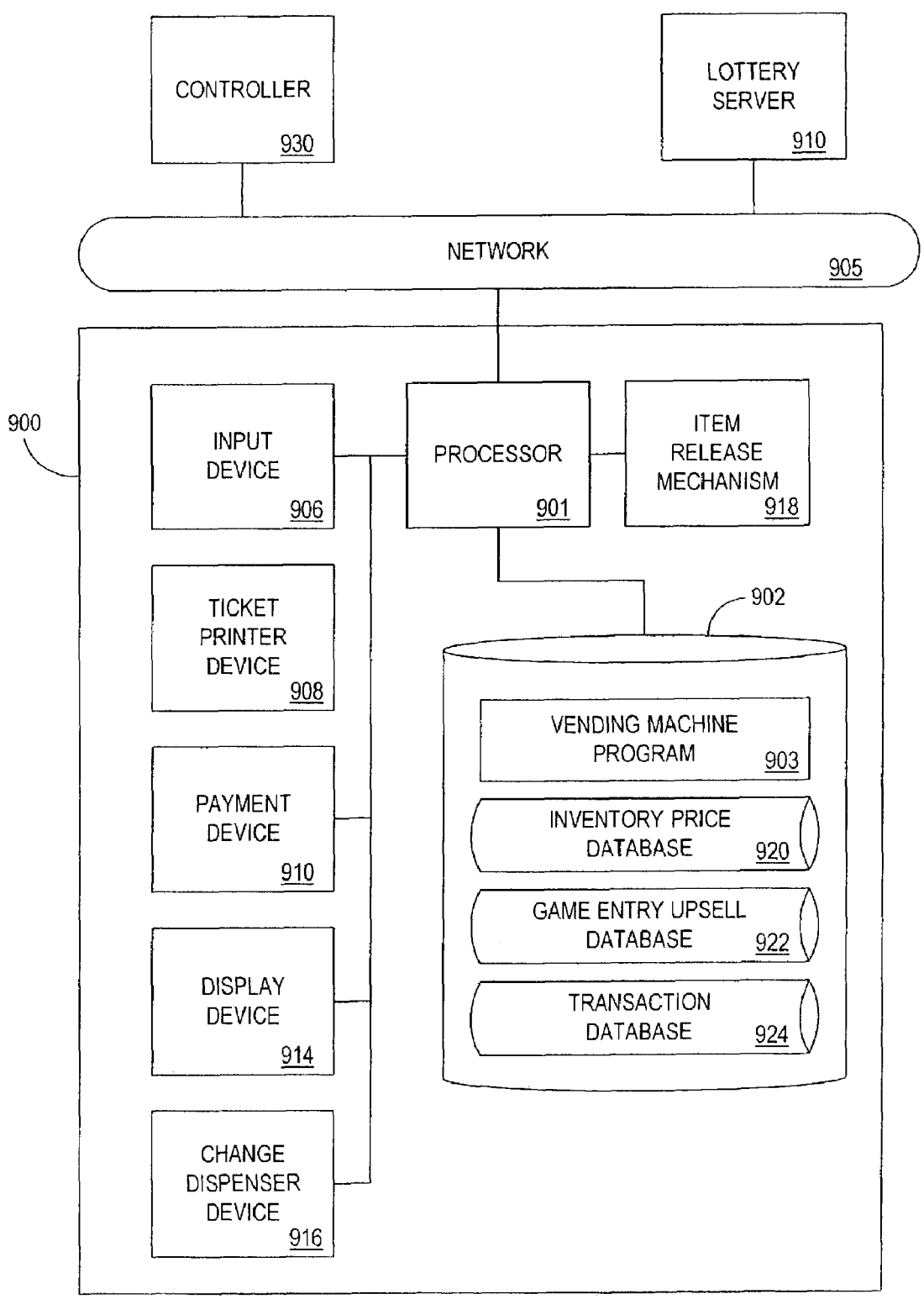
FIG. 9 is a block diagram of an exemplary vending machine according to one or more embodiments of the present invention.

Referring to FIG. 9, an exemplary vending machine 900 is depicted in accordance with one or more embodiments of the present invention. The vending machine 900 may be implemented as a dedicated hardware circuit, an appropriately programmed general-purpose computer, or any other appropriate device including, without limitation, electronic, mechanical or electromechanical devices.

The vending machine 900 of the illustrated embodiment comprises a processor 901, such as one or more INTEL® PENTIUM® microprocessors. The processor 901 is in communication with a data storage device 902. The data storage device 902 comprises magnetic memory, optical memory, semiconductor memory or any combination thereof. The data storage device 902 may include, for example, Random Access Memory (RAM), Read-Only Memory (ROM), a compact disc and/or a hard disk. The processor 901 and the storage device 902 may each be, for example: (i) located entirely within a single vending machine, or similar enclosure; (ii) connected to each other by a remote communication medium, including, without limitation, a serial port cable, a telephone line, a network connection or a radio frequency transceiver; or (iii) some combination thereof. In some embodiments, the vending machine may comprise one or more computers that are connected to a remote server computer for maintaining databases. For example, the processor 901 may comprise a vending machine in communication with a local computer.

The processor 901 is in communication with an input device 906, a ticket printer 908, a payment device 910, a display device 914, a change dispenser device 916, and an item release mechanism 918.

Many types of input devices, printers, payment devices, change dispenser devices, item release mechanisms, and display devices are known to those skilled in the art and others may be described in further detail herein.

For example, the input device 906 may be a keypad for transmitting input signals, such as signals indicative of a purchase (e.g., actuated buttons corresponding to a selected item), to the processor 901. The ticket printer 908 may be one of various printer devices for registering indicia on a portion of a roll of paper or other material, thereby printing lottery tickets, receipts, coupons and vouchers as commanded by the processor 901. The payment device 910 preferably comprises at least one of a bill acceptor, a coin acceptor, and a credit card reader. The change dispenser device 916 preferably dispenses change to a customer as necessary (e.g., at the completion of a transaction if a monetary amount is due the customer). The item release mechanism 918 preferably is operable in response to one or more signals from the processor 901 to release one or more vending items (e.g., an item, such as a candy bar, purchased by the customer).

The storage device 902 preferably stores a vending machine program 903 for controlling the processor 901 in accordance with various embodiments of the present invention, and particularly in accordance with the processes described in detail herein. The program 903 also includes necessary program elements, such as "device drivers" for interfacing with each of various devices in communication with the processor 901 (e.g., input device 906, display device 914, etc.). Appropriate device drivers and other necessary program elements are known to those skilled in the art, and need not be described in detail herein.

The storage device 902 furthermore preferably stores (i) an inventory price database 920, (ii) a game entry upsell database 922, and (iii) a transaction database 924. Inventory price database 920 preferably includes products and corresponding product prices in a conventional manner and is not discussed in detail herein. The inventory price database 920 may be used by the processor 901, for example, to calculate a total purchase price of one or more vending products.

The game entry upsell database 922 stored in the storage device 902 preferably includes upsells and corresponding upsell prices, as described variously herein. The transaction database 924 preferably stores records corresponding to purchases made at the vending machine 900 (including purchases of one or more game entries, such as a lottery ticket), and may be provided for in various ways described herein. Representative upsell databases and transaction databases are described in detail herein and depicted with exemplary entries in accompanying figures.

According to some embodiments of the present invention, upon receiving an input indicating selection of a game entry (e.g., a lottery ticket) for a stand-alone purchase or in response to an offer in exchange for an amount of change due (e.g., an upsell offer), the vending machine 900 may generate a unique identifier to identify the game entry, and may further create and/or update a corresponding entry in the transaction database 924. For example, if a customer accepts an upsell offer for a lottery ticket having a fractional value in exchange for a round-up amount (e.g., based on an amount of change due), the unique identifier and the round-up amount may be stored in a corresponding record in the transaction database 924. Thus, according to some embodiments, when a winning entry is determined, the vending machine 900 is able to determine the round-up amount corresponding to the entry, and thereby determines the prize value.

Processor 901 is depicted in FIG. 9 as being in communication with each of a controller 930 and a lottery server 910 via a network 905. Processor 901 may thus communicate inventory information, upsell offer information, lottery information, and/or transaction information with controller 930 (e.g., a system controller operated by or on behalf of a store, vending machine item supplier, vending machine owner, or other merchant). For example, processor 901 may transmit information regarding completed transactions to controller 930 and/or may receive updates to inventory price database 920 and/or upsell offer database 930. Similarly, processor 901 may communicate various types of information with lottery server 910. For example, the processor 901 may request one or more lottery tickets from lottery server 910 on behalf of a customer, and/or may verify whether a lottery ticket is a winning game entry, as discussed herein.

According to some embodiments of the present invention, the controller 930, which may be a server operated by or on behalf of a merchant, may perform some of the functions of the processor 901 of FIG. 9. Alternatively, or in addition, the lottery server 910 may perform some of the functions of the processor 901 of FIG. 9. The lottery server 910 may be, for example, a processing system operated by a state lottery agency. In some embodiments, the processor 901 may not communicate directly with the lottery server 910, but may communicate with the lottery server 910 indirectly via the controller 930.

Although described herein as a vending machine, various features described herein with respect to exemplary vending machine 900 may be used with various other types of POS terminals and/or system controllers, as practicable for the desired application. For example, an upsell database, transaction database, and/or inventory price database may be stored at a storage device in communication with a cash register and/or a store controller.

According to some alternative embodiments of the present invention, a POS terminal preferably also stores (e.g., in a storage device) a required payment amount, which is an amount of money expected to be paid in return for one or more products provided to the customer. From the required payment amount, the processor and/or controller (if any) may determine, for example, an amount of change due, and the total amount of money that should have been collected by the POS terminal at the end of a day. Those skilled in the art will note that the required payment amount may comprise a single stored value, or a plurality of values, each of which corresponds to an amount of money expected to be paid for one or more products. A POS terminal thus may calculate a total purchase price of one or more products, as is well known in the art, and store the total purchase price as the required payment amount.

Figure 10:
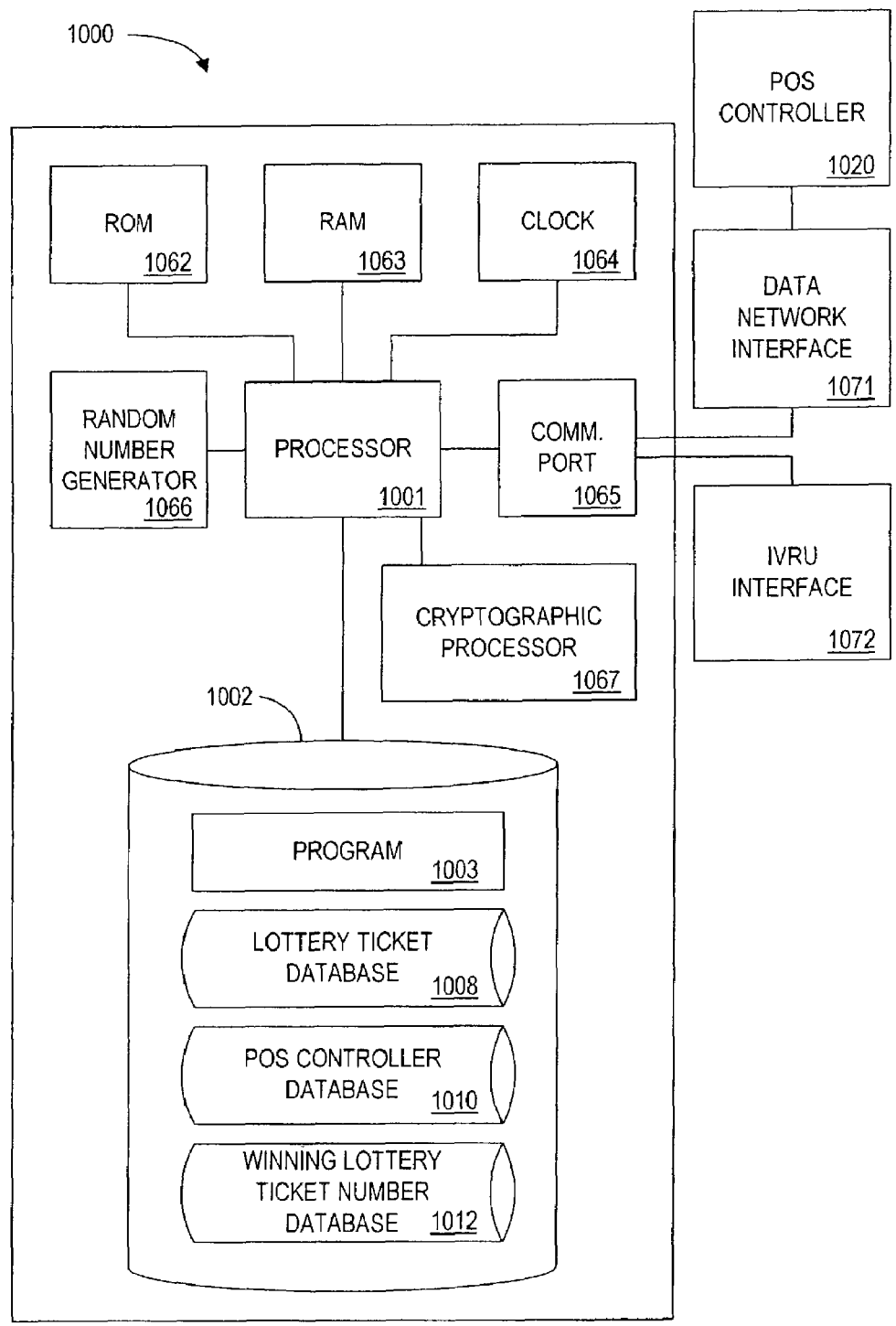
FIG. 10 is a block diagram of an exemplary lottery server according to one or more embodiments of the present invention.

FIG. 10 illustrates an exemplary embodiment 1000 of a lottery server (e.g., lottery server 310 (FIG. 3)). The lottery server 1000 is typically controlled by a state lottery agency. The lottery server 1000 may be implemented as a system controller, a dedicated hardware circuit, an appropriately programmed general-purpose computer, or any other appropriate device including, without limitation, electronic, mechanical or electromechanical devices.

The lottery server 1000 of the illustrated embodiment comprises a processor 1001, such as one or more INTEL® PENTIUM® microprocessors. The processor 1001 is in communication with a data storage device 1002. The data storage device 1002 comprises magnetic memory, optical memory, semiconductor memory or any combination thereof. The data storage device 1002 may include, for example, Random Access Memory (RAM), Read-Only Memory (ROM), a compact disc and/or a hard disk. The processor 1001 and the storage device 1002 may each be, for example: (i) located entirely within a single computer or computing device; (ii) connected to each other by a remote communication medium, including, without limitation, a serial port cable, a telephone line, a network connection or a radio frequency transceiver; or (iii) some combination thereof. In some embodiments, the lottery server 1000 may comprise one or more computers that are connected to a remote server computer for maintaining databases.

The data storage device 1002 stores a program 1003 for controlling the processor 1001. The processor 1001 performs instructions of the program 1003, and thereby operates in accordance with the present invention, and particularly in accordance with the methods described in detail herein, thereby enabling the processor 1061 to process lottery transactions. The program 1003 may be stored in a compressed, uncompiled and/or encrypted format, as well as in a variety of other forms known in the art. The program 1003 furthermore includes program elements that may be necessary, including, without limitation, an operating system, a database management system and "device drivers" for allowing the processor 1001 to interface with one or more peripheral devices. Appropriate program elements are well known to those skilled in the art, and need not be described in detail herein.

According to one or more embodiments of the present invention, the instructions of the program 1003 may be read into a main memory from another computer-readable medium, such as into RAM from a hard drive or ROM.

Execution of sequences of the instructions in program 1003 causes processor 1001 to perform process steps described herein. In alternative embodiments, hard-wired circuitry may be used in place of, or in combination with, software instructions for implementation of the processes of the present invention, as would be understood by those of skill in the art. Thus, embodiments of the present invention are not limited to hardware, software or any specific combination of hardware and software.

The storage device 1002 also preferably stores (i) a lottery ticket database 1008, (ii) a controller database 1010, and (iii) a winning lottery ticket number database 1012. The databases are described in detail below and depicted with exemplary entries in the accompanying figures. As will be understood by those skilled in the art, the schematic illustrations and accompanying descriptions of the databases presented herein are exemplary arrangements for stored representations of information.

As depicted in FIG. 10, the lottery server 1000 preferably further includes a ROM 1062, RAM 1063, a clock circuit 1064, and a communication port 1065. The communication port 1065 is connected to the network interface 1071. One POS controller 1020 is depicted in FIG. 10, but any number of POS controllers 1020 can be in communication with the lottery server 1000 via the data network interface 1071.

As depicted in FIG. 10, the communication port 1065 is also connected to an IVRU interface 1072. According to some embodiments of the present invention, a customer assistance IVRU (e.g., customer assistance IVRU 575 (FIG. 5)) may be in communication with the lottery server 1000 via the IVRU interface 1072. The customer assistance IVRU is preferably also connected to a public switched telephone network (PSTN) (e.g., PSTN 576 (FIG. 5)). The customer assistance IVRU allows a caller (not shown) to communicate with the lottery server 1000 using a telephone (not shown). Voice command prompts preferably guide the caller through various menu options allowing the caller to input and extract data related to a particular lottery ticket transaction. This process is described in greater detail herein.

The processor 1001 may also be in communication with a random number generator 1066 and an optional cryptographic processor 1067. When requested by the processor 1001, the random number generator 1066 generates random "quick-pick" numbers used for "quick-pick" lottery ticket transactions. The optional cryptographic processor 1067 may be used in some embodiments for authenticating lottery transactions. For example, the cryptographic processor 1067 may be used to encrypt an authentication code generated by the processor 1001, described in greater detail herein. This encrypted authentication code is passed to the processor 1001, which associates it with a particular lottery transaction. The cryptographic processor 1067 is also used to decrypt encrypted authentication codes which are passed to it by the processor 1001.

While the illustrated embodiment depicts the random number generator 1066 and the cryptographic processor 1067 as separate elements within the lottery server 1000, it will be readily understood that other methods of performing their functions may be used. For example, these functions may be implemented in instructions (e.g., of program 1003) stored in the data storage device 1002 and executed by the processor 1001.

In accordance with one or more alternative embodiments of the present invention, a lottery server is a system controller (e.g., a POS controller, or a store controller) located in a store, for controlling lottery ticket transactions performed at POS terminals in the store. The lottery server/controller thereby serves to collect and store lottery transactions (e.g., upsells for lottery tickets) and other game entry transactions performed at the store's POS terminals. Such centralized control of lottery transactions allows customers at one or more POS terminals to each receive upsells for game entries that permit participation in a single lottery, contest or other game. In accordance with the alternative embodiments, a storage device of the lottery server/controller preferably stores (i) a game database of identifiers and round-up amounts (e.g., any of various transaction databases and/or ticket databases discussed further herein); (ii) a POS terminal controller database for maintaining information on POS terminals connected to the lottery server/controller (e.g., a unique identifier for each terminal, or specific lottery transactions of each terminal); and (iii) a winning lottery ticket number database for storing winning numbers, and thereby indicating winning game entries.

FIG. 11 is a tabular representation 1100 of a transaction database (e.g., transaction database 610 (FIG. 6)) according to one or more embodiments of the present invention. The tabular representation 1100 of the transaction database includes a number of example records or entries, each indicating a transaction at a POS terminal (e.g., vending machine 900 (FIG. 9)). Those skilled in the art will understand that the transaction database may include any number of entries, and as discussed herein, may be stored in communication with a POS terminal and/or a system controller.

The tabular representation 1100 also defines fields for each of the entries or records. The fields specify: (i) a date 1102 that indicates a date of the transaction; (ii) a time 1104 that indicates a time that the transaction was completed; (iii) an amount received 1106 that indicates a monetary amount received at the POS terminal (e.g., during the course of the transaction); (iv) an item ordered 1108 that indicates one or more item identifiers that identify an item selected for purchase by the customer; (v) a round-up amount 1110 that indicates a monetary amount for use in determining a value of a lottery ticket to offer the customer; (vi) a lottery ticket offered field 1112 that indicates whether a lottery ticket was offered to the customer; (vii) a lottery ticket purchased field 1114 that indicates whether a lottery ticket was purchased by the customer in the transaction (regardless of whether the lottery ticket was the subject of an offer); and (viii) a change dispensed field 1116 that includes an indication of any monetary amount dispensed to the customer as change in the transaction.

The tabular representation 1100 provides example data to illustrate the information stored in this database embodiment. The first sample entry describes a transaction in which an amount of "$1.00" was received (e.g., by inserting money at a vending machine) and an item "PLU123" was ordered (e.g., by selecting the item at a vending machine). The POS terminal determined a round-up amount of "$0.35." For example, if the item "PLU123" cost $0.65 (e.g., as determined by referencing the item identifier "PLU123" in an inventory price database), then the POS terminal may have calculated the change due ($0.35) and set the round-up amount equal to the change due. A lottery ticket was offered to the customer (e.g., based on the round-up amount), and the customer agreed to purchase a lottery ticket "100-241-321." As no change was dispensed, in this example transaction the lottery ticket was exchanged for the determined round-up amount "$0.35."

A second sample entry describes a transaction in which an amount of "$5.00" was received and an item "PLU491" was ordered. The POS terminal determined a round-up amount of "$4.25." A lottery ticket was not offered to the customer.

For example, the POS terminal (and/or a system controller) may have determined not to offer a lottery ticket based on the round-up amount, the time of day, the item ordered by the customer, and/or any of various other criteria discussed herein. Still other criteria for determining whether to offer a lottery ticket during a transaction will be readily apparent to those skilled in the art in light of the present disclosure. An amount of "$4.25" was dispensed to the customer.

A third sample entry describes a transaction in which an amount of "$0.35" was received and an item "LOTTERY TICKET" was ordered by a customer (e.g., by requesting the item at a cash register). No change ("$0.00") was dispensed, indicating that in this example transaction the selected lottery ticket item was purchased in exchange for the exact received amount of "$0.35." Accordingly, the sample entry indicates that the customer agreed to purchase a lottery ticket "100-241-322." The sample entry indicates a round-up amount of "$0.00."

The last sample entry describes a transaction in which an amount of "$5.00" was received (e.g., at a vending machine) and items "PLU491" and "PLU345" (e.g., a candy bar and a soda) were ordered. The POS terminal determined a round-up amount of "$1.35." A lottery ticket was offered to the customer, and the customer agreed to purchase lottery ticket "100-241-323" in exchange for the round-up amount of "$1.35." An amount of "$0.25" was dispensed to the customer as change. Accordingly, in this example transaction, the round-up amount of "$1.35" was less than an amount of change due the customer before the customer agreed to purchase the lottery ticket "100-241-323." For example, the customer may have been due an amount of $1.60 in change based on the total price of the ordered items. The POS terminal may have determined the round-up amount of "$1.35" based on the amount of change due, the items ordered, the time of day, a customer preference, and/or any of various other criteria. Still other criteria for determining a round-up amount will be readily apparent to those skilled in the art in light of the present disclosure.

Not all of the fields depicted in FIG. 11 are required, and various substitutions, deletions and other changes to the tabular representation will be readily apparent to those of ordinary skill in the art. For example, it may not be necessary to record the change dispensed 1116 in some embodiments of the invention. In another example, a transaction identifier that uniquely identifies each transaction and/or a POS terminal identifier that uniquely identifies the POS terminal at which the transaction took place, may be included in each corresponding entry. In another example, an alternative representation may contain a field for indicating explicitly the total cost of the transaction to the customer, although such a total may be determined based on the exemplary fields of the tabular representation 1100. Also, the depicted fields, for example, the exemplary forms of item identifiers, are for illustration only. Various other forms of item identifiers are described herein, and still others will be readily apparent to those of skill in the art.

FIG. 12 is a tabular representation 1200 of a transaction database (e.g., transaction database 610 (FIG. 6), or transaction database 924 (FIG. 9)) and/or a ticket database (e.g., fractional ticket database 608 (FIG. 6), or lottery ticket database 1008 (FIG. 10)) according to one or more embodiments of the present invention. The tabular representation 1200 of the exemplary transaction/ticket database includes a number of example records or entries, each indicating a transaction at a POS terminal (e.g., vending machine 900 (FIG. 9)). Those skilled in the art will understand that the transaction/ticket database may include any number of entries, and as discussed herein, may be stored in communication with a POS terminal and/or a system controller.

The tabular representation 1200 also defines fields for each of the entries or records. The fields specify: (i) a date 1202 that indicates a date of a purchase of one or more lottery tickets; (ii) a ticket identifier 1204 that uniquely identifies a lottery ticket (e.g., a sales receipt number); (iii) a number of tickets purchased 1206; (iv) a sale amount 1208 that indicates a monetary cost of the purchased ticket(s); and (v) lottery ticket numbers 1210 corresponding to the purchased ticket(s).

The tabular representation 1200 provides example data to illustrate the information stored regarding lottery ticket purchases. In the case of a lottery ticket identified as "4534," the sale amount 1208 contains the fractional amount "$0.68" of the lottery ticket purchased by the customer. Lottery ticket "4534" is associated with lottery ticket numbers 1210 of "33 17 92 . . . . " In another sample entry, a purchase of four lottery tickets costing "$4.00" total is identified as "4533." Four sets of corresponding lottery ticket numbers 1210 are also depicted for the sample entry.

Not all of the fields depicted in FIG. 12 are required, and various substitutions, deletions and other changes to the tabular representation will be readily apparent to those of ordinary skill in the art. For example, it may not be necessary to store the number of tickets purchased 1206 in some embodiments of the invention. In another example, an entry may be stored for each set of lottery ticket numbers 1210 and referenced by a ticket identifier that may or may not be unique. For instance, four tickets purchased during a transaction may each be stored as a unique entry identified by a unique ticket identifier and a corresponding set of lottery ticket numbers, or two or more of the tickets may each be stored as a unique entry identified by the same ticket identifier and a respective set of lottery ticket numbers. Also, the depicted fields, for example, the exemplary forms of lottery ticket numbers, are for illustration only. Various other forms of ticket numbers are described herein, and still others will be readily apparent to those of skill in the art.

FIG. 13 is a tabular representation 1300 of one or more alternative embodiments of a transaction database and/or a ticket database. The tabular representation 1300 of the transaction/ticket database includes a number of example records or entries, each indicating a transaction at a POS terminal (e.g., POS terminal 800 (FIG. 8)). Those skilled in the art will understand that the transaction/ticket database may include any number of entries, and as discussed herein, may be stored in a storage device in communication with a POS terminal, a lottery server, and/or a system controller.

The tabular representation 1300 also defines fields for each of the sample entries or records. The fields specify: (i) a POS controller ID number 1302 that identifies a POS controller in communication with (and/or comprising) a POS terminal at which the transaction occurred; (ii) a date 1304 that indicates a date of a purchase of one or more lottery tickets; (iii) a number of tickets purchased 1306; (iv) a sales receipt number 1308 that uniquely identifies a receipt (e.g., a lottery ticket, a printed sales receipt itemizing one or more lottery, and/or non-lottery items purchased during a transaction) provided to a customer; (v) a sale amount 1310 that indicates a monetary cost of the purchased ticket(s); (vi) lottery ticket numbers 1312 corresponding to the purchased ticket(s); and (vii) a cryptographic code 1314.

According to some embodiments of the present invention, the POS controller ID number 1302 preferably is a unique code corresponding to each POS controller that communicates with a lottery server. The sales receipt number 1308 preferably stores a serial number related to each receipt generated by one or more POS terminals in communication with the corresponding POS controller. The cryptographic code 1314 preferably stores an authentication code that may be encrypted, as discussed in detail herein.

FIG. 14 is a tabular representation 1400 of one or more alternative embodiments of a transaction database. The tabular representation 1400 of the transaction database includes a number of example records or entries, each indicating a purchase of one or more fractional lottery tickets at a POS terminal (e.g., POS terminal 900 (FIG. 9)). Those skilled in the art will understand that the transaction database may include any number of entries, and as discussed herein, may be stored in a storage device in communication with a POS terminal and/or a system controller.

The tabular representation 1400 also defines fields for each of the sample entries or records. The fields specify: (i) a transaction number 1402 that uniquely identifies the transaction; (ii) a POS terminal identifier 1404 that uniquely identifies the POS terminal initiating the transaction; (iii) a ticket purchase price 1406 that indicates the price paid for one or more fractional lottery tickets; (iv) a date 1408 of the transaction; and (v) a fractional lottery ticket identifier 1410 that identifies one or more fractional lottery tickets provided during the transaction.

The tabular representation 1400 provides example data to illustrate the information stored in this database embodiment. One sample entry describes a transaction "7614234" in which a purchase price of "$0.12" was paid at a POS terminal "1" in exchange for a fractional lottery ticket "1001." Another sample entry describes a transaction "7614235" at a POS terminal "1" in which a purchase price of "$0.69" was paid for a fractional lottery ticket "1002." A third sample entry describes a transaction "7614236" at a POS terminal "2" in which a purchase price of "$1.77" was paid for a fractional lottery ticket "1003."

Another sample entry describes a transaction "7614239" at a POS terminal "2" in which a purchase price of "$0.79" was paid for two fractional lottery tickets "1005" and "1006." In this example database, the respective values of the "1005" and "1006" fractional lottery tickets are not indicated, but may be stored, for example, in a fractional lottery ticket database entry corresponding to the fractional lottery ticket identifiers.

Not all of the fields depicted in FIG. 14 are required, and various substitutions, deletions and other changes to the tabular representation will be readily apparent to those of ordinary skill in the art. For example, it may not be necessary to record the POS terminal identifier 1404 in some embodiments of the invention. In another example, an alternative embodiment may also include entries for purchases of full and/or fractional lottery tickets. For instance, an entry for a purchase price of "$1.27" may indicate a purchase of one full lottery ticket for $1.00 and one fractional lottery ticket for $0.27. Also, the depicted fields, for example, the exemplary forms of fractional ticket identifiers, are for illustration only. Various other forms of fractional ticket identifiers are described herein, and still others will be readily apparent to those of skill in the art.

Referring to FIG. 15, a tabular representation 1500 of an alternative transaction database includes a number of example records or entries, each indicating a transaction at a POS terminal (e.g., POS terminal 800 (FIG. 8)). Those skilled in the art will understand that the transaction database may include any number of entries, and as discussed herein, may be stored in a storage device in communication with a POS terminal and/or a system controller.

Each entry defines a transaction initiated by a POS terminal. In particular, each entry includes (i) a transaction number 1502 that uniquely identifies the transaction; (ii) a POS terminal identifier 1504 that uniquely identifies the POS terminal initiating the transaction; (iii) a purchase price 1506; (iv) a rounding multiple 1508 that is used to indicate an amount to which the purchase price is to be rounded; (v) a round-up amount 1510 that is the monetary amount used to purchase the fractional lottery ticket; (vi) an indication of whether the offer for a fractional lottery ticket was accepted 1512; (vii) a frequent shopper number 1514 identifying a customer who has used a frequent shopper card for the transaction; (viii) a date 1516 of the transaction; and (ix) a fractional lottery ticket identifier 1518 that identifies a fractional lottery ticket provided in exchange for the round-up amount. According to this transaction database embodiment, the round-up amount 1510 is the monetary amount used to purchase the fractional lottery ticket.

Referring to FIG. 16, tabular representations 1600 and 1650 represent records or entries of an exemplary fractional ticket database (e.g., fractional ticket database 608 (FIG. 6)). Typically, a fractional ticket database includes a plurality of records or entries such as those represented by tabular representations 1600 and 1650. Each of tabular representations 1600 and 1650 defines a fractional lottery ticket.

The record represented by the table 1600 defines a fractional lottery ticket that is identified by an identifier 1605 (the identifier "1001"). The table 1600 includes an entry 1607, which defines a portion of a lottery ticket that is included in the fractional lottery ticket "1001." The entry 1607 includes (i) a ticket identifier 1602 that uniquely identifies the lottery ticket; (ii) a value 1604 indicating a value of the fractional lottery ticket "1001"; and (iii) ticket numbers 1606 "02, 03, 12, 16, 21, 25" corresponding to the fractional lottery ticket "1001." Thus, the fractional lottery ticket "1001" is a winning entry if the lottery numbers "02, 03, 12, 16, 21, 25" are drawn.

Similarly, the record represented by the table 1650 defines a fractional lottery ticket that is identified by an identifier 1655 (the identifier "1003"). The table 1650 includes entries 1657 and 1658, which each include (i) a ticket identifier 1652; (ii) a value 1654; and (iii) ticket numbers 1656.

In some embodiments, the value of a fractional lottery ticket is equal to a purchase price of the fractional lottery ticket (e.g., sale amount 1208 (FIG. 12), ticket purchase price 1406 (FIG. 14), or round up amount 1510 (FIG. 15)). For example, a customer may have $0.12 in change (the round-up amount) from a purchase, and use that change to acquire a fractional lottery ticket having a value of $0.12. However, the value of the fractional lottery ticket need not be equal to the monetary amount used to purchase the fractional lottery ticket. In certain embodiments, the value of a fractional lottery ticket is based on a rounded-down (or rounded-up) monetary amount. For example, as depicted in FIG. 15, a customer in a sample transaction "7614236" may have "$1.77" in change from a purchase, and use that change to acquire a fractional lottery ticket "1003." As depicted in FIG. 16, the fractional lottery ticket "1003" may have a corresponding value of "$1.75" (e.g., $1.77 rounded down to the nearest nickel).

Of course, the monetary amount may be rounded down to any amount or to other multiples, such as to the nearest dime, quarter, or dollar, and that rounded amount would define the value of the fractional lottery ticket. The difference between the change due and the rounded-down amount upon which the fractional lottery ticket is based may be kept as a service fee by the seller of the fractional lottery ticket.

In another example, a customer may have $0.62 in change from a purchase, and use that change to acquire a fractional lottery ticket. The fractional lottery ticket may have a value of $0.65 ($0.62 rounded up to the nearest nickel). Of course, the monetary amount may be rounded up to any amount or to other multiples.

The value of a fractional lottery ticket may be based on the monetary amount in still further ways. For example, the value may be double the monetary amount. It may be advantageous to provide such a value if a customer buys a predetermined good or type of good, or if the customer uses a frequent shopper card. For example, if a customer has $0.62 in change and purchases a product of a particular manufacturer, the customer may receive a fractional lottery ticket having a value of $1.24 (double $0.62) in exchange for his change.

In some embodiments, the customer may select the ticket numbers himself at the time of the transaction, either manually or through ticket numbers stored on a card, such as a smart card or a frequent shopper card having a magnetic strip. Such an embodiment allows a customer to obtain a fractional lottery ticket having his favorite or "lucky" numbers.

In certain embodiments, the ticket numbers of the fractional lottery ticket are not chosen by the customer, but are instead chosen automatically by the POS terminal or store controller. For example, fractional lottery tickets may be acquired by purchasing "quick pick" tickets (tickets with randomly-selected ticket numbers) from the state lottery in a known manner (e.g., by request to a lottery server configured to generate random numbers). In some embodiments, a random number generator may be used for generating "quick-pick" lottery numbers for each game entry.

In an alternative embodiment, a customer is allowed to select one or more ticket numbers himself, and any remaining ticket numbers for the game entry are determined at random (e.g., by a lottery terminal as "quick pick" numbers).

Figure 17:
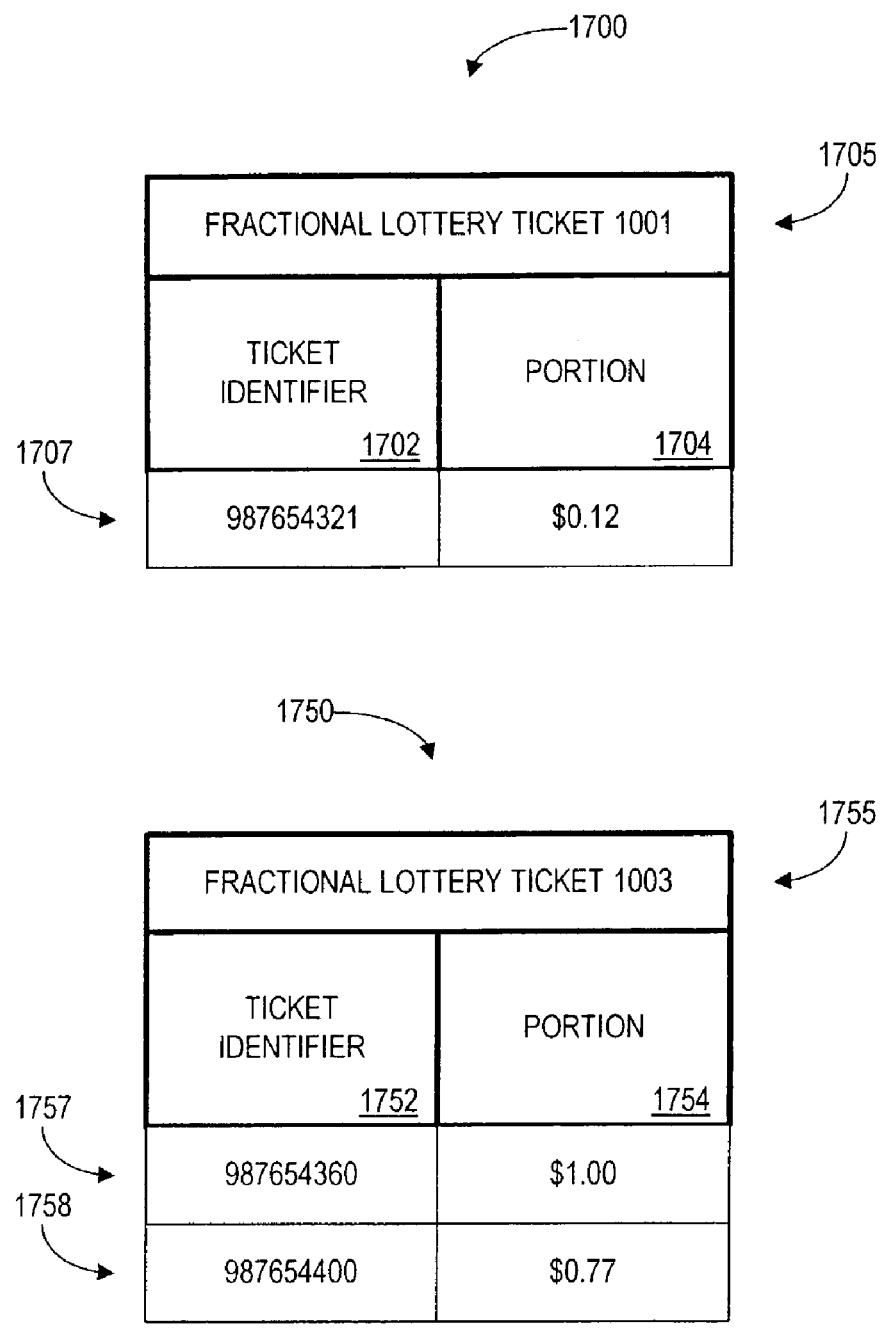
FIG. 17 is a tabular representation of one or more embodiments of a fractional ticket database.

Referring to FIG. 17, tabular representations 1700 and 1750 represent records or entries of an alternative exemplary fractional ticket database (e.g., fractional ticket database 608 (FIG. 6)). Each of tabular representations 1700 and 1750 defines a fractional lottery ticket that defines a portion of one or more lottery tickets.

The record represented by the table 1700 defines a fractional lottery ticket that is identified by an identifier 1705 (the identifier "1001"). The table 1700 includes an entry 1707, which defines a portion of a lottery ticket that is included in the fractional lottery ticket "1001." The entry 1707 includes (i) a ticket identifier 1702 that uniquely identifies the lottery ticket; and (ii) a portion 1704 indicating a portion of the lottery ticket that is included in the fractional lottery ticket "1001".

Similarly, the record represented by the table 1750 defines a fractional lottery ticket that is identified by an identifier 1755 (the identifier "1003"). The table 1750 includes entries 1757 and 1758, which each include (i) a ticket identifier 1752; and (ii) a portion 1754. Since the fractional lottery ticket "1003" includes portions from more than one lottery ticket, the fractional lottery ticket "1003" may include portions which collectively exceed the maximum price of one lottery ticket.

The exemplary fractional lottery tickets depicted in FIG. 17 define fractional lottery tickets having values that define a portion of full lottery tickets. As discussed herein, ticket numbers of a fractional lottery ticket may be chosen by a customer, or a random set of numbers (e.g., "quick pick" numbers) may be generated, for example, by a lottery server, system controller, or POS terminal. In other embodiments, ticket numbers are selected from a set of ticket numbers of a ticket record database (e.g., ticket record database 730 (FIG. 7)).

Referring to FIG. 18, a tabular representation 1800 of one embodiment of the ticket record database 730 of FIG. 7 includes rows 1820, 1822, 1824, 1826, and 1828, each of which represents an entry of the ticket record database 730. Each entry defines a set of ticket numbers that are included on one or more fractional lottery tickets. In particular, each entry defines a lottery ticket that is to be allocated, in which the allocated portions of the lottery ticket are included in one or more fractional lottery tickets. In some embodiments, each entry defines one or more lottery tickets that have been or are to be purchased.

In particular, each entry includes (i) a ticket record identifier 1802 that uniquely identifies the entry (e.g., a serial number of the lottery ticket or a portion of the serial number); (ii) a drawing date 1804 that indicates when winning ticket numbers will be announced; (iii) ticket numbers 1806; (iv) a total value amount 1808, which is the sum of all values of the fractional lottery tickets which have the corresponding ticket numbers; and (v) an amount to round up 1810, which is a minimal amount that, when added to the total value amount 1808, yields a sum that is a whole-number multiple of the corresponding lottery ticket price.

According to some embodiments of the present invention, the total value amount 1808 indicates for each entry how many lottery tickets having the same set of the corresponding ticket numbers should be purchased. In one embodiment, the number of lottery tickets to purchase is determined by the price of a lottery ticket. In particular, the total number of lottery tickets purchased for an entry may be the lowest integer number of tickets such that the total price of the purchased tickets is greater than the corresponding total value amount. For example, if the total value amount is $7.84 and the price of a lottery ticket is $1.00, then eight lottery tickets cost $8.00, which is greater than $7.84, yet seven lottery tickets cost $7.00, which is less than $7.84. Accordingly, the lowest number of lottery tickets that yields a total price greater than $7.84 is eight lottery tickets, so eight lottery tickets should be purchased. In another example, if the total value amount is $5.51 and the price of a lottery ticket is $2.00, then three lottery tickets cost $6.00, which is greater than $5.51, yet two lottery tickets cost $4.00, which is less than $5.51. Accordingly, the lowest number of lottery tickets that yields a total price greater than $5.51 is three lottery tickets, so three lottery tickets should be purchased.

Figure 19:
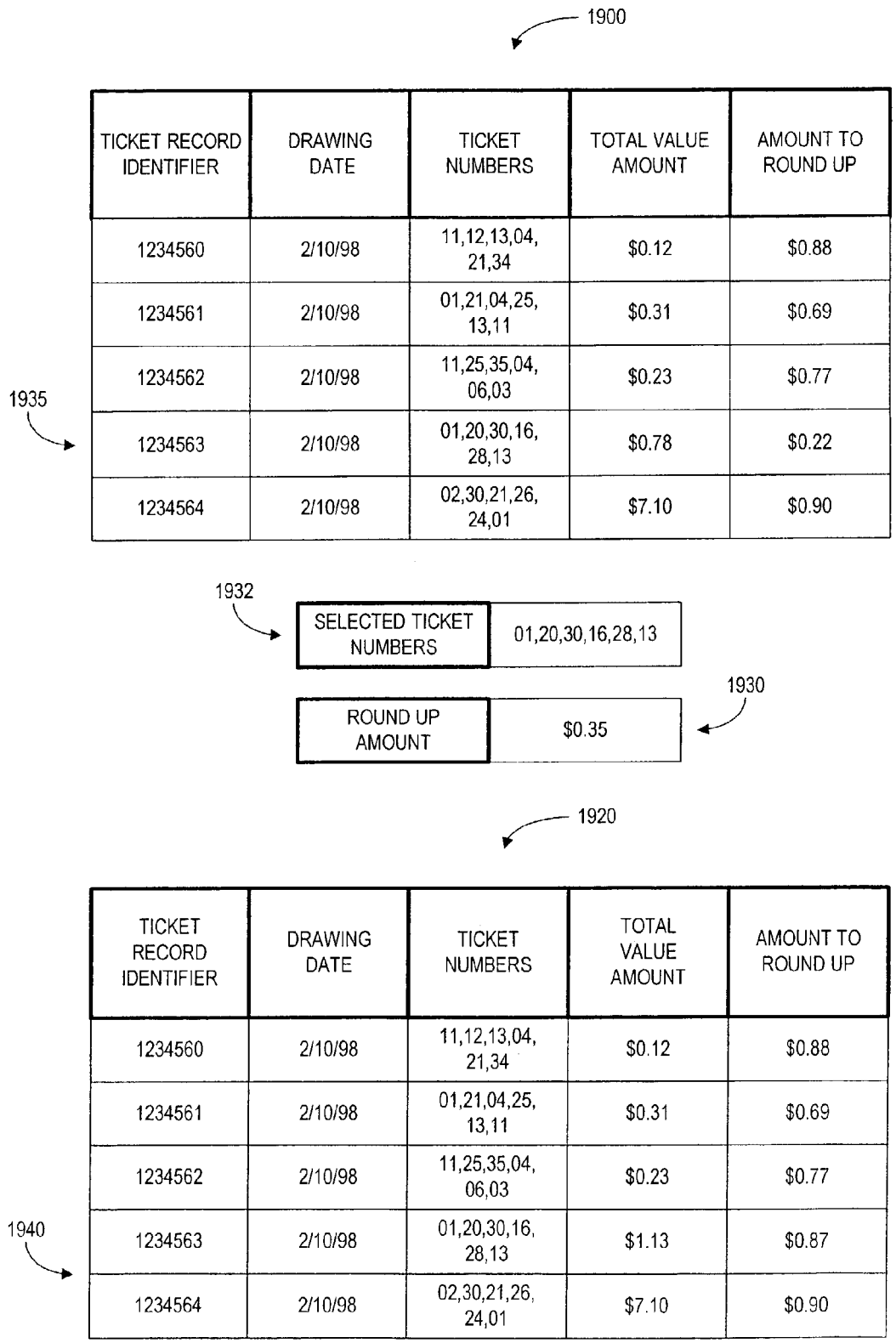
FIG. 19 is a tabular representation of exemplary data of a ticket record database.

Referring to FIG. 19, exemplary data for the ticket record database 730 (FIG. 7) are shown before and after a fractional lottery ticket has been issued. The table 1900 represents an exemplary embodiment of the ticket record database 730 before a transaction represented by a round-up amount 1930. The table 1900 represents the ticket record database 730 after the transaction represented by the round-up amount 1930. The round-up amount 1930 has a value of $0.35, and corresponds to a transaction where a customer exchanges his change due ($0.35) for a fractional lottery ticket. The fractional lottery ticket defines a portion of a lottery ticket, and the portion is based on the monetary amount $0.35. Reference numeral 1932 indicates a set of ticket numbers, and may be chosen by the customer or generated by a POS terminal.

As described above, each of the entries shown in the table 1900 corresponds to a set of ticket numbers. The set of ticket numbers indicated by reference numeral 1932 is the ticket numbers "01, 20, 30, 16, 28, 13." The entry 1935 of the table 1900 also represents the ticket numbers "01, 20, 30, 16, 28, 13." Accordingly, the entry 1935 is selected, and the corresponding total value amount is increased by $0.35. An entry 1940 of the table 1920 represents the ticket numbers "01, 20, 30, 16, 28, 13" after the total value amount is increased by $0.35 (from $0.78 to $1.13).

Referring to FIG. 20, a tabular representation 2000 of an alternative embodiment of the ticket record database 730 of FIG. 7 includes rows 2020, 2022, 2024, 2026, and 2028, each of which represents an entry of the ticket record database 730. Each entry defines a lottery ticket that is to be allocated, in-which the allocated portions of the lottery ticket are included in fractional lottery tickets.

In particular, each entry includes (i) a ticket record identifier 2002 that uniquely identifies the entry, such as a serial number of the lottery ticket or a portion of the serial number; (ii) a drawing date 2004 that indicates when winning ticket numbers will be announced; (iii) ticket numbers 2006; (iv) an unallocated portion 2008 of the lottery ticket; and (v) a ticket price 2010, which indicates the total of the unallocated portion 2008 and any allocated portions. For any entry, the unallocated portion 2008 and the ticket price 2010 may be used to determine how much of the corresponding lottery ticket has been allocated. For example, referring to the entry 2024, of the "$1.00" ticket price, "$0.77" remains unallocated. Accordingly, $0.23 ($1.00-$0.77) has been allocated. A total remaining unallocated amount 2030 indicates the sum of the unallocated portions of all lottery tickets. Given the exemplary data shown in FIG. 20, the total remaining unallocated amount 100 is $1.54 ($0.88+$0.69+$0.77+$0.22+$0.90=$3.46).

Referring to FIG. 21, exemplary data for the ticket record database 730 (FIG. 7) are shown before and after a portion of a lottery ticket has been allocated. The table 2100 represents the ticket record database 730 before a transaction represented by a round-up amount 2130. The table 2120 represents the ticket supply database 30 after the transaction represented by the round-up amount 2130. The round-up amount 2130 has a value of $0.89, and corresponds to a transaction where a customer exchanges his change due ($0.89) for a fractional lottery ticket. The customer thus obtains a portion of a lottery ticket, and the portion is based on the monetary amount $0.89.

As described above, each of the entries shown in the table 2110 corresponds to a ticket. Except for the entry 2135, the monetary amount $0.89 is greater than the unallocated portions of every entry. By contrast, the entry 2135 has an unallocated portion of $0.90, and thus a $0.89 portion of the corresponding lottery ticket may be allocated therefrom. Accordingly, the lottery ticket corresponding to the entry 2135 is selected, and a portion corresponding to $0.89 is allocated to make a new fractional lottery ticket.

The entry 2135 represents the ticket "1234564" before the $0.89 portion is allocated therefrom. An entry 2140 of the table 2120 represents the ticket "1234564" after the $0.89 portion is allocated therefrom. The unallocated portion of the entry 2140 is $0.01, which is the original $0.90 unallocated portion reduced by $0.89. Similarly, before the transaction represented by the round-up amount 2130, the total remaining unallocated amount (of all lottery tickets) is $3.46. After the transaction, the total remaining unallocated amount is $2.57, which is $3.46 reduced by $0.89.

In certain embodiments, the ticket numbers of the fractional lottery ticket are not chosen by the customer, but are instead chosen automatically, for example, by a POS terminal or store controller. In some such embodiments, ticket numbers are selected from the sets of ticket numbers stored in a database (e.g., ticket record database 730 (FIG. 7)). The ticket numbers may be selected in several ways. For example, an entry of the ticket record database 730 may be selected at random, and thus the ticket numbers of the fractional lottery ticket are selected randomly.

Alternatively, lottery ticket numbers may be selected based on the value allocated to the issued fractional lottery ticket. As described herein, the allocated value may be based on a monetary amount (e.g., an amount requested by a customer, an amount of change due a customer, or a rounded-up (or rounded-down) monetary amount). For example, the allocated value may be equal to the monetary amount, or may be a multiple of the monetary amount, or may be equal to a rounding-down (or rounding-up) of the monetary amount.

An entry may thus be selected based on the value of the fractional lottery ticket and the respective amounts to round up of the entries. In one embodiment, an entry having an amount to round up at least as great as the value may be selected. Similarly, a set of entries that each have an amount to round up at least as great as the value may be determined. From this set, the entry that has a minimal amount to round up is selected. The description below further clarifies this method of selecting an entry from the ticket record database 730.

Referring to FIG. 22, a table 2200 illustrates exemplary data for one embodiment of the ticket record database 730 (FIG. 7). The table 2200 includes entries 2202, 2204, 2206, and 2208. A round-up amount 2220 of $0.60 corresponds to a transaction where a customer exchanges his change due ($0.60) for a fractional lottery ticket. The fractional lottery ticket has a value of $0.60. To select an entry of the ticket record database 730 to define the ticket numbers of the fractional lottery ticket, the store controller determines a set of entries that each have an amount to round up of at least $0.60. This set includes the entries 2204, 2206, and 2208. From this set, the lottery ticket which has a minimal amount to round up is selected. Of the entries 2204, 2206, and 2208, the entry 2208 has the minimal amount to round up ($0.61). Accordingly, the entry 2208 is selected, the corresponding total value amount is increased by $0.60 (i.e. from $3.39 to $3.99), and the corresponding amount to round up is adjusted (i.e. to $0.01) to reflect the increased total value amount.

According to some alternative embodiments of the present invention, a lottery ticket having an unallocated portion at least as great as the monetary value may be selected. Similarly, a set of lottery tickets that each have an unallocated portion at least as great as the monetary value may be determined. From this set, the lottery ticket which has a minimal unallocated portion is selected. The description below further clarifies this method of selecting a lottery ticket.

Referring to FIG. 23, a table 2300 illustrates exemplary data for the ticket record database 730 (FIG. 7). The table 2300 includes entries 2302, 2304, 2306 and 2308. A round-up amount 2320 has a value of $0.60, and corresponds to a transaction where a customer exchanges his change due ($0.60) for a fractional lottery ticket. The customer thus obtains a portion of a lottery ticket, and the portion is based on the monetary amount $0.60. To select the lottery ticket from which to allocate a portion, the store controller determines a set of tickets that each have an unallocated portion of at least $0.60. This set includes the entries 2304, 2306 and 2308. From this set, the lottery ticket which has a minimal unallocated portion is selected. Of the entries 2304, 2306 and 2308, the entry 2308 has the minimal unallocated portion ($0.61). Accordingly, the lottery ticket corresponding to the entry 2308 is selected, and a $0.60 portion is allocated therefrom.

According to some embodiments, if the customer selects the ticket numbers, the ticket record database 730 is searched to determine if an entry already indicates the customer-selected ticket numbers. If so, then the total value amount is increased in accordance with the value of the fractional lottery ticket, and the amount to round up is adjusted to reflect the increased total value amount, as described above. If no entry indicates the customer-selected ticket numbers, a new entry is created in the ticket record database 730. The new entry includes (i) a unique ticket record identifier; (ii) an appropriate drawing date; (iii) the customer-selected ticket numbers; (iv) a total value amount equal to the value of the fractional lottery tickets; and (v) an appropriate amount to round up. Further, as discussed herein, one or more lottery tickets that include customer-selected ticket numbers may be acquired (e.g., by electronic request to a lottery server), added to the ticket record database 730 (FIG. 7), and one or more portions thereof would be included in the fractional lottery ticket purchased by the customer.

In accordance with some embodiments of the present invention, a business may issue a fractional lottery ticket to a customer, and subsequently acquire at least one lottery ticket having the same ticket numbers as the fractional lottery ticket. According to other embodiments, a business will acquire a group of lottery tickets and allocate portions of those lottery tickets to customers as needed. The business may acquire at least one lottery ticket having the same ticket numbers as the fractional lottery ticket prior to issuing the fractional lottery ticket, or may acquire the at least one lottery ticket at substantially the same time as the fractional lottery ticket is issued to the customer. For example, the business may provide fractional lottery tickets to customers and then acquire a group of corresponding lottery tickets before the drawing date.

Thus, a business may provide fractional lottery tickets to customers even if, for example, a lottery server does not provide lottery tickets having fractional values. Since the business need only purchase conventional lottery tickets, the business may facilitate the play of fractional lottery tickets without requiring significant changes in existing lottery agency practices.

Referring to FIG. 24, a tabular representation 2400 of an optional ticket supply database 739 (FIG. 7) includes entries 2401, 2402, 2403, and 2404, each of which defines a number of purchased lottery tickets having the same set of ticket numbers. Each entry includes (i) ticket numbers 2405, (ii) a ticket price 2406, and (iii) a number of lottery tickets 2407 that have been purchased. Each entry of the tabular representation 2400 corresponds to an entry of a tabular representation 2450 of the ticket record database 730. Further, the number of tickets for each entry of the tabular representation 2400 defines a number of purchased lottery tickets that is sufficient with respect to the total value amount of the corresponding entry of the tabular representation 2450. For example, the entry 2404 defines four purchased lottery tickets, each at a price of $1.00. Thus, there are enough tickets with the ticket numbers "10, 19, 24, 29, 36, 39" for a total value amount of up to $4.00 (4*$1.00=$4.00). Since the corresponding entry 2458 indicates a total value amount of $3.39, the four tickets are sufficient.

As described herein, portions of lottery tickets (e.g., from a supply of lottery tickets) may be allocated. After an allocation, it is possible that a lottery ticket will have an unallocated portion of $0.00. In other words, the entire lottery ticket will have been allocated, and no further portions of the lottery ticket remain to be allocated. In addition, after an allocation, it is possible that no single lottery ticket has an unallocated portion which is sufficient to satisfy a particular request (or an anticipated request) for a fractional lottery ticket. For example, there may be an attempt to allocate a $0.35 portion of a lottery ticket, yet no lottery ticket represented in the ticket supply database 739 (FIG. 7) has an unallocated portion of $0.35 or more. In such a situation, it may be possible to allocate portions from a plurality of lottery tickets, such that the portions collectively equal $0.35. However, it may be desirable to allocate a portion from a single lottery ticket, rather than from many. For example, it is simpler for a customer to track one set of ticket numbers, rather than a plurality of sets of ticket numbers. Accordingly, it is advantageous to acquire additional lottery tickets for the supply of lottery tickets. It may be advantageous in some embodiments to acquire additional lottery tickets at a time before the lottery tickets are needed, so as not to introduce undue delays into a transaction.

As necessary, a store controller may send signals to a lottery server, for example, to purchase lottery tickets. Preferably, enough lottery tickets are purchased before a drawing date to assure that each issued fractional lottery ticket corresponds to portions of the lottery tickets. In the tabular representation 1800 of the ticket record database 730, the total value amount indicates for each entry how many lottery tickets having the same set of the corresponding ticket numbers should be purchased. In one embodiment, the number of lottery tickets to purchase is determined by the price of a lottery ticket. In particular, the total number of lottery tickets purchased for an entry may be the lowest integer number of tickets such that the total price of the purchased tickets is greater than the corresponding total value amount. For example, if the total value amount is $7.84 and the price of a lottery ticket is $1.00, then eight lottery tickets cost $8.00, which is greater than $7.84, yet seven lottery tickets cost $7.00, which is less than $7.84. Accordingly, the lowest number of lottery tickets that yields a total price greater than $7.84 is eight lottery tickets, so eight lottery tickets should be purchased. In another example, if the total value amount is $5.51 and the price of a lottery ticket is $2.00, then three lottery tickets cost $6.00, which is greater than $5.51, yet two lottery tickets cost $4.00, which is less than $5.51. Accordingly, the lowest number of lottery tickets that yields a total price greater than $5.51 is three lottery tickets, so three lottery tickets should be purchased.

Tickets may be purchased at predefined periods, such as at the end of each business day and/or as requested by an operator of a system controller (e.g., a POS controller, or a store controller). It may further be desirable to purchase all required lottery tickets at a predefined time before the drawing, such as twelve hours before the drawing. In such an embodiment, additional fractional lottery tickets for that drawing may not be issued after such a predetermined time. However, customers would still be able to purchase fractional lottery tickets for later drawings.

In another embodiment, lottery tickets for each entry in the ticket record database 730 (FIG. 7) may be purchased when the amount to round up of the entry is below a predetermined value. For example, each time the amount to round up of an entry is below $0.02, and the number of already-purchased lottery tickets (if any) corresponding to that entry is insufficient with respect to the total value amount, one or more additional lottery tickets are purchased.

In one embodiment, the system controller counts the number of tickets that have an unallocated portion that is above a first predetermined threshold. For example, the controller 700 may count the number of tickets that have an unallocated portion that is above $0.50. This number is compared with a second predetermined threshold, and one or more additional lottery tickets are acquired if this number is below the second predetermined threshold. For example, if there are less than ten lottery tickets having unallocated portions above $0.50, additional lottery tickets are acquired.

In another embodiment, the store controller 420 (FIG. 4) counts the number of tickets that have an unallocated portion that is above a requested portion. For example, a POS terminal may request a $0.40 fractional lottery ticket from the store controller. The store controller 420 then counts the number of tickets that have an unallocated portion that is above $0.40. This number is compared with a predetermined threshold, and one or more additional lottery tickets are acquired if this number is below the predetermined threshold. For example, if there are less than eight lottery tickets having unallocated portions above $0.40, additional lottery tickets are acquired.

Additional tickets may be acquired in predetermined amounts to reduce time spent acquiring lottery tickets. For example, thirty tickets may be acquired at once. In addition, the predetermined amount may depend on criteria such as the number of POS terminals in use.

In another embodiment, the store controller 420 (FIG. 4) calculates the sum of the unallocated portions of all tickets. If the sum is below a predetermined threshold, additional tickets are acquired. For example, if the total remaining unallocated amount is below $10.00, a block of thirty additional tickets are acquired.

Referring to FIG. 25, a tabular representation 2500 of one or more embodiments of a winning ticket database (e.g., winning ticket database 612 (FIG. 6)) includes entries 2560, 2562, and 2564, each defining winning ticket numbers for a drawing date. Each entry includes (i) a corresponding drawing date 2566, (ii) winning ticket numbers 2568, and (iii) a prize 2570. A winning lottery ticket database preferably should include entries for all drawing dates corresponding to valid and redeemable fractional lottery tickets. For example, if fractional lottery tickets may be redeemed up to one year after the corresponding drawing date, then the entries for each drawing date of at least the past year should be stored. The prize 2570 may be, for example, the prize won upon matching all winning ticket numbers. According to some embodiments, a sequence of the ticket numbers must also be matched. More prizes may be specified for each entry. For example, a prize for matching only five of six winning ticket numbers may be specified for each entry as well.

Winning ticket numbers may be entered manually into the store controller 420 (FIG. 4) when available. Ideally, the store controller 420 will receive from a lottery server the winning ticket numbers for each drawing date. The store controller can store these winning ticket numbers in the winning ticket database 736 (FIG. 7), where they are accessed when fractional lottery tickets are redeemed by customers.

As used herein, an "upsell" may be a product (e.g., good or service) which is offered along with a purchase and preferably has a value approximately equal to a predetermined upsell price. Types of upsells may include (i) an upgrade from a first product to a second product different from the first product; (ii) an additional product; (iii) an entry in a sweepstakes, contest, lottery or other game; and (iv) a voucher which is redeemable for a product (e.g., a game entry) or a discount thereon. Various other types of upsells may be used without departing from the scope and spirit of the present invention.

As discussed herein, various embodiments of the present invention provide methods and systems for offering and facilitating the purchase of various types of game entries in exchange for an amount of change due at a POS terminal. Generally, according to one aspect of the present invention, a POS terminal determines an upsell to exchange for the change due to a customer in connection with a purchase. The point-of-sale terminal preferably maintains a database of at least one upsell price and a corresponding upsell to offer a customer in exchange for the change due to him. The upsells and upsell prices are preferably established so that upsells are profitably exchanged for the change due, thus providing the business with profit and the customer with value if the upsell is accepted.

According to some embodiments of the present invention, when a customer brings a purchase to a POS terminal, the POS terminal generates the purchase price and sets a "required payment amount" to be equal to the purchase price. The required payment amount indicates the amount the customer is expected to pay. The POS terminal then generates a rounded price, preferably by rounding up the purchase price to a whole number, and calculates therefrom a round-up amount equal to the difference between the purchase price and the rounded price. Accordingly, the round-up amount indicates the coins due as change. By comparing the calculated round-up amount with at least one of the upsell prices in the database, the POS terminal may determine whether the round-up amount corresponds to any of the upsell prices. If so, the POS terminal identifies the upsell corresponding to this upsell price, and outputs signals indicative of the identified upsell. The output signals are preferably displayed text or graphics that explain to the customer and/or a cashier that the upsell may be purchased for the specified amount of change due. In one embodiment, if the customer accepts the upsell, the customer and/or the cashier so indicates by pressing a selection button on the POS terminal. The required payment amount for the customer to pay is then set equal to the rounded price, rather than the purchase price. Thus, the customer receives the upsell in exchange for the coins due to him, and the coins need not be exchanged between the customer and the POS terminal.

The reduction or elimination of change dispensing and collecting greatly reduces the time a customer spends at a POS terminal. In some cases, it may even be possible to reduce the number of cashiers, if any, who operate POS terminals. In addition, customers may recognize a greater value from the transaction while reducing or eliminating the need to carry additional change after a purchase.

FIG. 26 is a tabular representation 2600 of the game entry upsell database 922 of FIG. 9. The tabular representation 2600 of the game entry upsell database 922 includes a number of example records or entries, each indicating a type of upsell offer available to a vending machine 900. Those skilled in the art will understand that the game entry upsell database 922 may include any number of entries.

The tabular representation 2600 also defines fields for each of the entries or records. The fields specify: (i) an upsell identifier 2602 that uniquely identifies a type of upsell; (ii) an upsell price 2604 that indicates a condition for offering the corresponding type of upsell, based on a determined round-up amount; (iii) an items purchased field 2606 that indicates a condition for offering the corresponding type of upsell, based on whether or not the customer purchased the one or more items identified; (iv) a cost 2608 that indicates a monetary cost to the business providing the upsell item; and (iv) an upsell descriptor 2610 that includes a description of the type of upsell.

An upsell price as used herein is a price, set of prices or range of prices at which it is desirable to sell the corresponding upsell. The upsell price is preferably related to the cost of the upsell to the business. For example, if the cost to a restaurant is $0.20 for a small soda, then the upsell price of one additional small soda is a range greater than $0.20, such as the range from $0.20 to $0.30. As another example, if the cost to the restaurant is $0.22 for a large soda, then the cost of an upsell from a small soda to a large soda for the restaurant is the incremental cost $0.22–$0.20=$0.02. Accordingly, the upsell price may be a range having a lower bound of $0.02.

Not all of the fields depicted in FIG. 26 are required, and various substitutions, deletions and other changes to the tabular representation will be readily apparent to those of ordinary skill in the art. For example, some embodiments of the present invention may not utilize one or more of the upsell conditions depicted (e.g., upsell price 2604, or items purchased 2606) and/or may include one or more other types of upsell conditions. For instance, as discussed herein, other conditions for providing a type of upsell may be based on, without limitation: (i) whether a customer ID is required; (ii) one or more customer preferences; (iii) a time of purchase; and (iv) a cost to provide the upsell. Also, the depicted fields, for example, the exemplary forms of item identifiers, are for illustration only. Various other forms of item identifiers are described herein, and still others will be readily apparent to those of skill in the art.

Although only game entry upsell offers are described above, it will be readily apparent that various other types of upsell offers may be made by a vending machine. For example, a vending may also offer upsells including: (i) an upgrade from a first product to a second product different from the first product, (ii) an additional product, and/or (iii) a voucher which is redeemable for a product (e.g., a game entry) or a discount thereon. Further, although described with respect to a vending machine, the sample upsell offers depicted in tabular representation 2600 may also be available at other types of POS terminals.

Referring to FIG. 27, a tabular representation 2700 of one or more embodiments of the frequent shopper database 738 (FIG. 7) includes entries 2780, 2782, 2784, and 2786, each defining a frequent shopper (a customer who has used a frequent shopper card for the transaction). In particular, each entry includes (i) a frequent shopper number 2788 for uniquely identifying the frequent shopper; (ii) an address 2790 of the frequent shopper; (iii) a telephone number 2792 of the frequent shopper; (iv) a name 2794 of the frequent shopper; and (v) an email address 2796 of the frequent shopper. With such stored information, if fractional lottery tickets including portions of winning lottery tickets were purchased using frequent shopper cards, then the corresponding customer may be notified by mail, telephone call, email or other forms of notification as desired. In addition, frequent shoppers may be notified by the POS terminal when they next use their frequent shopper card. Providing frequent shoppers with the additional benefit of notification is advantageous because it may prompt customers to become frequent shoppers. Consequently, these customers are more likely to continue frequenting the corresponding business.

As further incentive to become a frequent shopper, it may be desirable to only provide frequent shoppers with the opportunity to purchase fractional lottery tickets. For example, an offer for a fractional lottery ticket may be provided only during transactions in which a frequent shopper card is used.

FIG. 28 is tabular representation 2800 of one or more exemplary embodiments of POS controller database 1010 (FIG. 10). The tabular representation 2800 of the POS controller database 1010 includes a POS controller ID number field F13, a POS controller name field F14, a POS controller location field F15, and a telephone number field F16. The POS controller name field F14 stores the name of the store or establishment where the POS controller 20 is located. The POS controller location field F15 stores the address of where the POS controller 20 is located. The telephone number field F16 stores the telephone number associated with each POS controller 20. A sample record R3 for one POS controller location is depicted in FIG. 7, but any number of records may be stored.

Figure 29:
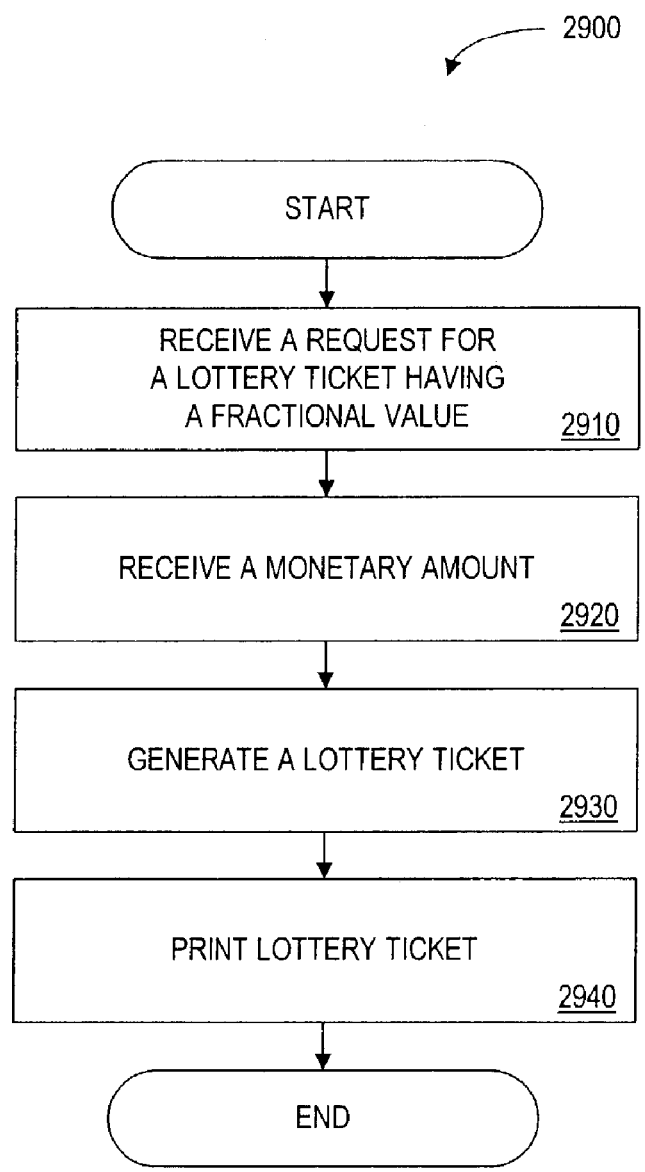
FIG. 29 is a flow chart representing a method in accordance with one or more embodiments of the present invention.

Referring to FIG. 29, a flow chart 2900 represents an exemplary embodiment of a process that may be performed by a POS terminal, including, without limitation, a vending machine or a cash register.

The POS terminal receives an indication of a request by a customer to purchase a lottery ticket having a fractional value (step 2910). Such a request may be made in a stand-alone transaction (e.g., for the lottery ticket only), or may be part of a purchase including other merchandise (e.g., as one of a plurality of items purchased at a vending machine). Of course, a lottery ticket purchase may include one or more "full" value lottery tickets in addition to one or more fractional value lottery tickets.

The POS terminal also receives a monetary amount or some other indication that a monetary amount has been provided by (or on behalf of) the customer (step 2920). The POS terminal may receive an amount of currency from the customer, for example, or may receive an approval of an amount to charge to a credit card account. In some embodiments, the customer requests to purchase a lottery ticket in exchange for a particular amount designated by the customer. For example, the customer may request a lottery ticket in exchange for $0.35 and provide the $0.35 to the POS terminal (e.g., by inserting money at a vending machine, or by providing money to an operator of a lottery terminal). As will be readily apparent to those skilled in the art, the monetary amount received may include an amount that is owed to the customer (e.g., as change). For example, a customer may provide $1.00 to purchase $0.75 worth of merchandise (that may or may not include other lottery tickets). Accordingly, a portion ($0.25) of the $1.00 received is change owed to the customer.

The POS terminal generates a lottery ticket having a fractional value (step 2930) and prints the lottery ticket (step 2940), ending the process. Various methods and systems for generating a lottery ticket having a fractional value, including ways for selecting one or more sets of lottery ticket numbers, are described herein in further detail.

Although lottery tickets are described frequently herein as preferred types of game entries, additional types of game entries are contemplated by the present disclosure, including, without limitation, entries for sweepstakes, raffles, door prizes, keno games, roulette games, sports betting, and other contests. Still other types of game entries will be readily apparent to those skilled in the art in light of the present disclosure.

Figure 30:
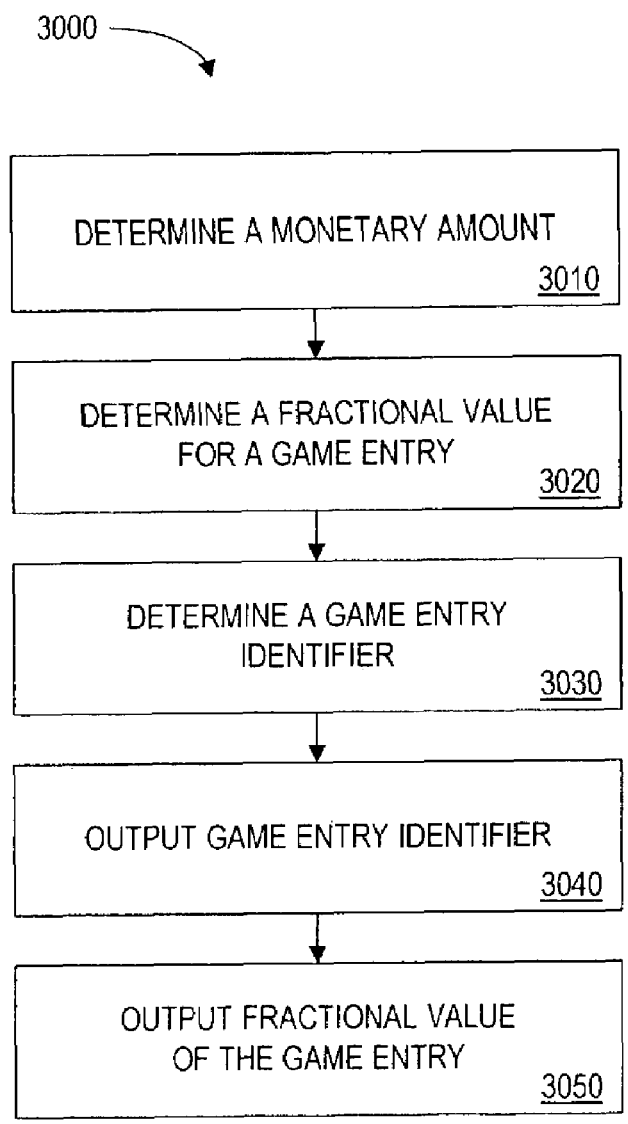
FIG. 30 is a flow chart representing a method in accordance with one or more embodiments of the present invention.

Referring to FIG. 30, a flow chart 3000 represents another exemplary embodiment of the present invention that may be performed by a POS terminal, including, without limitation, a cash register, a lottery terminal, a kiosk, an automatic teller machine, or a vending machine.

The POS terminal determines a monetary amount (step 3010) and also determines a fractional value for a game entry (step 3020). Various ways for determining a monetary amount and for determining a fractional value for a game entry are discussed in further detail herein. The POS terminal also determines a game entry identifier (e.g., a ticket identifier) that uniquely identifies the game entry (step 3030), and outputs both the game entry identifier (step 3040) and an indication of the fractional value of the game entry (step 3050). For example, the POS terminal may print a ticket or other receipt that includes the game entry identifier and a fractional value identifier that identifies the fractional value.

According to some embodiments, upon receiving an input indicating selection of a game upsell in exchange for a round-up amount, the POS terminal generates a unique identifier to identify the game entry. A game entry identifier may comprise, without limitation, one or more alphanumeric characters, a receipt number, a serial number, a set of ticket numbers, a date and/or time of purchase, an identifier that identifies a store and/or POS terminal at which the game entry was purchased, and any combination thereof.

Various embodiments of the present invention, as described herein, provide for a POS terminal to facilitate the purchase of a fractional value lottery ticket by purchasing a lottery ticket from a lottery server (e.g., as a "quick pick" lottery ticket). Unfortunately, some state lottery agencies may be reluctant to change their practices by issuing lottery tickets for fractional amounts. In some circumstances, the ability to offer fractional lottery tickets may require substantial modifications to the hardware and software of lottery terminals used throughout one or more states. Although such changes may ultimately be profitable, and may in some instances require only easily-propagated modifications to software, the initial cost may be perceived to be unduly burdensome. Accordingly, some embodiments of the present invention provide the benefit that state lottery agencies may instead offer tickets in only a few predetermined, rounded amounts (e.g., having values that are whole number multiples of $1), such as tickets for $1, $2 and $5 only.

In accordance with one or more embodiments, the store controller determines a monetary value, such as an amount offered by a customer requesting to purchase a lottery ticket, or an amount of spare change due to a customer. The store controller also selects a ticket record that includes a set of ticket numbers. According to one embodiment, the store controller subsequently purchases at least one lottery ticket based on the monetary value and the set of ticket numbers. According to another embodiment, the ticket records correspond to respective lottery tickets that have already been purchased. In any case, after determining a set of ticket numbers, the store controller outputs the information to a POS terminal, which prints a fractional lottery ticket redeemable for a portion of the lottery ticket's prize. The fractional lottery ticket includes the ticket numbers and a fractional lottery ticket value that is based on the monetary value. The fractional lottery ticket value may be, for example, equal to the monetary value, or may be the monetary value rounded to the nearest nickel. Such embodiments may facilitate the purchase of fractional lottery tickets without requiring significant changes in existing lottery systems.

According to some embodiments of the present invention, a portion of a lottery ticket allocated to a customer may be based on a change amount that is due in connection with a transaction at a POS terminal. Such an embodiment is advantageous since many customers will welcome an alternative to receiving change. Moreover, receiving something having a high perceived value, such as a fractional lottery ticket, instead of change can be even more attractive to customers.

According to one or more alternative embodiments of the present invention, the fractional lottery ticket has a value that defines a portion of one or more lottery tickets. Any fraction or percentage of a full lottery ticket can be requested by the customer (i.e. one to ninety-nine percent). The customer is not limited to any preset or fixed fractions. According to one such embodiment, the controller selects a ticket record that includes a set of ticket numbers. Subsequently, the controller purchases at least one lottery ticket based on a determined monetary value and the set of ticket numbers. The controller then outputs the information to a POS terminal, which prints a fractional lottery ticket redeemable for a portion of the lottery ticket's prize. If a prize is due, the controller may determine a prize value of the corresponding lottery ticket based on the ticket numbers and the fractional lottery ticket value (e.g., received from a POS terminal). The customer is, in turn, provided with a portion of the prize value of the corresponding lottery ticket based on the fractional lottery ticket value.

Thus, a business may issue a fractional lottery ticket to a customer, and subsequently acquire at least one lottery ticket having the same ticket numbers as the fractional lottery ticket. Typically, the business will provide fractional lottery tickets to customers and then acquire a group of corresponding lottery tickets before the drawing date. Since the business need only purchase conventional lottery tickets, the business may facilitate the play of fractional lottery tickets without requiring significant changes in existing lottery agency practices. According to some embodiments, any prizes won by a purchased group of lottery tickets are received by the business, which in turn pays shares of the prizes to customers based on the portions defined by the values of the fractional lottery tickets. As discussed herein, a share of any prize that is won with the lottery ticket is provided to the customer, the share of the prize being based on the portion. For example, if a customer receives a fractional lottery ticket having a value of $0.34 and defining a portion of a $2.00 lottery ticket, then the customer receives 17% ($0.34/$2.00=17%) of any prize won with that lottery ticket.

Figure 31:
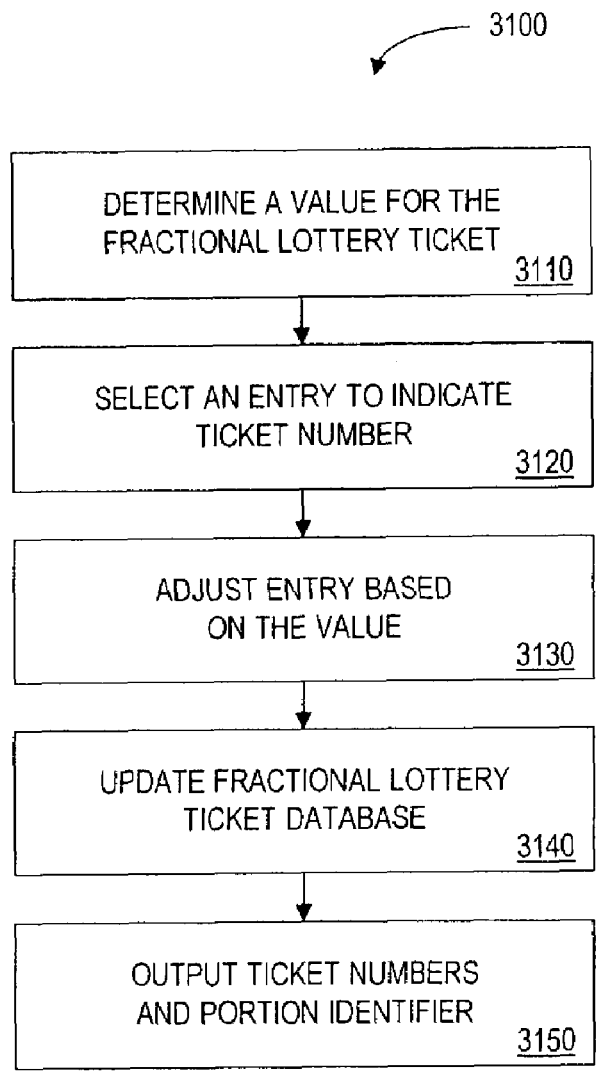
FIG. 31 is a flow chart representing a method in accordance with one or more embodiments of the present invention.

Referring to FIG. 31, a flow chart 3100 represents another exemplary process of the present invention for creating fractional lottery tickets that may be performed by a system controller (e.g., a store controller) and/or a POS terminal, including, without limitation, a cash register, a lottery terminal, a kiosk, an automatic teller machine, or a vending machine. In one embodiment, the method 3100 is performed if a customer requests the purchase of a "quick pick" fractional lottery ticket (whether as a stand-alone transaction or while purchasing other merchandise). In another embodiment, the method 3100 is performed if a customer accepts an offer to exchange his spare change for a fractional lottery ticket. At step 3110, a value for the fractional lottery ticket is determined. For example, the POS terminal may receive a monetary amount from the customer (e.g., at a vending machine) and transmit an indication of the monetary amount to the store controller, which then determines the fractional value based on the monetary amount. In another example, a POS terminal may calculate an amount of change due and round this amount down to the nearest dime. The POS terminal transmits the rounded amount to the store controller, and the store controller thereby determines the value to be this rounded amount. The store controller in turn selects an entry (step 3120) of the ticket record database 730, the entry indicating the ticket numbers for the fractional lottery ticket. As described herein, the entry may correspond to a lottery ticket that has been or is yet to be purchased (e.g., from a lottery server). As described herein, the entry may be selected randomly, such as when the customer allows randomly-selected ticket numbers to be used on his fractional lottery ticket. Alternatively, the entry may be selected based on the value, as further described herein. If the fractional lottery ticket is to include customer-selected ticket numbers that are not represented in the ticket record database 730, then a new entry is created and selected.

The selected entry is adjusted based on the value (step 3130). For example, the corresponding total value amount is increased by the value, and the corresponding amount to round up is adjusted to reflect the increased total value amount. At step 3140, the fractional ticket database 734 (FIG. 7) is likewise adjusted to create a new record defining the fractional lottery ticket. The store controller then outputs ticket numbers and the value of the fractional lottery ticket (step 3150). The store controller, for example, typically transmits the ticket numbers and the value to the POS terminal, and the POS terminal in turn prints a fractional lottery ticket based on thereon. The POS terminal may print on the fractional lottery ticket the ticket numbers and the value, as well as any other desirable information, such as a drawing date.

According to another alternative embodiment, the controller allocates a portion of a lottery ticket for the customer based on a determined monetary value. For example, a business may acquire a lottery ticket, and allocate a portion of the lottery ticket to a customer. Typically, the business will acquire a group of lottery tickets and allocate portions of those lottery tickets to customers as needed. The portion may be, for example, equal to the monetary value, or may be the monetary value rounded to the nearest nickel. The controller outputs a ticket identifier that identifies the lottery ticket (e.g., a serial number) and a portion identifier that identifies the allocated portion of the lottery ticket (e.g., $0.34 of a $2.00 lottery ticket). Typically, the controller outputs the identifiers to a POS terminal, which prints a fractional lottery ticket redeemable for a portion of the lottery ticket's prize. In some embodiments, the controller also stores the ticket identifier and the portion identifier, to assure that fraudulent tickets will be detected. After a drawing date for the lottery ticket, the customer redeems the fractional lottery ticket, typically at a POS terminal, if a prize is due. The POS terminal communicates with a controller, which receives the ticket identifier and the portion identifier therefrom. From the received identifiers, the store controller may determine a prize value of the corresponding lottery ticket. The customer is, in turn, provided with a portion of the prize value based on the allocated portion of the ticket. Thus, a share of any prize that is won with the lottery ticket is provided to the customer, the share of the prize corresponding to the allocated portion of the lottery ticket. For example, if a customer receives a $0.34 portion of a $2.00 lottery ticket, then the customer receives 17% ($0.34/$2.00=17%) of the prize derived from the lottery ticket.

Figure 32:
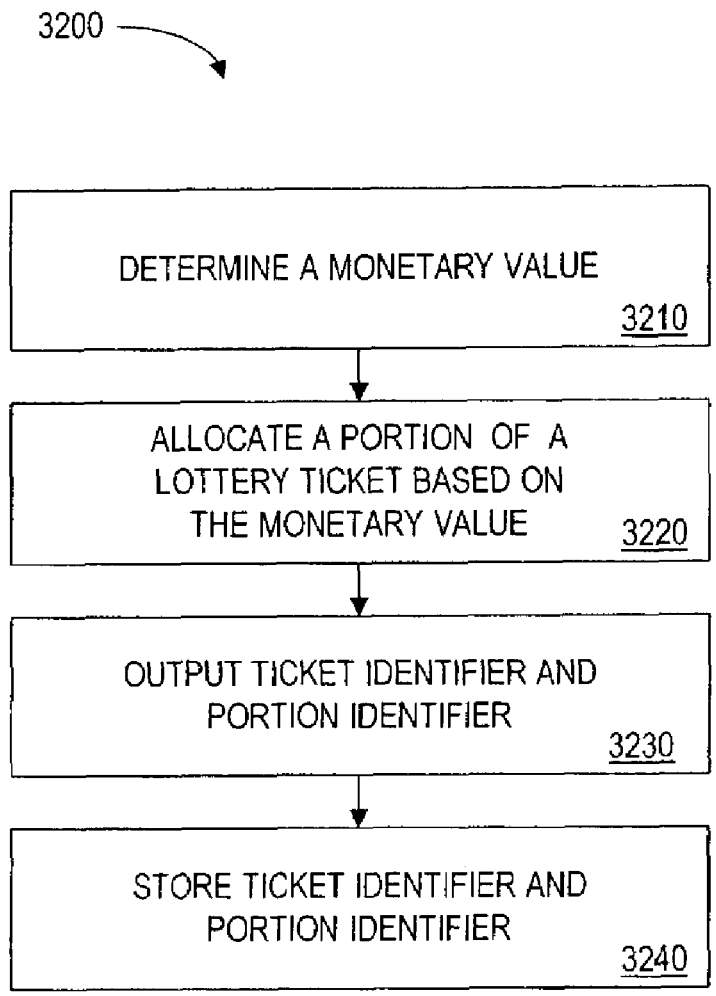
FIG. 32 is a flow chart representing a method in accordance with one or more embodiments of the present invention.

Referring to FIG. 32, a flow chart 3200 represents another exemplary process of the present invention for creating fractional lottery tickets by allocating portions of full lottery tickets. The process 3200 may be performed by a system controller (e.g., a store controller) and/or a POS terminal, including, without limitation, a cash register, a lottery terminal, a kiosk, an automatic teller machine, or a vending machine. The process 3200 initiates by determining a monetary value (step 3210) in one of the various ways described herein. For example, a POS terminal may receive a request by a customer to purchase a fractional value lottery ticket for a desired amount. The POS terminal transmits an indication of the desired amount to the store controller, and the store controller thereby determines the monetary value to be this customer-selected amount. The store controller in turn allocates a portion of a lottery ticket, the portion being based on the monetary value (step 3220). The store controller then outputs (i) a ticket identifier that identifies the lottery ticket, and (ii) a portion identifier that identifies the allocated portion of the lottery ticket (step 3230). For example, the store controller typically transmits the ticket identifier and the portion identifier to the POS terminal, and the POS terminal in turn prints a fractional lottery ticket based on the transmitted identifiers, as described herein. The store controller also stores the ticket identifier and the portion identifier (step 3240), for example, in the fractional ticket database 734 (FIG. 7), for authentication purposes.

Figure 33:
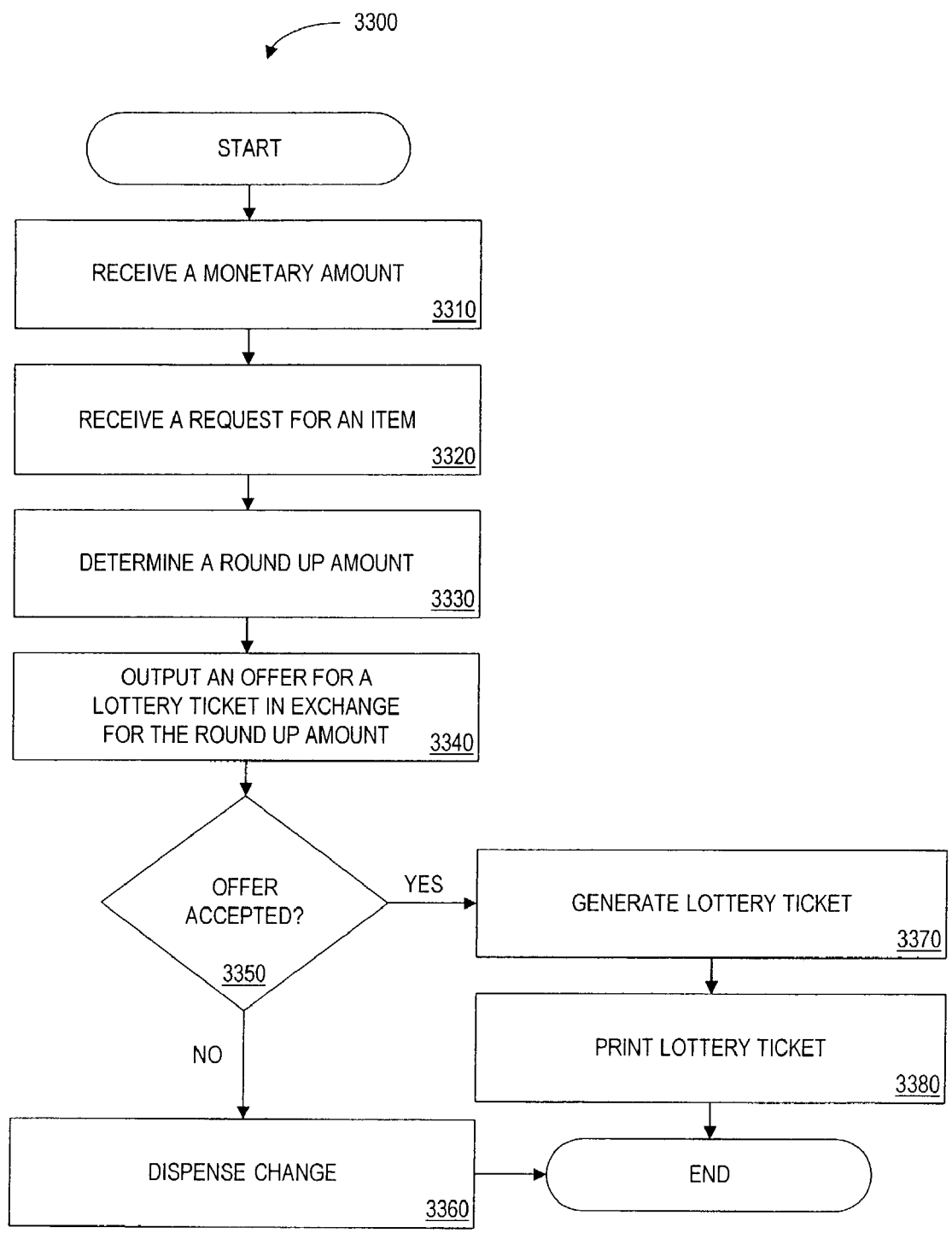
FIG. 33 is a flow chart representing a method in accordance with one or more embodiments of the present invention.

Referring to FIG. 33, a flow chart 3300 represents an exemplary embodiment of a process of the present invention that may be performed by a vending machine (or other POS terminal) and/or a system controller. The particular arrangement of elements in the flow chart of FIG. 33, as well as the other flow charts discussed herein, is not meant to imply a fixed order to the steps; the steps can be practiced in any order that is practicable for various embodiments of the present invention.

A vending machine receives a monetary amount from a customer (step 3310). For example, the customer deposits currency or other monetary value into the vending machine, or inserts a credit card at a credit card reader in communication with the vending machine. The vending machine also receives a request for an item (step 3320). For example, the customer presses a button or combination of buttons of the vending machine to indicate a desired food or beverage item.

The vending machine determines a round-up amount, as described variously herein (step 3330). For example, the round-up amount may be based on an amount of change due to the customer (e.g., based on the monetary amount provided by the customer and a cost of the requested item(s)). The vending machine may determine a purchase price for the selected items based on an inventory price database 920 (FIG. 9), and determine an amount of change due based on the monetary amount received.

The vending machine also outputs to the customer an offer for a lottery ticket (or other game entry) in exchange for the round-up amount (step 3340). For example, the offer may be displayed to the customer at a display device in communication with the vending machine, or may be communicated to the player in an audio message via an audio speaker. In some embodiments, a POS terminal displays text or graphics that explain to the customer (and/or a cashier) that a game entry upsell may be purchased for a specified amount of change due.

Optionally, the offer may specify a type of lottery game and/or may indicate the value of the lottery ticket being offered. As discussed variously herein, an offered lottery ticket may have any value. For example, an offer may be for one or more fractional lottery tickets and/or one or more "full value" lottery tickets.

According to some embodiments, the vending machine may determine an appropriate round-up amount and/or lottery ticket value using a game entry upsell program 922 (FIG. 9). According to some alternative embodiments, the vending machine transmits information about the vending machine transaction (e.g., the received monetary value, or a cost of the requested item) to a controller 930 (FIG. 9) (and/or a lottery server), which determines the appropriate round-up amount and/or lottery ticket value and transmits them to the vending machine. In some embodiments, the offer is generated by the system controller (or lottery server) and transmitted to the vending machine (e.g., in response to a request from the vending machine for an offer) for output to the customer.

The vending machine determines whether the offer was accepted (step 3350). The player may accept the offer, for example, by-actuating an indicated button corresponding to an acceptance (e.g., labeled "PRINT TICKET," or labeled "ACCEPT"). Similarly, the player may reject the offer by actuating a button corresponding to a refusal of the offer (e.g., labeled "CANCEL," or labeled "DISPENSE CHANGE"). If the offer is not accepted, the vending machine dispenses any change due to the customer (step 3360) and the process ends.

If the offer was accepted, the vending machine generates the lottery ticket (step 3370). Various methods for generating or selecting a lottery ticket are discussed herein. For example, the lottery ticket may be generated by requesting one or more "full value" and/or fractional "quick pick" lottery ticket via real-time communication with a lottery server. In another example discussed herein, the vending machine may maintain a database of ticket records corresponding to tickets that have been or are to be purchased, and the vending machine may select one or more sets of ticket numbers from this database according to various criteria. In yet another example, the vending machine may prompt the user to select ticket numbers (e.g., using a keypad) or may receive ticket numbers from a handheld computer (e.g., via an infrared port or other wireless communication device) or other storage medium, such as a smart card or frequent shopper card. After the lottery ticket is generated, the vending machine prints the lottery ticket (step 3380) and the process ends.

Besides game entries, a POS terminal may also offer types of upsells, including a voucher that is redeemable for a game entry or other product (or a discount thereon). Vouchers can be especially valuable to a seller because they attract customers back to a business and possibly provide repeat sales. For example, a customer may be provided with a voucher redeemable for a game entry for a future drawing date that is after the next drawing date. A customer is typically more likely to return to a business to use a purchased voucher (i.e. purchased with his change) than to use a free voucher. Also, vouchers may be advantageous in directing customers to a particular business. For example, a customer using a vending machine may be offered a voucher redeemable for a game entry at a convenience store. In this way, the convenience store operator may attract customers to its place of business. Vouchers provide further value to the seller through the possibility of breakage (i.e. loss and thus non-redemption of a purchased voucher).

A voucher may either be related to the round-up amount or independent thereof. For example, one type of voucher is a coupon redeemable for a discount on a future purchase, in which the discount amount is equal to the round-up amount of the present purchase. In contrast, another type of voucher is a coupon redeemable for a certain product, regardless of the round-up amount of the present purchase.

Thus, instead of outputting an offer for a game entry, a vending machine (or other POS terminal) may output to the customer an offer for a voucher redeemable for one or more (full and/or fractional) game entries in exchange for a round-up amount. Of course, the offered voucher may be redeemable for a lottery ticket of any value.

Upon accepting the upsell, either the cashier presents a pre-printed coupon to the customer, or the POS terminal prints one for the customer. Printed vouchers may be registered with many different types of indicia, such as redemption information, a unique identifier, the date of the purchase or an expiration date.

In embodiments that include printing a unique identifier on the voucher, the POS terminal preferably maintains a database for storing a plurality of identifiers. When a new voucher must be printed, the POS terminal generates a unique identifier that does not already exist in the identifier database. This identifier is then stored in the identifier database. By searching the identifier database for a voucher identifier, redemption of the voucher may be tracked and the same voucher cannot be redeemed more times than permissible. An exemplary database would preferably include a field for a unique identifier for identifying each voucher, and may also include a voucher face value, which may (or may not) equal a round-up amount exchanged for the voucher. Stored voucher face values allow each voucher to be redeemed for a different value, while minimizing fraud. For example, a voucher face value stored in a voucher identifier database may be retrieved upon redemption and compared with values printed on the vouchers. Discrepancies between stored and printed voucher values would indicate forgery of the printed voucher.

Figure 34:
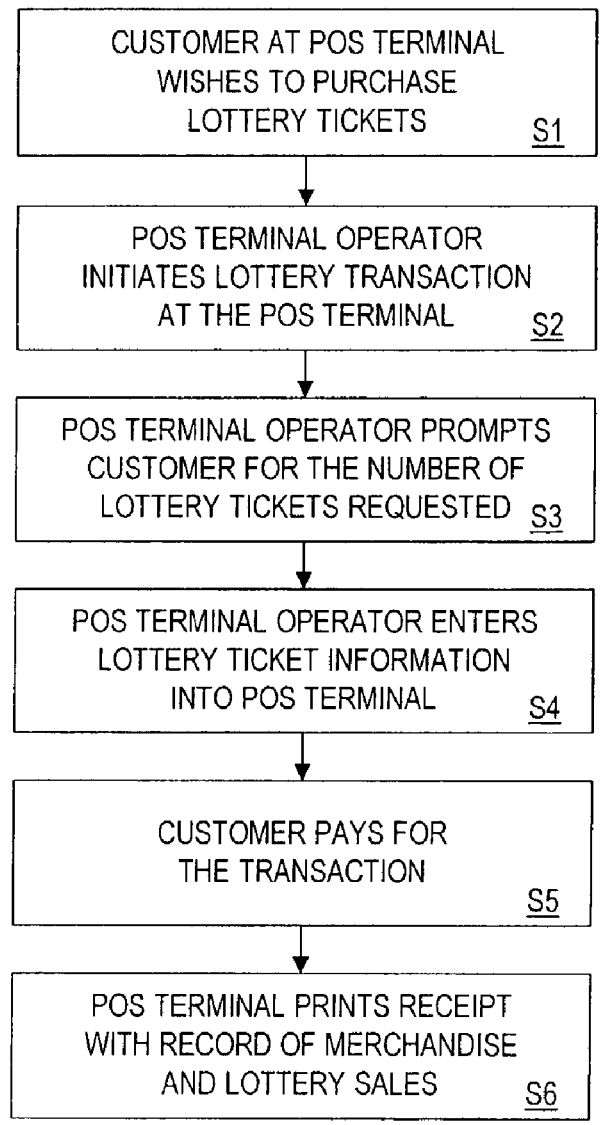
FIG. 34 is a flow chart representing a method in accordance with one or more embodiments of the present invention.

FIG. 34 depicts a flow chart 3400 depicting an exemplary lottery ticket transaction process performed at a POS terminal (e.g., POS terminal 800) from a customer's point of view. The process starts when a customer indicates to the POS terminal operator that he or she wishes to purchase one or more "quick-pick" lottery tickets in step S1. Of course, the "quick-pick" lottery tickets can be either full or fractional lottery tickets. The customer may make this decision to buy lottery tickets as a stand-alone transaction or while purchasing other merchandise, such as milk or bread. In step S2, the POS terminal operator initiates a lottery transaction by actuating a pre-programmed designation on the input device 37 associated with the POS terminal 30. The customer is then prompted by the POS operator for the number of "quick-pick" lottery tickets desired in step S3.

The number of "quick-pick" lottery tickets may also include fractional lottery tickets. This is convenient for customers who do not want to receive a handful of coins as change from a transaction. For example, a customer due sixty-eight cents in change, from a merchandise purchase could elect to buy a lottery ticket for sixty-eight cents which is worth 68% of a $1 ticket and which pays-out sixty-eight percent of the $1 payout. Alternatively, the customer could buy a 34% value of a $2 ticket with 68 cents. Along with the fractional value lottery tickets, the customer may or course purchase full value lottery tickets.

In an alternative embodiment, the customer may also be prompted for additional lottery ticket information, such as the type of lottery game to be played and the particular lottery numbers selected by the customer. For example, a particular lottery system may offer lottery games based on three, four and six number combinations. The customer may also personally select the lottery numbers to be played.

In step S4, the POS terminal operator enters the number of lottery tickets requested by the customer into the POS terminal via an input device. The customer pays for the lottery tickets and any other purchases made at this time in step S5. In step S6, the POS terminal prints a single receipt containing the lottery ticket information and any other merchandise sales information. Of course, it will be readily understood that the lottery ticket information may be provided on a separate receipt (e.g., a lottery ticket) in addition to or in lieu of being provided on a receipt with other merchandise sales information.

Figure 35:
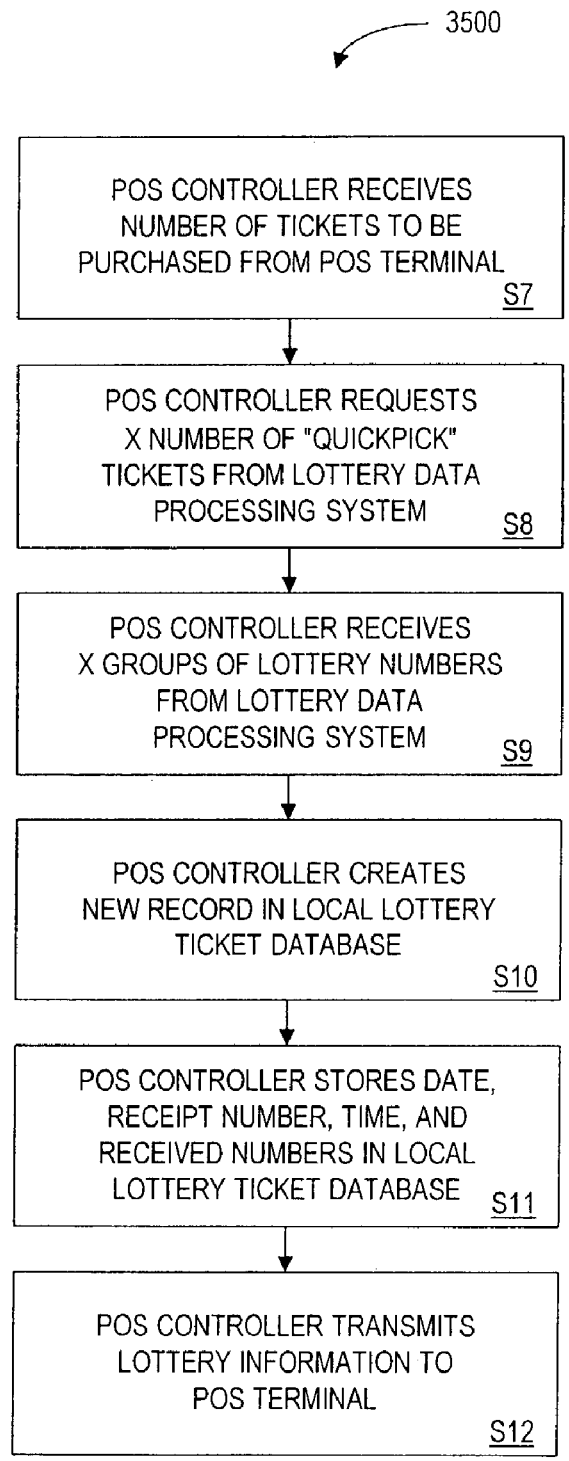
FIG. 35 is a flow chart representing a method in accordance with one or more embodiments of the present invention.

FIG. 35 is a flow chart of an exemplary operation of a POS controller (e.g., controller 600 (FIG. 6)) or other lottery client. The POS controller receives in step S7 a lottery ticket transaction request which includes, in this example, the number of "quick-pick" lottery tickets requested by the customer from POS terminal. The POS controller temporarily stores this information (e.g., in RAM), while it establishes a real-time communication link with a lottery server (e.g., lottery server 1000 (FIG. 10)) via a data network.

While only one lottery server 310 is depicted in FIG. 3, additional lottery servers may be available as secondary or back-up lottery servers. Accordingly, if the POS controller fails to establish communication with the primary lottery data processing system, communication attempts would be made to a secondary lottery data processing system.

Once the real-time communication link is established, the POS controller in step S8 transmits the number of "quick-pick" lottery tickets requested to the lottery server. The POS controller preferably also transmits its POS controller identification number (e.g., F13 in FIG. 28). In step S9, the POS controller receives one or more groups of lottery numbers (corresponding to the number of lottery tickets requested) from the lottery server. According to an alternative embodiment, an associated authentication code is also received from the lottery data processing system. A new record (e.g., R1 in FIG. 5) is created in a ticket database (e.g., fractional ticket database 608 (FIG. 6)) in step S10. In step S11, the POS controller stores in the newly created record the date, receipt number, time, and lottery numbers received from the lottery server (e.g., as depicted in tabular representation 1200). The POS controller then transmits the lottery ticket information (e.g., the lottery numbers and authentication code, if any) to the POS terminal that initiated the lottery transaction request in step S12.

In another alternative embodiment, the POS controller may also handle non-"quick-pick" lottery ticket transactions. Customer-selected lottery numbers may be received, for example, from the customer via mark-sense slips or coded chits at a POS terminal and sent to the lottery server for processing, as described herein.

Figure 36:
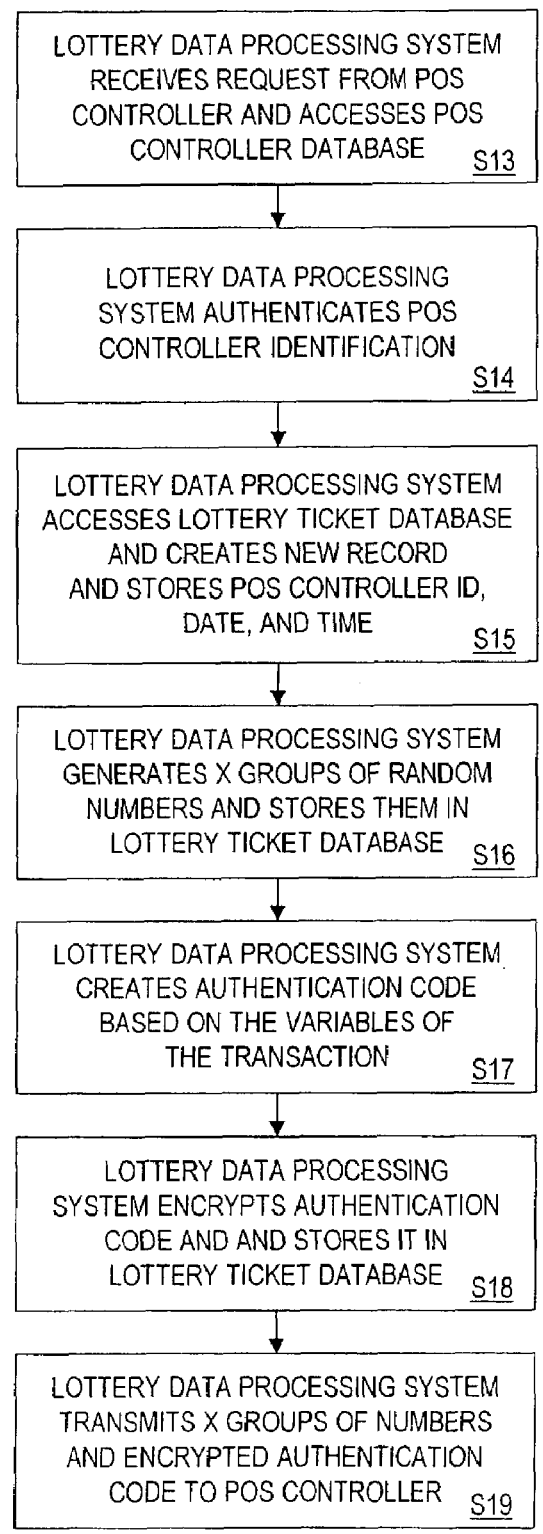
FIG. 36 is a flow chart representing a method in accordance with one or more embodiments of the present invention.

FIG. 36 is a flow chart of an exemplary operation of a lottery server or a lottery data processing system (e.g., lottery data processing system 560 (FIG. 5)). Upon receiving a lottery ticket transaction request and a POS controller identification number from a POS controller, a lottery data processing system in step S13 accesses a POS controller database (e.g., POS controller database 1010 (FIG. 10)). The lottery data processing system searches the POS controller database and authenticates the POS controller identification number, as shown in step S14. In step S15, a lottery ticket database is accessed and a new lottery transaction entry is added in the appropriate POS controller record.

In step S16, the lottery data processing system generates one or more groups of random "quick-pick" lottery numbers using a random number generator (e.g., random number generator 1066 (FIG. 10)). These random "quick-pick" lottery numbers are used for the quick-pick lottery tickets. The lottery transaction entry added in step S15 is then updated in step S16 by storing these random "quick-pick" lottery numbers in the designated field of the record.

The system preferably also generates an authentication code based on the variables of the particular lottery transaction in step S17. This authentication code preferably is a numeric or alphanumeric string including some or all of the data of one record in the lottery ticket database. An example of such a code corresponding to the first sample entry shown in tabular representation 1300 (FIG. 13), is as follows:

23456/011597004/3343004/011020112131

In this example, 23456 represents the POS controller ID number; 011597 represents the date; 004 represents the number of tickets purchased; 3343 represents the sales receipt number; 004 represents the sales amount; and 011020112131 represents the lottery ticket numbers. Other types of unique lottery ticket record identifiers that may be used to extract, update, and verify lottery ticket information, as required, will be readily apparent to those of ordinary skill in the art.

For example, it will be readily understood that some or all of the information stored in the corresponding record (e.g., the store sales receipt number along with the date for each transaction) may be used instead. The sales receipt number and the date could then be used as a pointer to the lottery ticket database.

In step S18, the lottery transaction entry added in step S15 is updated again by storing the authentication code in the appropriate field of the record.

If the use of an encrypted authentication code is preferred, the authentication code may first be encrypted to produce a unique numeric code using a cryptographic processor (e.g., cryptographic processor 1067 (FIG. 10)). An encrypted authentication code based on some or all of the data in the corresponding record, for example, provides an added level of security and protection for the purchase of the lottery ticket. Should the database within a lottery server or lottery data processing system be corrupted, all the information printed on the store receipt lottery ticket can still be verified by any other device capable of decrypting the authentication code. The use of cryptographic processors and encryption algorithms are well known to those skilled in the art of cryptography. For reference, one of ordinary skill in the art may refer to Bruce Schneier's *Applied Cryptography: Protocols, Algorithms and Source Code in C*, (2nd Edition, John Wiley & Sons, Inc., 1996).

The lottery data processing system then transmits the lottery ticket numbers and the authentication code to the POS controller initiating the lottery ticket transaction in step S19.

In an alternative embodiment, additional information may be transmitted from the POS controller to the lottery data processing system. This could include, as described above, customer-selected lottery numbers instead of the random "quick-pick" lottery numbers generated by the lottery server. In this situation, the lottery data processing system would store the customer-selected lottery numbers in the lottery ticket database. An authentication code would be generated accordingly based on the customer-selected lottery numbers. The lottery data processing system would then send the authentication code and authorization to complete the lottery transaction to the POS controller.

As discussed variously herein, if a game entry (e.g., a lottery ticket) is a winner (e.g., if the corresponding ticket numbers match a set of drawn lottery numbers), in accordance with one or more embodiments a share of a prize is provided to the customer holding the game entry. The share of the prize will be based on the value of the fractional game entry. In some embodiments, the share of the prize will thus be based on a value corresponding to an allocated portion of a lottery ticket. In various embodiments, the share of the prize for a winning game entry may be proportional to the amount paid for the game entry (e.g., the round-up amount used to purchase the game entry, or an amount offered by a customer in exchange for a fractional lottery ticket). For example, as discussed herein, if a customer receives a fractional lottery ticket in exchange for $0.34, the customer may receive a corresponding 34% share (or a 17% share, etc.) of a game prize. For example, the prize for winning the game may be proportional to a round-up amount paid for the game entry. In such embodiments, the prize collected upon winning the game is greater for greater round-up amounts. When a winning entry is determined, the game database provides the round-up amount corresponding to the entry, and thereby determines the prize value.

Of course, a prize may be shared by more than one winning ticket holder, with each ticket holder receiving a respective share based on the value of his fractional game entry. Thus, according to some embodiments, players' individual winnings may be proportional to the amount they wagered on their winning entries. For example, one customer may receive a 34% share, a second customer a 50% share, and a third customer a 16% share, based on the respective values of their winning fractional lottery tickets (e.g., based on the respective cost of each winning ticket). As will be readily understood by those skilled in the art, the size of a game prize may be based on the total amount wagered for the game. Accordingly, in some embodiments, two or more winners may receive share amounts based on the total amount played for a game (e.g., for a day's drawing) and the respective cost of each winning game entry.

Thus, in some embodiments in which the value of the fractional lottery ticket is based on the purchase price, the share of a prize for a winning fractional lottery ticket may be determined pro rata based on the purchase price of the fractional lottery ticket. In one example, a lottery player would only receive a fraction of a winning prize based on the fraction of the lottery ticket purchased. Thus, in some embodiments, the customer will receive only a portion of the winning prize in accordance with the fractional portion paid for the ticket as compared to the full price of a lottery ticket. For instance, if a customer pays $0.58 for a fractional lottery ticket where the full price of a lottery ticket is $1.00, the customer would receive fifty-eight percent of the prize amount if the ticket is a winner. In another example, a customer may be sold a 26% share of a $1 lottery ticket in lieu of an amount of change due. If the lottery ticket wins, 26% of a corresponding prize is awarded to the customer. In yet another example, if a customer receives a fractional lottery ticket having a value of $0.34 and defining a portion of a $2.00 lottery ticket, then the customer receives 17% ($0.34/$2.00=17%) of any prize won with that lottery ticket.

In a LOTTO-type game, in which typically only one set of winning ticket numbers is drawn and a winner typically is not guaranteed for each drawing, a customer holding a winning fractional lottery ticket corresponding to the winning ticket numbers may take a share of the prize in proportion to the purchase price of the fractional lottery ticket, or otherwise based on the fractional value. Similarly, in the case of a "raffle"-type lottery game, in which one or more winners are guaranteed at a particular drawing (e.g., by selecting the winner(s) from the set of submitted game entries), a customer holding one of the winning entries (e.g., a fractional lottery ticket corresponding to one set of winning ticket numbers) may take a share of the prize in proportion to the purchase price of the fractional game entry. In other embodiments, a sole winner may win the entire game prize, or some other portion of the game prize, as deemed practicable by the lottery game operator.

In the case of multiple winners, winning fractional ticket holders may take respective shares of a prize in proportion to the amounts they paid individually for the tickets, as discussed above. In one example, James receives a fractional lottery ticket in exchange for $0.55, and Mark receives a fractional lottery ticket in exchange for $0.45. If the fractional lottery tickets are winners, James receives a share of the determined game prize (e.g., determined based on an amount wagered by all players for that drawing) in proportion to the $0.55 purchase price of his ticket (e.g., a 55% share). Mark similarly receives a share based on the $0.45 purchase price of his ticket (e.g., a 45% share). The two players thus wagered a total of $1.00, and the respective shares (55% and 45%) were determined based on the respective amounts of the total wager of $1.00 paid by the players ($0.55 and $0.45). Thus, in some embodiments, all of a game prize may be allocated among all winning ticket holders for a drawing, based on the respective shares of a total wager amount paid by the winning players for the winning fractional lottery tickets. Accordingly, a player paying $0.70 for a winning fractional game entry may receive a share of a game prize that is twice as large as that received by a player paying $0.35 for his game entry.

In another example, Harry receives a fractional lottery ticket having a value of $0.34 and defining a portion of a $2.00 lottery ticket. Harry then receives 17% ($0.34/$2.00=17%) of any prize won with that lottery ticket. David receives a fractional lottery ticket having a value of $0.50 and defining a portion of the same $2.00 lottery ticket. David then receives 25% ($0.50/$2.00=25%) of the prize won that lottery ticket.

Alternatively, or in addition, other types of prizes may be provided for a winning game entry. For instance, a prize amount may be fixed and/or independent of the value of the winning game entry (e.g., any winning ticket wins a prize of $1000). In another example, a prize amount for one winning outcome may be fixed (e.g., for a top prize) while a prize amount for another winning outcome may be based on the value of a game entry (e.g., for a secondary prize). Fixed payouts may be more attractive to some players, as they may prefer to know exactly what prize they may receive and/or may prefer to know that they are playing for the same prize(s) as other players. A corresponding fixed prize amount may be indicated to a player either before or after the purchase of a game entry (e.g., on a provided ticket). In some embodiments, a fixed prize amount may correspond to a range of game entry values. For example, all tickets purchased for $0.25 to $0.49 may be eligible for the same prize amount of $2000. In some embodiments providing for fixed prize amounts, the respective probability of attaining a particular winning outcome may be dependent on the value of a game entry.

In one alternative embodiment, a prize for a variably-priced game may comprise a rebate on a product purchased in a transaction. As discussed herein, according to various embodiments a customer may purchase a lottery ticket or other game entry in addition to other types of merchandise (e.g., in response to an upsell offer) in a transaction. In some embodiments of the present invention, a prize for a variably-priced game may comprise a rebate on a product purchased in the transaction. For example, a customer approaches a POS terminal in a grocery store to check out. During the transaction, which includes the purchase of a box of cereal, the customer also purchases a fractional value game entry (e.g., in response to an offer, or at the customer's request) for $0.47. The POS terminal prints out a receipt that indicates the customer's "quick pick" numbers. The receipt also indicates that if the game entry is a winner the customer will win a $2.00 rebate on the purchased cereal. The customer may be able to redeem the winning receipt at a POS terminal or at a customer service counter, for example.

In another alternative embodiment, a prize for winning a game or contest may comprise a discount on a future purchase (e.g., general or product-specific), a voucher for a product, or a product. For example, many of the types of upsell items described herein may be used as prizes. In some embodiments, a benefit for a winning game entry may comprise an alternate currency, such as airline miles, telephone minutes, or points in an award redemption program. Other types of prizes are discussed herein; others will be readily apparent to those skilled in the art in light of the present disclosure.

To redeem a fractional game entry, a customer preferably provides the printed ticket to show that he is entitled to the indicated share of a prize. The printed ticket is verified to assure that it is valid and unaltered. For example, if the printed ticket is valid, the fractional lottery ticket identifier inscribed on the printed ticket indicates a record in the fractional ticket database 734 (FIG. 7). That record should in turn indicate corresponding information on the printed ticket. In addition, an encrypted code can be verified.

Figure 37:
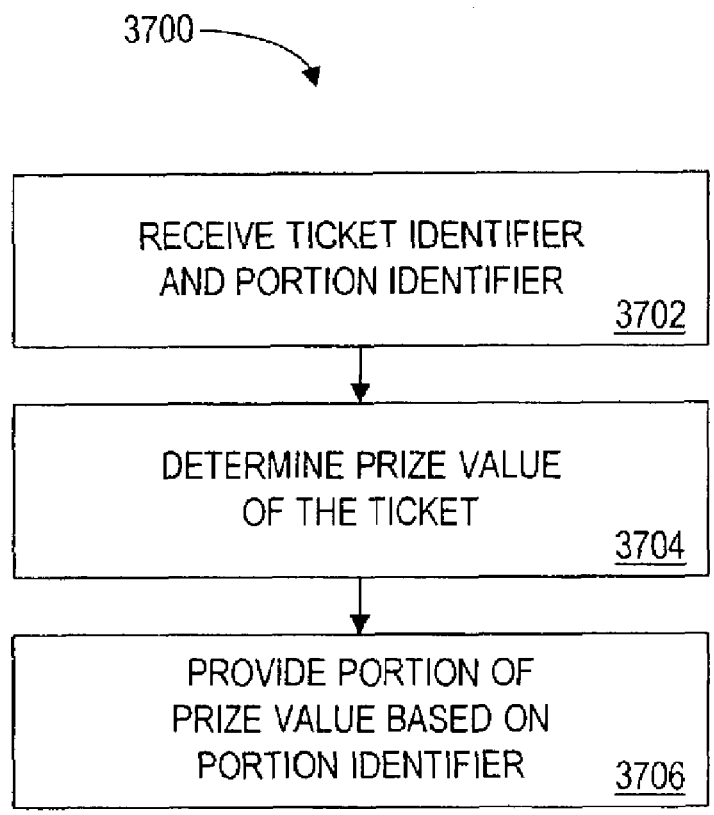
FIG. 37 is a flow chart representing a method in accordance with one or more embodiments of the present invention.

Referring to FIG. 37, a method 3700 for redeeming a fractional lottery ticket initiates by receiving (i) a ticket identifier that identifies a lottery ticket (e.g., ticket numbers, or a receipt number), and (ii) a portion identifier that identifies an allocated portion of the lottery ticket (step 3702). Such identifiers may be received by manually entering one or more identifiers into a POS terminal, from which the identifiers are transmitted to a store controller. Alternatively, a bar code scanner of the POS terminal may read a bar code on the printed ticket, and transmit the bar code to the store controller. The entered identifier or bar code may be indicative of the fractional lottery ticket identifier, which may be used to retrieve a corresponding ticket identifier and portion identifier from a fractional ticket database 734 (FIG. 7). The store controller thus receives the ticket identifier and portion identifier.

Once the identifiers are received, thereby identifying one or more lottery tickets and allocated portions thereof, a prize value of the lottery tickets is determined (step 3704). As discussed above, the prize value may be determined by comparing ticket numbers of a lottery ticket with winning ticket numbers stored in a winning ticket database 736 (FIG. 7). As also described above, the portion of the prize that is to be provided to the customer is determined by the allocated portion of the lottery ticket. This portion of the prize is provided to the customer (step 3706), typically by providing cash from a cash register or by writing or printing a check made out to the customer.

Figure 38:
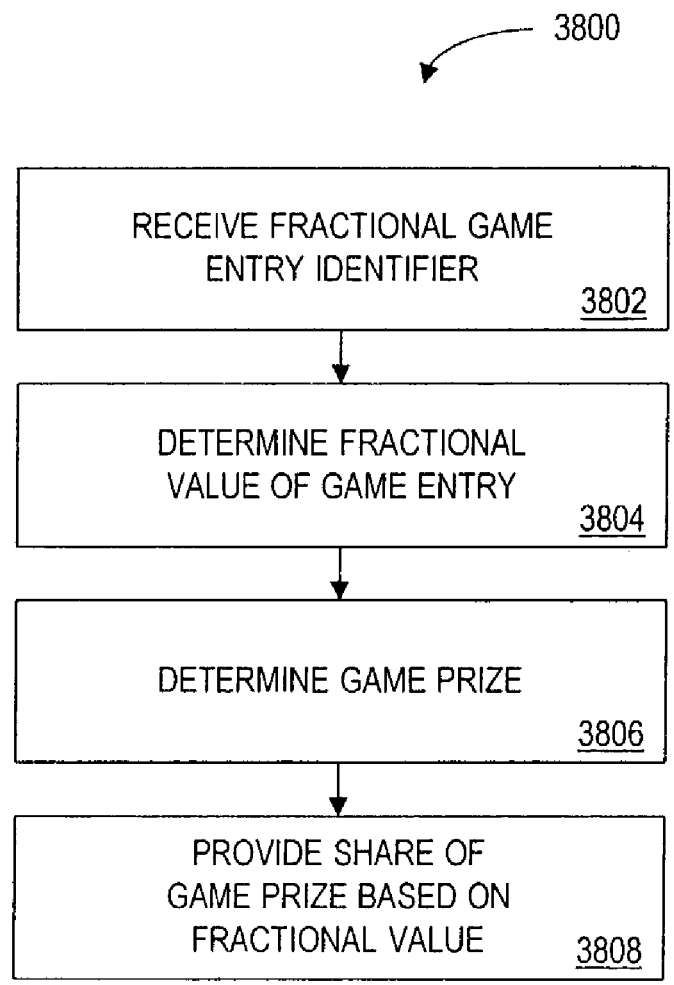
FIG. 38 is a flow chart representing a method in accordance with one or more embodiments of the present invention.

Referring to FIG. 38, a method 3800 is depicted for redeeming a fractional game entry that may be performed by a POS controller and/or a POS terminal. The method 3800 initiates by receiving (e.g., at a POS terminal) a fractional game entry identifier that identifies a fractional game entry (e.g., a fractional ticket identifier, a set of ticket numbers, or a receipt number) (step 3802). The POS terminal, for example, also determines a fractional value of the game entry (step 3804). For example, as described above, a value of a fractional lottery ticket may be determined by looking up a corresponding entry in a fractional ticket database based on the received fractional game entry identifier. In another example, a customer may present a fractional lottery ticket such as is depicted in FIG. 2, which includes a ticket identifier "987654321" and an indication of a value of "$0.12."

The POS terminal also determines a game prize for the game (step 3806). For example, as discussed herein, the POS terminal and/or a POS controller may determine a winning prize based on a set of ticket numbers associated with a fractional lottery ticket. As discussed above, a game prize may be determined by comparing ticket numbers of a lottery ticket with winning ticket numbers stored in a winning ticket database 736 (FIG. 7). As also described herein, the share of the game prize that is to be provided to the customer is determined based on the fractional value of the game entry. For example, the customer may be awarded a share based on the purchase price of the game entry, or on some other value. In another example, the customer may be awarded a share based on the purchase price of his game entry and on the respective purchase prices of any other winning entries for that drawing. This share is provided to the customer (step 3808) in any well-known manner.

A winning lottery ticket that has been purchased may have an unallocated portion greater than zero. Such a winning lottery ticket will have an associated portion of the prize value that is not to be paid to customers. This portion of the prize is instead retained by the business, and may be used to finance various customer incentives. For example, a portion of retained prize value may be provided back to customers in the form of fractional lottery tickets (e.g., $0.05 of change buys a $0.50 fractional lottery ticket).

The business may retain further winnings by providing winning tickets with portions of certain prize values. For example, customers may only be provided with shares of "jackpot" prizes (e.g., matching all six winning ticket numbers). Any other prizes are retained by the business. Of course, such restrictions would typically be explained to the customers through advertising and printed information on the fractional lottery ticket.

Many types and forms of lottery tickets are well known in the art, and others will be readily apparent to those skilled in the art based on the present disclosure. As will be understood by those having ordinary skill in the art, ticket 200 (FIG. 2) may be represented electronically, such as at a display screen at a POS terminal. In some embodiments, a customer may be able to review a displayed representation of some ticket information (e.g., the ticket numbers and/or the value). For example, an electronic representation of ticket 200 may be displayed to a customer at a POS terminal for the customer's approval. If the customer approves, the transaction may be completed, and a printed copy of the ticket information may be provided (e.g., a paper copy of ticket 200). In another example, ticket 200 may be an image displayed on a display screen of a computing device (e.g., a personal computer, or a handheld device) to a user purchasing a fractional lottery ticket on-line (e.g., via the Internet). The customer may then be able to print a representation of ticket 200 at a printing device in communication with his computing device.

Some embodiments of the present invention provide for systems and methods utilizing one or more POS terminals that generate a single sales receipt containing all lottery ticket and merchandise information for a customer. For example, the POS terminal completes a transaction by printing out a single sales receipt containing both lottery ticket information and information concerning the merchandise being purchased. Thus, according to some embodiments, an easy-to-print and easy-to-read sales receipt is printed containing both the sales of goods/services and lottery ticket information, without the customer having to wait for two transaction receipts, or go to another check-out terminal to make other non-lottery ticket purchases. The ticket preferably includes authenticating information, including at least one authenticating code and a customer service telephone number, which the customer can use to verify his lottery numbers with the lottery authority.

In some embodiments, therefore, ticket 200 (or portions thereof) may be included in a sales receipt that contains information corresponding to a transaction, in addition to some or all of the information depicted in FIG. 2. Shown in FIG. 39 is an example of a store sales receipt 80 according to one embodiment of the present invention. The store sales receipt 80 includes non-lottery ticket related merchandise information 81. The bottom portion contains exemplary lottery ticket information, including a plurality of lottery numbers 82, a store ID number 83, a receipt number 84, a date 85, a time 86, a price 89, and a lottery telephone number 87, and an authentication code 88. In the case of a fractional lottery ticket, the store sales receipt 80 would also include an indication of the fraction of the full price lottery ticket purchased (e.g., as shown in FIG. 39, $0.68 was paid for ticket 4). According to one alternative embodiment, as discussed herein, the authentication code 88 is encrypted.

The present invention further provides systems and methods whereby an easy to print, easy to read, sales receipt is printed containing both the sales of goods/services and lottery ticket information. The ticket may include authenticating information, such as at least one authenticating code and/or a customer service telephone number, which the customer can use to verify his lottery numbers with the lottery authority.

According to some embodiments of the present invention, once a fractional lottery ticket has been determined, the POS terminal prints for the customer a ticket indicative of the fractional lottery ticket, for example, on a receipt. The printed ticket serves as proof that the customer is entitled to the indicated portions of any prizes for the indicated ticket numbers. Such a printed ticket may include the corresponding (i) fractional lottery ticket identifier, (ii) ticket numbers, (iii) portion(s) of lottery ticket(s) included in the fractional lottery ticket, (iv) transaction identifier, and (v) an encrypted code based on any combination thereof. Such an encrypted code may be used to verify that the printed ticket is unaltered. Encryption techniques are described in Bruce Schneier's *Applied Cryptography: Protocols, Algorithms and Source Code in C*, (2nd Edition, John Wiley & Sons, Inc., 1996). Those skilled in the art will understand that the encrypted code may be determined by a cryptographic algorithm such that it would be almost impossible for a forger to generate a valid code, much less a code that indicates winning ticket numbers.

The printed ticket may also include contractual language, such as provisions assigning to the customer the right and title in and to the indicated portions of any prizes for the indicated ticket numbers. In some embodiments, a signature line may be provided for the customer to indicate acceptance of any contractual language. Still further matter such as the drawing date and an expiration date of the fractional lottery ticket may be included on the printed ticket, as will be understood by those skilled in the art. It may be further desirable to print a bar code that indicates any or all of the above information, thereby facilitating entry of the information using a bar code scanner.

Some embodiments for performing integrated lottery ticket and merchandise transactions may use the same equipment provided for processing conventional store sales of merchandise and/or services to process lottery ticket sales. The dual utility of the sales equipment makes the invention cost-effective for merchants. Some embodiments of the present invention facilitate the purchase of fractional lottery tickets without requiring significant changes to existing lottery systems. In other embodiments, the ability to offer fractional lottery tickets may require modifications to the hardware and software of lottery terminals and/or other POS terminals.

Although the present invention has been described with respect to preferred embodiments thereof, those skilled in the art will note that various substitutions may be made to those embodiments described herein without departing from the spirit and scope of the present invention. For example, the present invention is applicable to many types of games besides lotteries in which prizes are awarded. In addition, in some embodiments the data stored on the store controller may instead be stored among the POS terminals. Similarly, some of the functions performed by the store controller may be performed by the POS terminal, and vice versa.

We claim:

1. A method comprising:
    receiving from a customer a request to purchase a lottery ticket in exchange for a purchase amount that is less than one dollar;
    generating a combination of characters at random, the combination comprising:
        a first alphanumeric character,
        a second alphanumeric character,
        a third alphanumeric character,
        a fourth alphanumeric character,
        a fifth alphanumeric character, and
        a sixth alphanumeric character;
    printing a lottery ticket, the lottery ticket including:
        an indication of the combination of characters,
        an indication of the purchase amount,
        an indication of a draw date, and
        a signature line;
    providing the lottery ticket to the customer in exchange for the purchase amount;
    determining a set of lottery tickets purchased for a day's drawing,
        in which each lottery ticket is associated with a respective purchase amount and a respective combination of characters,
        the set of lottery tickets including the lottery ticket of the customer;
    determining a prize amount based on the respective purchase amounts;
    drawing a first winning lottery ticket from the set of lottery tickets;
    drawing a second winning lottery ticket from the set of lottery tickets;
    drawing a third winning lottery ticket from the set of lottery tickets;
    determining a total cost based on a purchase amount of the first winning lottery ticket, a purchase amount of the second winning lottery ticket, and a purchase amount of the third winning lottery ticket;
    receiving an indication of the combination of characters of the lottery ticket that was provided to the customer;

determining whether the combination of characters is the same as the respective combination of characters associated with the first winning lottery ticket; and determining a share of the prize amount based on the purchase amount of the first winning lottery ticket and the total cost.

2. The method of claim 1, further comprising:
providing the share of the prize amount to the customer.

3. The method of claim 1, in which receiving the indication of the combination of characters of the lottery ticket comprises:
receiving the lottery ticket of the customer at a lottery retailer.

4. The method of claim 1, in which receiving the indication of the combination of characters of the lottery ticket:
receiving the lottery ticket of the customer at a lottery office.

5. The method of claim 1, further comprising:
determining whether the customer signed the lottery ticket that was provided to the customer.

6. The method of claim 1, in which the lottery ticket of the customer corresponds to a lottery game having at least three respective guaranteed winners for each day's drawing.

7. The method of claim 1, in which the lottery ticket corresponds to a lottery game having odds of winning a day's drawing that are based on a total number of tickets sold for the day's drawing.

8. The method of claim 1, in which drawing the first winning lottery ticket comprises:
drawing the first winning lottery ticket at approximately a predetermined drawing time.

9. The method of claim 1, in which the combination of characters comprises, in sequence:
the first alphanumeric character,
the second alphanumeric character,
the third alphanumeric character,
the fourth alphanumeric character,
the fifth alphanumeric character, and
the sixth alphanumeric character.

10. The method of claim 1, further comprising:
drawing a fourth winning lottery ticket from the set of lottery tickets;
drawing a fifth winning lottery ticket from the set of lottery tickets; and
drawing a sixth winning lottery ticket from the set of lottery tickets, and
in which determining the total cost comprises:
determining the total cost based on the purchase amount of the first winning lottery ticket, the purchase amount of the second winning lottery ticket, the purchase amount of the third winning lottery ticket, a purchase amount of the fourth winning lottery ticket, a purchase amount of the fifth winning lottery ticket, and a purchase amount of the sixth winning lottery ticket.

11. A method comprising:
receiving a request from a customer to purchase a lottery ticket in exchange for a fractional monetary amount;
receiving the fractional monetary amount from the customer;
determining a ticket value based on the fractional monetary amount;
outputting a ticket identifier that identifies the lottery ticket;
outputting an indication of the ticket value;
determining a proportional share based on the ticket value;

determining a prize share amount based on the proportional share; and
providing the prize share amount to the customer.

12. A method comprising:
receiving a request from a customer to purchase a lottery ticket in exchange for a fractional monetary amount;
receiving the fractional monetary amount from the customer;
outputting a ticket identifier that identifies the lottery ticket;
determining whether the lottery ticket is a winning ticket; and
if the lottery ticket is a winning ticket,
determining a benefit that is associated with the lottery ticket, and providing the benefit to the customer.

13. The method of claim 12, in which the benefit has a value that is proportional to the fractional monetary amount.

14. The method of claim 12, in which the fractional monetary amount is based on a change amount for a transaction.

15. The method of claim 12, in which the benefit is a fixed prize amount.

16. The method of claim 12, in which the benefit comprises at least one of:
a discount,
a voucher,
a rebate, and
a coupon.

17. The method of claim 12, further comprising:
determining a ticket value based on the fractional monetary amount; and
in which determining whether the lottery ticket is a winning ticket comprises:
determining whether the lottery ticket is a winning ticket based on the ticket value.

18. The method of claim 17, in which a probability that the lottery ticket is a winning ticket is based on the ticket value.

19. A method comprising:
receiving a request to purchase a lottery ticket in exchange for a fractional monetary amount;
receiving the fractional monetary amount;
determining a fractional ticket value based on the fractional monetary amount;
outputting a ticket identifier that identifies the lottery ticket; and
outputting an indication of the fractional ticket value.

20. A method comprising:
receiving a request by a customer to purchase a lottery ticket in exchange for a wager amount,
in which the wager amount is not a whole-number multiple of one dollar, and
in which the lottery ticket corresponds to a variably-priced lottery game;
determining a ticket value based on the wager amount;
generating a lottery ticket having the ticket value; and
providing the lottery ticket to the customer.

21. A method comprising:
determining a wager amount that is associated with a winning lottery ticket;
determining a proportional share based on the wager amount;
determining a prize share amount based on the proportional share; and
providing the prize share amount to a holder of the winning lottery ticket.

22. A method comprising:
- determining a first wager amount that is associated with a first winning lottery ticket;
- determining a second wager amount that is associated with a second winning lottery ticket;
- determining a proportional share based on the first wager amount and the second wager amount;
- determining a prize share amount based on the proportional share; and
- providing the prize share amount to a holder of the first winning lottery ticket.

23. A method comprising:
- receiving first ticket numbers from a first holder of a first fractional lottery ticket,
  - in which the first fractional lottery ticket is associated with a lottery game;
- determining a first purchase price that is associated with the first fractional lottery ticket;
- receiving second ticket numbers from a second holder of a second fractional lottery ticket,
  - in which the second fractional lottery ticket is associated with the lottery game;
- determining a second purchase price that is associated with the second fractional lottery ticket;
- determining a prize amount of the lottery game;
- determining a first share of the prize amount based on the first ticket numbers and the first purchase price;
- determining a second share of the prize amount based on the second ticket numbers and the second purchase price; and
- providing the first share of the prize amount to the first holder.

24. The method of claim 23, in which determining the first share of the prize amount comprises:
- determining the first share of the prize amount based on the first ticket numbers, the first purchase price, and the second purchase price.

25. The method of claim 23, further comprising:
- providing the second share of the prize amount to the second holder.

* * * * *